US007392210B1

(12) United States Patent
MacKay et al.

(10) Patent No.: US 7,392,210 B1
(45) Date of Patent: Jun. 24, 2008

(54) WORKFLOW MANAGEMENT SYSTEM AND METHOD

(75) Inventors: Thomas MacKay, Massapequa, NY (US); Eileen McCarthy, Larchmont, NY (US); Eric Reschke, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 1473 days.

(21) Appl. No.: 09/631,810

(22) Filed: Aug. 3, 2000

Related U.S. Application Data

(60) Provisional application No. 60/196,003, filed on Apr. 7, 2000.

(51) Int. Cl.
*G06Q 40/00* (2006.01)

(52) U.S. Cl. .......................................... 705/35; 705/39

(58) Field of Classification Search .................... 705/9, 705/35, 36, 39; 707/500
See application file for complete search history.

(56) References Cited

U.S. PATENT DOCUMENTS

| | | | |
|---|---|---|---|
| 4,169,285 | A | 9/1979 | Walker |
| 4,648,038 | A | 3/1987 | Roberts et al. |
| 4,739,478 | A | 4/1988 | Roberts et al. |
| 4,742,457 | A | 5/1988 | Leon et al. |
| 4,752,877 | A | 6/1988 | Roberts et al. |
| 4,933,842 | A | 6/1990 | Durbinet et al. |
| 5,121,469 | A | 6/1992 | Richards et al. |
| 5,222,019 | A | 6/1993 | Yoshino et al. |
| 5,257,369 | A | 10/1993 | Skeen et al. |
| 5,270,922 | A | 12/1993 | Higgins |
| 5,297,032 | A | 3/1994 | Trojan et al. |
| 5,305,200 | A | 4/1994 | Hartheimer et al. |
| 5,419,890 | A | 5/1995 | Saidi |
| 5,454,104 | A | 9/1995 | Steidlmayer et al. |
| 5,462,438 | A | 10/1995 | Becker et al. |
| 5,497,317 | A | 3/1996 | Hawkins et al. |
| 5,517,406 | A | 5/1996 | Harris et al. |

(Continued)

FOREIGN PATENT DOCUMENTS

EP 0 903 678 3/1999

(Continued)

OTHER PUBLICATIONS

State Street (1997).*

(Continued)

*Primary Examiner*—Jagdish N Patel
(74) *Attorney, Agent, or Firm*—Hunton & Williams LLP

(57) ABSTRACT

A computerized workflow management method and system to provide operational support for complex multi-step processes is disclosed. The method of workflow management involves creating an underlying database structure for recording the processing steps and other information required for each transaction, entering the necessary setup information by selection from lists of pre-stored information about processing functions, associated workflow events and milestones for the queues, mapping the data structures of the subsystem databases and the workflow management database to provide transparent interfacing and convenient manual entry of data were necessary, displaying for the user the workflow status of all transactions for which he or she is responsible, permitting menu driven initiation of required actions and automatically updating the database records for the universe of deals being managed by the system.

131 Claims, 47 Drawing Sheets

U.S. PATENT DOCUMENTS 5,557,798 A 9/1996 Skeen et al.
5,563,783 A 10/1996 Stolfo et al.
5,592,379 A 1/1997 Finfrock et al.
5,649,186 A 7/1997 Ferguson
5,675,746 A 10/1997 Marshall
5,706,502 A 1/1998 Foley et al.
5,710,889 A 1/1998 Clark et al.
5,724,593 A 3/1998 Hargrave, III et al.
5,778,157 A 7/1998 Oatman et al.
5,787,402 A 7/1998 Potter et al.
5,806,047 A 9/1998 Hackel et al.
5,806,048 A 9/1998 Kiron et al.
5,819,273 A 10/1998 Vora et al.
5,832,461 A 11/1998 Leon et al.
5,845,266 A 12/1998 Lupien et al.
5,864,827 A 1/1999 Wilson
5,890,140 A 3/1999 Clark et al.
5,913,214 A 6/1999 Madnick et al.
5,918,218 A 6/1999 Harris et al.
5,922,044 A 7/1999 Banthia
5,940,810 A 8/1999 Traub et al.
5,944,784 A 8/1999 Simonoff et al.
5,946,667 A 8/1999 Tull, Jr. et al.
5,950,176 A 9/1999 Keiser et al.
5,966,531 A 10/1999 Skeen et al.
5,966,672 A 10/1999 Knupp
5,970,479 A 10/1999 Shepherd
5,986,673 A 11/1999 Martz
5,995,943 A 11/1999 Bull et al.
6,006,206 A 12/1999 Smith et al.
6,012,046 A 1/2000 Lupien et al.
6,018,714 A 1/2000 Risen, Jr. et al.
6,018,721 A 1/2000 Aziz et al.
6,023,280 A 2/2000 Becker et al.
6,029,146 A 2/2000 Hawkins et al.
6,029,147 A 2/2000 Horadan et al.
6,035,287 A 3/2000 Stallaert et al.
6,049,783 A 4/2000 Segal et al.
6,052,673 A 4/2000 Leon et al.
6,055,522 A 4/2000 Krishna et al.
6,058,378 A 5/2000 Clark et al.
6,061,662 A 5/2000 Makivic
6,064,984 A 5/2000 Ferguson et al.
6,073,104 A 6/2000 Field
6,073,109 A * 6/2000 Flores et al. .................. 705/8
6,073,115 A 6/2000 Marshall
6,078,914 A 6/2000 Redfern
6,078,956 A 6/2000 Bryant et al.
6,081,774 A 6/2000 de Hita et al.
6,088,685 A 7/2000 Kiron et al.
6,092,056 A 7/2000 Tull, Jr. et al.
6,105,005 A 8/2000 Fuhrer
6,131,082 A 10/2000 Hargrave, III et al.
6,134,600 A 10/2000 Liu
6,148,298 A 11/2000 LaStrange et al.
6,173,270 B1 1/2001 Cristofich et al.
6,173,276 B1 1/2001 Kant et al.
6,178,420 B1 1/2001 Sassano
6,185,567 B1 2/2001 Ratnaraj et al.
6,195,647 B1 2/2001 Martyn et al.
6,226,623 B1 5/2001 Schein et al.
6,233,566 B1 5/2001 Levine et al.
6,236,972 B1 5/2001 Shkedy
6,236,977 B1 5/2001 Verba et al.
6,243,670 B1 6/2001 Bessho et al.
6,260,021 B1 7/2001 Wong et al.
6,263,321 B1 7/2001 Daughtery, III
6,263,335 B1 7/2001 Paik et al.
6,266,683 B1 7/2001 Yehuda et al.
6,272,474 B1 8/2001 Garcia
6,275,229 B1 8/2001 Weiner et al.
6,278,982 B1 8/2001 Korhammer et al.
6,282,537 B1 8/2001 Madnick et al.
6,285,986 B1 9/2001 Andrews
6,285,989 B1 9/2001 Shoham
6,304,858 B1 10/2001 Mosler et al.
6,313,854 B1 11/2001 Gibson
6,317,726 B1 11/2001 O'Shaughnessy
6,317,728 B1 11/2001 Kane
6,321,212 B1 11/2001 Lange
6,323,881 B1 11/2001 Broulik et al.
6,332,163 B1 12/2001 Bowman-Amuah
6,338,055 B1 1/2002 Hagmann et al.
6,338,068 B1 1/2002 Moore et al.
6,338,074 B1 * 1/2002 Poindexter .................. 707/500
6,343,287 B1 1/2002 Kumar et al.
6,347,307 B1 2/2002 Sandhu et al.
6,349,291 B1 2/2002 Varma
6,356,933 B2 3/2002 Mitchell et al.
6,360,210 B1 3/2002 Wallman
6,366,908 B1 4/2002 Chong et al.
6,381,585 B1 4/2002 Maples et al.
6,381,586 B1 4/2002 Glasserman et al.
6,385,660 B2 5/2002 Griesemer et al.
6,389,413 B2 5/2002 Takahashi et al.
6,389,452 B1 5/2002 Glass
6,401,080 B1 6/2002 Bigus et al.
6,408,282 B1 6/2002 Buist
6,418,417 B1 7/2002 Corby et al.
6,421,653 B1 7/2002 May
6,424,980 B1 7/2002 Iizuka et al.
6,429,868 B1 8/2002 Dehner, Jr. et al.
6,442,528 B1 * 8/2002 Notani .......................... 705/9
6,442,545 B1 8/2002 Feldman et al.
6,446,110 B1 9/2002 Lection et al.
6,457,066 B1 9/2002 Mein et al.
6,460,021 B1 10/2002 Kirksey
6,480,882 B1 11/2002 McAdam et al.
6,489,954 B1 12/2002 Powlette
6,490,584 B2 12/2002 Barrett et al.
6,493,681 B1 12/2002 Tertitski et al.
6,510,406 B1 1/2003 Marchisio
6,516,303 B1 2/2003 Wallman
6,516,308 B1 2/2003 Cohen
6,523,022 B1 2/2003 Hobbs
6,556,987 B1 4/2003 Brown et al.
6,564,250 B1 5/2003 Nguyen
6,581,056 B1 6/2003 Rao
6,581,062 B1 6/2003 Draper et al.
6,598,028 B1 7/2003 Sullivan et al.
6,601,044 B1 7/2003 Wallman
6,611,825 B1 8/2003 Billheimer et al.
6,615,187 B1 9/2003 Ashenmil et al.
6,629,097 B1 9/2003 Keith
6,631,373 B1 10/2003 Otani et al.
6,633,868 B1 10/2003 Min et al.
2001/0011241 A1 8/2001 Nemzow
2001/0011242 A1 8/2001 Allex et al.
2001/0018674 A1 8/2001 Schein et al.
2001/0025264 A1 9/2001 Deaddio et al.
2001/0032217 A1 10/2001 Huang
2001/0042034 A1 11/2001 Elliott
2001/0043235 A1 11/2001 Best et al.
2001/0044771 A1 11/2001 Usher et al.
2001/0056398 A1 12/2001 Scheirer
2002/0002530 A1 1/2002 May
2002/0004777 A1 1/2002 Foster et al.
2002/0007335 A1 1/2002 Millard et al.
2002/0007358 A1 1/2002 Johnson et al.
2002/0013753 A1 1/2002 Marks de Chabris et al.
2002/0013862 A1 1/2002 Orchard et al.
2002/0016762 A1 2/2002 Feilbogen et al.
2002/0016819 A1 2/2002 Sugimoto et al.
2002/0018077 A1 2/2002 Powlette

| | | | |
|---|---|---|---|
| 2002/0022956 | A1 | 2/2002 | Ukranincsky et al. |
| 2002/0023053 | A1 | 2/2002 | Szoc et al. |
| 2002/0026405 | A1 | 2/2002 | Haar |
| 2002/0026449 | A1 | 2/2002 | Azencott |
| 2002/0026462 | A1 | 2/2002 | Shotton, Jr. et al. |
| 2002/0029183 | A1 | 3/2002 | Vlahoplus et al. |
| 2002/0032644 | A1 | 3/2002 | Corby et al. |
| 2002/0035561 | A1 | 3/2002 | Archer et al. |
| 2002/0042767 | A1 | 4/2002 | Kwan |
| 2002/0049666 | A1 | 4/2002 | Reuter et al. |
| 2002/0054115 | A1 | 5/2002 | Mack et al. |
| 2002/0059141 | A1 | 5/2002 | Davies et al. |
| 2002/0065752 | A1 | 5/2002 | Lewis |
| 2002/0065755 | A1 | 5/2002 | Shlafman et al. |
| 2002/0069157 | A1 | 6/2002 | Jordan |
| 2002/0073007 | A1 | 6/2002 | Ayache |
| 2002/0078253 | A1 | 6/2002 | Szondy et al. |
| 2002/0087373 | A1 | 7/2002 | Dickstein et al. |
| 2002/0087454 | A1 | 7/2002 | Calo et al. |
| 2002/0087455 | A1 | 7/2002 | Tsagarakis et al. |
| 2002/0087457 | A1 | 7/2002 | Madeley et al. |
| 2002/0099646 | A1 | 7/2002 | Agarwal et al. |
| 2002/0099656 | A1 | 7/2002 | Poh Wong |
| 2002/0112056 | A1 | 8/2002 | Baldwin et al. |
| 2002/0123947 | A1 | 9/2002 | Yuste et al. |
| 2002/0130868 | A1 | 9/2002 | Smith |
| 2002/0138390 | A1 | 9/2002 | May |
| 2002/0147671 | A1 | 10/2002 | Sloan et al. |
| 2002/0152154 | A1 | 10/2002 | Rothman et al. |
| 2002/0152156 | A1 | 10/2002 | Tyson-Quah |
| 2002/0156658 | A1 | 10/2002 | Selesny et al. |
| 2002/0161692 | A1 | 10/2002 | Loh et al. |
| 2002/0161853 | A1 | 10/2002 | Burak et al. |
| 2002/0169707 | A1 | 11/2002 | Koek et al. |
| 2002/0174043 | A1 | 11/2002 | Gilbert et al. |
| 2002/0178096 | A1 | 11/2002 | Marshall |
| 2002/0184132 | A1 | 12/2002 | Foster |
| 2002/0184237 | A1 | 12/2002 | McFeely |
| 2002/0194097 | A1 | 12/2002 | Reitz |
| 2002/0194114 | A1 | 12/2002 | Erdmier |
| 2003/0004942 | A1 | 1/2003 | Bird |
| 2003/0009411 | A1 | 1/2003 | Ram et al. |
| 2003/0018558 | A1 | 1/2003 | Heffner et al. |
| 2003/0018714 | A1 | 1/2003 | Mikhailov et al. |
| 2003/0033212 | A1 | 2/2003 | Sandhu et al. |
| 2003/0037174 | A1 | 2/2003 | Lavin et al. |
| 2003/0065594 | A1 | 4/2003 | Murphy |
| 2003/0066025 | A1 | 4/2003 | Garner et al. |
| 2003/0066032 | A1 | 4/2003 | Ramachandran et al. |
| 2003/0078869 | A1 | 4/2003 | Williams |
| 2003/0088496 | A1 | 5/2003 | Piotrowski |
| 2003/0093360 | A1 | 5/2003 | May |
| 2003/0093362 | A1 | 5/2003 | Tupper et al. |
| 2003/0093565 | A1 | 5/2003 | Berger et al. |
| 2003/0105981 | A1 | 6/2003 | Miller et al. |
| 2003/0115122 | A1 | 6/2003 | Slater et al. |
| 2003/0126063 | A1 | 7/2003 | Reuter |
| 2003/0126068 | A1 | 7/2003 | Hauk et al. |
| 2003/0126069 | A1 | 7/2003 | Cha |
| 2003/0126117 | A1 | 7/2003 | Megiddo et al. |
| 2003/0140035 | A1 | 7/2003 | Burrows |
| 2003/0149653 | A1 | 8/2003 | Penney |
| 2003/0154071 | A1 | 8/2003 | Shreve |
| 2003/0158949 | A1 | 8/2003 | Miller et al. |
| 2003/0188255 | A1 | 10/2003 | Shimizu et al. |
| 2003/0220861 | A1 | 11/2003 | Broms et al. |
| 2003/0220868 | A1 | 11/2003 | May |
| 2003/0233459 | A1 | 12/2003 | Miller et al. |
| 2003/0236862 | A1 | 12/2003 | Miller et al. |
| 2003/0236957 | A1 | 12/2003 | Miller et al. |
| 2004/0064397 | A1 | 4/2004 | Lynn et al. |
| 2004/0078248 | A1 | 4/2004 | Altschuler |
| 2004/0103003 | A1 | 5/2004 | Mayers et al. |
| 2004/0148247 | A1 | 7/2004 | Miller et al. |
| 2004/0162775 | A1 | 8/2004 | Winklevoss et al. |
| 2004/0167850 | A1 | 8/2004 | Dreyer et al. |
| 2004/0220885 | A1 | 11/2004 | Salzmann et al. |
| 2004/0225596 | A1 | 11/2004 | Kemper et al. |
| 2005/0060256 | A1 | 3/2005 | Peterson et al. |
| 2005/0086170 | A1 | 4/2005 | Rao |

FOREIGN PATENT DOCUMENTS

| | | |
|---|---|---|
| WO | WO 98/43170 | 10/1998 |
| WO | WO 01/20530 | 3/2001 |
| WO | WO 01/37540 | 5/2001 |
| WO | WO 01/57716 | 8/2001 |
| WO | WO 01/59670 | 8/2001 |
| WO | WO 02/03774 | 1/2002 |
| WO | WO 02/14991 | 2/2002 |
| WO | WO 02/054189 | 7/2002 |
| WO | WO 02/056146 | 7/2002 |
| WO | WO 02/063516 | 8/2002 |
| WO | WO 02/065278 | 8/2002 |
| WO | WO 02/065286 | 8/2002 |
| WO | WO 03/012588 | 2/2003 |
| WO | WO 03/030013 | 4/2003 |
| WO | WO 03/032158 | 4/2003 |
| WO | WO 03/065256 | 8/2003 |
| WO | WO 03/102733 | 12/2003 |

OTHER PUBLICATIONS

FDIC—FIL—109—99 Dec. 13, 1999.*
International Search Report dated Jun. 28, 2001.
Manco et al., A Framework For Adaptive Mail Classification, 14th IEEE Conference on Tools with Artificial Intelligence (ICTAI'02), Nov. 4, 2002, p. 387.
Silverman, A new strategy for giving away your money, Wall Street Journal, D1, Oct. 6, 2004.
Czejdo, Automatic generation ontology based anntations in XML and their use in retrieval systems, Web Information Systems Engineering, 2000, Proceedings of the First International Conference, Jun. 19, 2000, p. 296.
Novell, Inc., Beginning of Viewing Information and Viewing Basic Information about a print job.
Block Trades Market Practice, Apr. 1, 2003, pp. 1-10.
Chacko, Cephalon, Inc. Taking Risk Management Gherory Seriously.
Kus, Contingent capital: just in the capital management sets a new standard; Sponsored statement.
Electronic Trading Tools.
Martin, Email REport, Issue 11, Aug. 16, 2001, printed Aug. 2, 2005.
Fast Email Extractor 4.4.
Form 10-K, United States Securities and Exchange Commission, no date,year ending Dec. 31, 2003.
PILA, In Case Of Emergency; contingent capital.
Intellseek and Inxight Partner to Provide New Business Intelligence Solutions, www.inxight.com/news/021029_intelliseek.html, Oct. 29, 2002.
Unknown, Investigating Systems.
May, Modeling and Querying Structure and Contents of the Web, 10th International Workshop on Database & Amp; Expert Systems Applications, Sep. 1, 1999, p. 721.
Rupali et al., Phrase-based Text Representation for Managing the Web Documents.
Lam et al., Querying Web Data-The WebQA Approach.
Rising to the challenge of global STP, Euromoney Publications PLC Global Inventor, Nov. 1, 1999, pp. 51-52; Issn. 0951-3604.
STP in the Bond Market?, Wall Street & Technology, Dec. 1, 2002, p. 20.
Ericson, Softwerc releases patent-pending.
IBM Corp., Strict Read Order Control for a Queing System.
Carchiolo et al., Structing the Web.
Witten et al., Text Mining: A New Frontier for Lossless Compression.

Fan et al., The Internet and Future Financial Markets; Industry Trend or Event, Association for Computing Machinery, Inc., Sec. 11, vol. 43; Nov. 1, 2000, p. 82; Issn: 0001-0782.
Emery, et al., The Measurement of Liquidity, Journal of Accounting Research, vol. 20, No. 2, Part 1, pp. 290-303, Autumn 1982.
Calado, The Web-DL Environment for Building Digital Libraries from the Web.
Ribiero-Neto et al., Top Down Extraction of Semi-Structured Data, String Processing and Information Retrieval Symposium & amp.
Roberts, Top Priority on Bottom Line: More Companies Seeting to Manage Business Risks.
TradeWeb's STP vision, Euromoney Institutional Investor PLC, Sec. 406, vol. 34, Feb. 1, 2003, p. S6; Issn: 0014-2433.
Elkayam, Using Indexed Bonds.
Elkayam, With Standard XML Technologies.
Hewlett-Packard, x4queview.org.

* cited by examiner

ORION--DISPLAY 1/<MAIN SUBJECT AREA>

TEMP

DEALNBR: VARCHAR2(10)
NAME:VARCHAR2(255)
PRICINGDATE:DATE
CLOSINGDATE:DATE
CUTOFFDATE:DATE
FIRSTPAYDATE:DATE
CALLOPTCOLLATPCT:NUMBER(17,11)
CALLOPTBONDPCT:NUMBER(17,11)
BONDPAYFREQ:NUMBER(3)
UNDERWRITER:VARCHAR2(30)
UNDERWRITERCONTACT:VARCHAR2(30)
UNDERWRITERPHONE:VARCHAR2(14)
UNDERWRITERFAX:VARCHAR2(14)
UNDERWRITERREMAIL:VARCHAR2(50)
ISSUER:VARCHAR2(30)
ISSUERCONTACT:VARCHAR2(30)
ISSUERPHONE:VARCHAR2(14)
ISSUERFAX:VARCHAR2(14)
ISSUEREMAIL:VARCHAR2(50)
TRUSTEE:VARCHAR2(30)
TRUSTEECONTACT:VARCHAR2(30)
TRUSTEEPHONE:VARCHAR2(14)
TRUSTEEFAX:VARCHAR2(14)
TRUSTEEEMAIL:VARCHAR2(50)
ANALYST:VARCHAR2(30)
ANALYSTCONTACT:VARCHAR2(30)
ANALYSTPHONE:VARCHAR2(14)
ANALYSTFAX:VARCHAR2(14)
ANALYSTEMAIL:VARCHAR2(50)
BONDADMIN:VARCHAR2(30)
BONDADMINCONTACT:VARCHAR2(30)
BONDADMINPHONE:VARCHAR2(14)
BONDADMINFAX:VARCHAR2(14)
BONDADMINEMAIL:VARCHAR2(50)
TAXADMIN:VARCHAR2(30)
TAXADMINCONTACT:VARCHAR2(30)
TAXADMINPHONE:VARCHAR2(14)
TAXADMINFAX:VARCHAR2(14)
TAXADMINEMAIL:VARCHAR2(50)
RULES:LONG
STRUCTTYPE:NUMBER(3)
IRSCENTER:VARCHAR2(50)
PERCENT7701:VARCHAR2(10)
PERCENT856:VARCHAR2(10)
ORIGAIP:NUMBER(14,2)
AFR:NUMBER(17,11)
COLLATDETAIL:NUMBER(17,11)
PRICINGSCENARIO:VARCHAR2(25)
TAKEOVERDATE:DATE
BONDSTRIP1286:NUMBER(17,11)
SERVICER:VARCHAR2(30)
SERVICERCONTACT:VARCHAR2(30)
SERVICERPHONE:VARCHAR2(14)
SERVICERFAX:VARCHAR2(14)
SERVICEREMAIL:VARCHAR2(50)
TRUSTEEADDRESS:VARCHAR2(50)
TRUSTEECITY:VARCHAR2(20)
TRUSTEESTATE:VARCHAR2(2)
TRUSTEEZIP:VARCHAR2(10)
RUNTAX:NUMBER(1)
RUNMP:NUMBER(1)
BONDACCRUALPER:NUMBER(2)
COLLATINPVUSED:NUMBER(2)
MIDTIERAGG:NUMBER(2)
NONSTANDARDOPTIONS:NUMBER(14)
REMITRATE:NUMBER(17,11)
RECORDDATE:DATE

LOANHISTORY_RESTATE

DEALNBR:VARCHAR2(10)
GROUPNBR:NUMBER(6)
LOANNBR:VARCHAR2(25)
PAYDATE:DATE
RESTATENBR:NUMBER(3)
PROSPECTUSID:VARCHAR2(10)
CURBEGSCHEDBAL:NUMBER(14,2)
CURRENDSCHEDBAL:NUMBER(14,2)
PAIDTODATE:DATE
CURRIDXRATE:NUMBER(17,11)
CURRNOTERATE:NUMBER(17,11)
MATURITYDATE:DATE
SERVICERFEERATE:NUMBER(17,11)
STRIPRATE1:NUMBER(17,11)
STRIPRATE2:NUMBER(17,11)
STRIPRATE3:NUMBER(17,11)
STRIPRATE4:NUMBER(17,11)
STRIPRATE5:NUMBER(17,11)
NETPASSTHRURATE:NUMBER(17,11)
NEXTIDRATE:NUMBER(17,11)
NEXTNOTERATE:NUMBER(17,11)
NEXTRATEADJDATE:DATE
NEXTPMTADJDATE:DATE
SCHEDPRINAMT:NUMBER(14,2)
TOTALSCHEDPIDUE:NUMBER(14,2)
NEGAMDEFIMTAMT:NUMBER(14,2)
UNSCHEDPRINCOLLAT:NUMBER(14,2)
OTHERPRINADJ:NUMBER(14,2)
LIQPREMTDATE:DATE
PREPMTPENYLDRCVD:NUMBER(14,2)
PREPMTINEXCESS:NUMBER(14,2)
LIQPREPMTCODE:NUMBER(2)
MOSTRECENTASERPCT:NUMBER(17,11)
MOSTRECENTASERDATE:DATE
CUMULATIVEASERAMT:NUMBER(14,2)
ACTUALBAL:NUMBER(14,2)
TOTALPIADOUTSTD:NUMBER(14,2)
TOTALIADVOUTSTD:NUMBER(14,2)
OTHEREXPADVOUTSTD:NUMBER(14,2)
LOANSTATUS:NUMBER(2)
BANKRUPTCY:NUMBER(3)
FORECLOSUREDATE:DATE
REODATE:DATE
BANKRUPTCYDATE:DATE
NETPROCEEDSRCVDONLIQ:NUMBER(14,2)
LIQEXP:NUMBER(14,2)
REALIZEDLOSSTOTRUST:NUMBER(14,2)
LASTMODDATE:DATE
MODCODE:NUMBER(2)
MODNOTERATE:NUMBER(17,11)
MODPMTRATE:NUMBER(17,11)
PRECEDINGFYREV:NUMBER(14,2)
PRECEDINGFYEXP:NUMBER(14,2)
PRECEDINGFYNOI:NUMBER(14,2)
PRECEDINGFYDEBTSRVCAMT:NUMBER(14,2)
PRECEDINGFYDSCR:NUMBER(14,2)
PRECEDINGFYPHYSOCC:NUMBER(14,2)
PRECEDINGFYFINASOFDATE:DATE
SECPRECEDINGFYREV:NUMBER(14,2)
SECPRECEDINGFYEXP:NUMBER(14,2)
SECPRECEDINGFYNOI:NUMBER(14,2)
SECPRECEDINGFYDBTSRVC:NUMBER(14,2)
SECPRECEDINGFYDSCR:NUMBER(14,2)
SECPRECEDINGFYFINASOFDATE:DATE
SECPRECEDINGFYPHYSOCC:NUMBER(14,2)
MOSTRECENTFYTDREV:NUMBER(14,2)
MOSTRECENTFYTDEXP:NUMBER(14,2)
MOSTRECENTFYTDNOI:NUMBER(14,2)
MOSTRECENTFYTDDBTSRVC:NUMBER(14,2)
MOSTRECENTFYTDDSCR:NUMBER(14,2)

LRPS_LOANHISTORY

DEALNBR:VARCHAR2(1)
GROUPNBR:NUMBER(6)
LOANNBR:VARCHAR2(25)
PAYDATE:DATE
PROSPECTUSID:VARCHAR2(10)
CURBEGSCHEDBAL:NUMBER(14,2)
CURRENDSCHEDBAL:NUMBER(14,2)
PAIDTODATE:DATE
CURRIDXRATE:NUMBER(17,11)
CURRNOTERATE:NUMBER(17,11)
MATURITYDATE:DATE
SERVICEFEERATE:NUMBER(17,11)
STRIPRATE1:NUMBER(17,11)
STRIPRATE2:NUMBER(17,11)
STRIPRATE3:NUMBER(17,11)
STRIPRATE4:NUMBER(17,11)
STRIPRATE5:NUMBER(17,11)
NETPASSTHRURATE:NUMBER(17,11)
NEXTIDRATE:NUMBER(17,11)
NEXTNOTERATE:NUMBER(17,11)
NEXTRATEADJDATE:DATE
NEXTPMTADJDATE:DATE
SCHEDPRINAMT:NUMBER(14,2)
TOTALSCHEDPIDUE:NUMBER(14,2)
NEGAMDEFINAMT:NUMBER(14,2)
UNSCHEDPRINCOLLAT:NUMBER(14,2)
OTHERPRINADJ:NUMBER(14,2)
LIQPREPMTDATE:DATE
PREPMTPENYLDRCVD:NUMBER(14,2)
PREPMTINEXCESS:NUMBER(14,2)
LIQPREPMTCODE:NUMBER(2)
MOSTRECENTASERPCT:NUMBER(17,11)
MOSTRECENTASERDATE:DATE
CUMULATIVEASERAMT:NUMBER(14,2)
ACTUALBAL:NUMBER(14,2)
TOTALPIADVOUTSTD:NUMBER(14,2)
TOTALIADOUTSTD:NUMBER(14,2)
OTHEREXPADVOUTSTD:NUMBER(14,2)
LOANSTATUS:NUMBER(2)
BANKRUPTCY:NUMBER(3)
FORCLOSUREDATE:DATE
REODATE:DATE
BANKRUPTCYDATE:DATE
NETPROCEEDSSRCVDONLIQ:NUMBER(14,2)
LIQEXP:NUMBER(14,2)
REALIZEDLOSSTOTRUST:NUMBER(14,2)
LASTMODDATE:DATE
MODCODE:NUMBER(2)
MODNOTERATE:NUMBER(17,11)
MODPMTRATE:NUMBER(17,11)
PRECEDINGFYREV:NUMBER(14,2)
PRECEDINGFYEXP:NUMBER(14,2)
PRECEDINGFYNOI:NUMBER(14,2)
PRECEDINGFYDEBTSRVCAMT:NUMBER(14,2)
PRECEDINGFYDSCR:NUMBER(14,2)
PRECEDINGFYPHYSOCC:NUMBER(14,2)
PRECEDINGFYFINASOFDATE:DATE
SECPRECEDINGFYREV:NUMBER(14,2)
SECPRECEDINGFYEXP:NUMBER(14,2)
SECPRECEDINGFYNOI:NUMBER(14,2)
SECPRECEDINGFYDBTSRVC:NUMBER(14,2)
SECPRECEDINGFYDSCR:NUMBER(14,2)
SECPRECEDINGFYFINASOFDATE:DATE
SECPRECEDINGFYPHYSOCC:NUMBER(14,2)
MOSTRECENTFYTDREV:NUMBER(14,2)
MOSTRECENTFYTDEXP:NUMBER(14,2)
MOSTRECENTFYTDNOI:NUMBER(14,2)
MOSTRECENTFYDDBTSRVC:NUMBER(14,2)
MOSTRECENTFYTDDSCR:NUMBER(14,2)

FIG. 5G 1,3 / 3,3 -- 3:10:05 PM, 8/26/99

ORION -- DISPLAY 1/ <MAIN SUBJECT AREA>

PLAN_TABL

STATEMENT_ID:VARCHAR2(30)
TIMESTAMP:DATE
REMARKS:VARCHAR2(80)
OPERATION:VARCHAR2(30)
OPTIONS:VARCHAR2(30)
OBJECT_NODE:VARCHAR(128)
OBJECT_OWNER:VARCHAR2(30)
OBJECT_NAME:VARCHAR2(30)
OBJECT_INSTANCE:VARCHAR2(30)
OBJECT_TYPE:VARCHAR2(30)
OPTIMIZER:VARCHAR2(255)
SEARCH_COLUMNS:NUMBER
ID:NUMBER
PARENT_ID:NUMBER
POSITION:NUMBER
COST:NUMBER
CARDINALITY:NUMBER
BYTES:NUMBER
OTHER_TAG:VARCHAR2(255)
PARTITION_START:VARCHAR2(255)
PARTITION_STOP:VARCHAR2(255)
PARTITION_ID:NUMBER
OTHER:LONG

INVEST_FIRST

SEQ_NBR:NUMBER
TYPEOUT:CHAR(1)
RECID:NUMBER
PAGENUM:NUMBER
DEALNBR:VARCHAR2(10)
PAYDATE:DATE
NAME1:VARCHAR2(200)
NAME2:VARCHAR2(200)
NAME3:VARCHAR2(200)
NAME4:VARCHAR2(200)
NAME5:VARCHAR2(200)
NAME6:VARCHAR2(200)
NAME7:VARCHAR2(200)
NAME8:VARCHAR2(200)
NAME9:VARCHAR2(200)
VALUCOM:VARCHAR2(30)
TYPEREC:CHAR(1)
TYPEB:CHAR(1)

INVEST_ACC

TYPEOUT:VARCHAR2(1)
RECID:NUMBER
PAGENUM:NUMBER
SORTORDER:NUMBER(8,3)
TIER:CHAR(1)
NAME1:VARCHAR2(200)
NAME2:VARCHAR2(200)
NAME3:VARCHAR2(200)
NAME4:VARCHAR2(200)
NAME5:VARCHAR2(200)
NAME6:VARCHAR2(200)
NAME7:VARCHAR2(200)
NAME8:VARCHAR2(200)
NAME9:VARCHAR2(200)
VALUE1:VARCHAR2(30)
VALUE2:VARCHAR2(30)
VALUE3:VARCHAR(30)
VALUE4:VARCHAR2(30)
TYPEREC:CHAR(1)

FIG. 5J

MOSTRECENTFYDDSCR:NUMBER(14,2)
MOSTRECENTFYTDPHYSOCC:NUMBER(14,2)
MOSTRECENTFYDSTARTDATE:DATE
MOSTRECENTFYTDENDDATE:DATE
MOSTRECENTAPPRAISALDATE:DATE
MOSTRECENTAPPRAISALVAL:NUMBER(14,2)
WORKOUTSTRATCODE:NUMBER(14,2)
MOSTRECENTSPECSRVCTRASDATE:DATE
MOSTRECENTMSTRSRVCRETDATE:DATE
EXPECTDRESOLVEDATE:DATE
YRLASTRENOVATED:DATE
YLDMAINTCHG:NUMBER(14,2)
YLDRATE:NUMBER(17,11)
PROPINSPECDATE:DATE
SPECSRVCCOMMENTS:VARCHAR2(255)
FINSTMNTDATE:DATE
NUMMTHSREVANNUALIZED:NUMBER(3)
OUTPROPPROTADV:NUMBER(14,2)
CURRPIADVCODE:NUMBER(2)
RECDELINQ:NUMBER(14,2)
CURTAILDATE:DATE
LOANCNTBEG:NUMBER(6)
LOANCNTEND:NUMBER(6)
CURTAILAMT:NUMBER(14,2)
PAIDINFULL:NUMBER(1)
REPURCHASEDPRIN:NUMBER(14,2)
REPURCHASEDINT:NUMBER(14,2)
NO30DAYDELINQ:NUMBER(6)
BAL30DAYDELINQ:NUMBER(14,2)
NO60DAYDELINQ:NUMBER(6)
BAL60DELINQ:NUMBER(14,2)
NO90DAYDELINQ:NUMBER(6)
BAL90DAYDELINQ:NUMBER(14,2)
NO120DAYDELINQ:NUMBER(6)
BAL120DAYDELINQ:NUMBER(14,2)
NOOFFERCLOSURES:NUMBER(6)
BALOFFORCLOSURE:NUMBER(14,2)
NOOFREO:NUMBER(6)
BALOFREO:NUMBER(14,2)
DELINQPRIN:NUMBER(14,2)
DELINQINT:NUMBER(14,2)
ADVPRIN:NUMBER(14,2)
ADVINT:NUMBER(14,2)
PPIS:NUMBER(14,2)
OTHER1:NUMBER(24,10)
OTHER2:NUMBER(24,10)
OTHER3:NUMBER(24,10)
OTHER4:NUMBER(24,10)
OTHER5:NUMBER(24,10)
OTHER6:NUMBER(24,10)
OTHER7:NUMBER(24,10)
OTHER8:NUMBER(24,10)
OTHER9:NUMBER(24,10)
OTHER10:NUMBER(24,10)
OTHER11:NUMBER(24,10)
OTHER12:NUMBER(24,10)
OTHER13:NUMBER(24,10)
OTHER14:NUMBER(24,10)
OTHER15:NUMBER(24,10)
REMTERM:NUMBER(3)
INSPROCEEDS:NUMBER(14,2)
RELACTSHORTFALL:NUMBER(14,2)
PAYOFFINTAMT:NUMBER(14,2)
PAYOFFPRINAMT:NUMBER(14,2)
INSURERDEFAULT:NUMBER(1)
SERVICERDEFAULT:NUMBER(1)
BONDSARECALLED:NUMBER(1)
SCHEDNETINT:NUMBER(14,2)
SCHEDGROSSINT:NUMBER(14,2)
OTHER16:NUMBER(24,10)
OTHER17:NUMBER(24,10)
OTHER18:NUMBER(24,10)
OTHER19:NUMBER(24,10)
OTHER20:NUMBER(24,10)
OTHER21:NUMBER(24,10)
OTHER22:NUMBER(24,10)
OTHER23:NUMBER(24,10)
OTHER24:NUMBER(24,10)
OTHER25:NUMBER(24,10)
OTHER26:NUMBER(24,10)
OTHER27:NUMBER(24,10)

MOSTRECENTFYDDSCR:NUMBER(14,2)
MOSTRECENTFYTDPHYSOCC:NUMBER(14,2)
MOSTRECENTFYDSTARTDATE:DATE
MOSTRECENTFYTDENDDATE:DATE
MOSTRECENTAPPRAISALDATE:DATE
MOSTRECENTAPPRAISALVAL:NUMBER(14,2)
WORKOUTSTRATCODE:NUMBER(14,2)
MOSTRECENTSPECSRVCTRASDATE:DATE
MOSTRECENTMSTRSRVCRETDATE:DATE
EXPECTDRESOLVEDATE:DATE
YRLASTRENOVATED:DATE
YLDMAINTCHG:NUMBER(14,2)
YLDRATE:NUMBER(17,11)
PROPINSPECDATE:DATE
SPECSRVCCOMMENTS:VARCHAR2(255)
FINSTMNTDATE:DATE
NUMMTHSREVANNUALIZED:NUMBER(3)
OUTPROPPROTADV:NUMBER(14,2)
CURRPIADVCODE:NUMBER(2)
RECDELINQ:NUMBER(14,2)
CURTAILDATE:DATE
LOANCNTBEG:NUMBER(6)
LOANCNTEND:NUMBER(6)
CURTAILAMT:NUMBER(14,2)
PAIDINFULL:NUMBER(1)
REPURCHASEDPRIN:NUMBER(14,2)
REPURCHASEDINT:NUMBER(14,2)
NO30DAYDELINQ:NUMBER(6)
BAL30DAYDELINQ:NUMBER(14,2)
NO60DAYDELINQ:NUMBER(6)
BAL60DELINQ:NUMBER(14,2)
NO90DAYDELINQ:NUMBER(6)
BAL90DAYDELINQ:NUMBER(14,2)
NO120DAYDELINQ:NUMBER(6)
BAL120DAYDELINQ:NUMBER(14,2)
NOOFFERCLOSURES:NUMBER(6)
BALOFFORCLOSURE:NUMBER(14,2)
NOOFREO:NUMBER(6)
BALOFREO:NUMBER(14,2)
DELINQPRIN:NUMBER(14,2)
DELINQINT:NUMBER(14,2)
ADVPRIN:NUMBER(14,2)
ADVINT:NUMBER(14,2)
PPIS:NUMBER(14,2)
OTHER1:NUMBER(24,10)
OTHER2:NUMBER(24,10)
OTHER3:NUMBER(24,10)
OTHER4:NUMBER(24,10)
OTHER5:NUMBER(24,10)
OTHER6:NUMBER(24,10)
OTHER7:NUMBER(24,10)
OTHER8:NUMBER(24,10)
OTHER9:NUMBER(24,10)
OTHER10:NUMBER(24,10)
OTHER11:NUMBER(24,10)
OTHER12:NUMBER(24,10)
OTHER13:NUMBER(24,10)
OTHER14:NUMBER(24,10)
OTHER15:NUMBER(24,10)
REMTERM:NUMBER(3)
INSPROCEEDS:NUMBER(14,2)
RELACTSHORTFALL:NUMBER(14,2)
PAYOFFINTAMT:NUMBER(14,2)
PAYOFFPRINAMT:NUMBER(14,2)
INSURERDEFAULT:NUMBER(1)
SERVICERDEFAULT:NUMBER(1)
BONDSARECALLED:NUMBER(1)
SCHEDNETINT:NUMBER(14,2)
SCHEDGROSSINT:NUMBER(14,2)
OTHER16:NUMBER(24,10)
OTHER17:NUMBER(24,10)
OTHER18:NUMBER(24,10)
OTHER19:NUMBER(24,10)
OTHER20:NUMBER(24,10)
OTHER21:NUMBER(24,10)
OTHER22:NUMBER(24,10)
OTHER23:NUMBER(24,10)
OTHER24:NUMBER(24,10)
OTHER25:NUMBER(24,10)
OTHER26:NUMBER(24,10)
OTHER27:NUMBER(24,10)
OTHER28:NUMBER(24,10)

2,3 / 3,3 -- 3:10:05 PM, 8/26/99

ORION--DISPLAY 1/<MAIN SUBJECT AREA>

DEALSETUPTEMP

DEALNBR: VARCHAR2(10)
NAME:VARCHAR2(255)
PRICINGDATE:DATE
CLOSINGDATE:DATE
CUTOFFDATE:DATE
FIRSTPAYDATE:DATE
CALLOPTCOLLATPCT:NUMBER(17,11)
CALLOPTBONDPCT:NUMBER(17,11)
BONDPAYFREQ:NUMBER(3)
UNDERWRITER:VARCHAR2(30)
UNDERWRITERCONTACT:VARCHAR2(30)
UNDERWRITERPHONE:VARCHAR2(14)
UNDERWRITERFAX:VARCHAR2(14)
UNDERWRITERREMAIL:VARCHAR2(50)
ISSUER:VARCHAR2(30)
ISSUERCONTACT:VARCHAR2(30)
ISSUERPHONE:VARCHAR2(14)
ISSUERFAX:VARCHAR2(14)
ISSUEREMAIL:VARCHAR2(50)
TRUSTEE:VARCHAR2(30)
TRUSTEECONTACT:VARCHAR2(30)
TRUSTEEPHONE:VARCHAR2(14)
TRUSTEEFAX:VARCHAR2(14)
TRUSTEEEMAIL:VARCHAR2(50)
ANALYST:VARCHAR2(30)
ANALYSTCONTACT:VARCHAR2(30)
ANALYSTPHONE:VARCHAR2(14)
ANALYSTFAX:VARCHAR2(14)
ANALYSTEMAIL:VARCHAR2(50)
BONDADMIN:VARCHAR2(30)
BONDADMINCONTACT:VARCHAR2(30)
BONDADMINPHONE:VARCHAR2(14)
BONDADMINFAX:VARCHAR2(14)
BONDADMINEMAIL:VARCHAR2(50)
TAXADMIN:VARCHAR2(30)
TAXADMINCONTACT:VARCHAR2(30)
TAXADMINPHONE:VARCHAR2(14)
TAXADMINFAX:VARCHAR2(14)
TAXADMINEMAIL:VARCHAR2(50)
RULES:LONG
STRUCTTYPE:NUMBER(3)
IRSCENTER:VARCHAR2(50)
PERCENT7701:VARCHAR2(10)
PERCENT856:VARCHAR2(10)
ORIGAIP:NUMBER(14,2)
AFR:NUMBER(17,11)
COLLATDETAIL:NUMBER(17,11)
PRICINGSCENARIO:VARCHAR2(25)
TAKEOVERDATE:DATE
BONDSTRIP1286:NUMBER(17,11)
SERVICER:VARCHAR2(30)
SERVICERCONTACT:VARCHAR2(30)
SERVICERPHONE:VARCHAR2(14)
SERVICERFAX:VARCHAR2(14)
SERVICEREMAIL:VARCHAR2(50)
TRUSTEEADDRESS:VARCHAR2(50)
TRUSTEECITY:VARCHAR2(20)
TRUSTEESTATE:VARCHAR2(2)
TRUSTEEZIP:VARCHAR2(10)
RUNTAX:NUMBER(1)
RUNMP:NUMBER(1)
BONDACCRUALPER:NUMBER(2)
COLLATINPVUSED:NUMBER(2)
MIDTIERAGG:NUMBER(2)
NONSTANDARDOPTIONS:NUMBER(14)
REMITRATE:NUMBER(17,11)
RECORDDATE:DATE

OTHER27:NUMBER(24,10)
OTHER28:NUMBER(24,10)
OTHER29:NUMBER(24,10)
OTHER30:NUMBER(24,10)
SUBSTAMPTPRIN:NUMBER(14,2)
SUMBSTAMTINT:NUMBER(14,2)
SUBSTBALANCE:NUMBER(14,2)
BALLOONLNSNUM:NUMBER(6)
BALLOONLNSBAL:NUMBER(14,2)
BANKRUPTCYNUM:NUMBER(6)
BANKRUPTCYBAL:NUMBER(14,2)
CRAMDOWNLOSSES:NUMBER(14,2)
REINVESTINCOME:NUMBER(14,2)
REPURCHASENUM:NUMBER(6)
REPURCHASEBAL:NUMBER(14,2)
SPECHAZLOSSAMT:NUMBER(14,2)
ACTUALSERVFEE:NUMBER(14,2)
LIQUIDNUM:NUMBER(6)
LIQUIDBAL:NUMBER(14,2)
RECOVEREDDELINQADV:NUMBER(14,2)
ARREARS:NUMBER(14,2)
PREFUNDINT:(14,2)
BOOKVALUERO:NUMBER(14,2)
SUBSTAMTINT:NUMBER(14,2)
OTHER31:NUMBER(24,10)
OTHER32:NUMBER(24,10)
OTHER33:NUMBER(24,10)
OTHER34:NUMBER(24,10)
OTHER35:NUMBER(24,10)
OTHER36:NUMBER(24,10)
OTHER37:NUMBER(24,10)
OTHER38:NUMBER(24,10)
OTHER39:NUMBER(24,10)
OTHER40:NUMBER(24,10)
OTHER41:NUMBER(24,10)
OTHER42:NUMBER(24,10)
OTHER43:NUMBER(24,10)
OTHER44:NUMBER(24,10)
OTHER45:NUMBER(24,10)
OTHER46:NUMBER(24,10)
OTHER47:NUMBER(24,10)
OTHER48:NUMBER(24,10)
OTHER49:NUMBER(24,10)
OTHER50:NUMBER(24,10)
OTHER51:NUMBER(24,10)
OTHER52:NUMBER(24,10)
OTHER53:NUMBER(24,10)
OTHER54:NUMBER(24,10
OTHER55:NUMBER(24,10)
OTHER56:NUMBER(24,10)
OTHER57:NUMBER(24,10)
OTHER58:NUMBER(42,10)
OTHER59:NUMBER(24,10)
OTHER60:NUMBER(24,10)
OTHER61:NUMBER(24,10)
OTHER62:NUMBER(24,10)
OTHER63:NUMBER(24,10)
OTHER64:NUMBER(24,10)
OTHER65:NUMBER(24,10)
OTHER66:NUMBER(24,10)
OTHER67:NUMBER(24,10)
OTHER68:NUMBER(24,10)
OTHER69:NUMBER(24,10)
OTHER70:NUMBER(24,10)
BALSUB30DAYDELINQ:NUMBER(14,2)
NOSUB30DAYDELINQ(6)
NONRECOVERABLEDELINQADV:NUMBER(14,2)

OTHER27:NUMBER(24,10)
OTHER28:NUMBER(24,10)
OTHER29:NUMBER(24,10)
OTHER30:NUMBER(24,10)
SUBSTAMPTPRIN:NUMBER(14,2)
SUMBSTAMTINT:NUMBER(14,2)
SUBSTBALANCE:NUMBER(14,2)
BALLOONLNSNUM:NUMBER(6)
BALLOONLNSBAL:NUMBER(14,2)
BANKRUPTCYNUM:NUMBER(6)
BANKRUPTCYBAL:NUMBER(14,2)
CRAMDOWNLOSSES:NUMBER(14,2)
REINVESTINCOME:NUMBER(14,2)
REPURCHASENUM:NUMBER(6)
REPURCHASEBAL:NUMBER(14,2)
SPECHAZLOSSAMT:NUMBER(14,2)
ACTUALSERVFEE:NUMBER(14,2)
LIQUIDNUM:NUMBER(6)
LIQUIDBAL:NUMBER(14,2)
RECOVEREDDELINQADV:NUMBER(14,2)
ARREARS:NUMBER(14,2)
PREFUNDINT:(14,2)
BOOKVALUERO:NUMBER(14,2)
SUBSTAMTINT:NUMBER(14,2)
OTHER31:NUMBER(24,10)
OTHER32:NUMBER(24,10)
OTHER33:NUMBER(24,10)
OTHER34:NUMBER(24,10)
OTHER35:NUMBER(24,10)
OTHER36:NUMBER(24,10)
OTHER37:NUMBER(24,10)
OTHER38:NUMBER(24,10)
OTHER39:NUMBER(24,10)
OTHER40:NUMBER(24,10)
OTHER41:NUMBER(24,10)
OTHER42:NUMBER(24,10)
OTHER43:NUMBER(24,10)
OTHER44:NUMBER(24,10)
OTHER45:NUMBER(24,10)
OTHER46:NUMBER(24,10)
OTHER47:NUMBER(24,10)
OTHER48:NUMBER(24,10)
OTHER49:NUMBER(24,10)
OTHER50:NUMBER(24,10)
OTHER51:NUMBER(24,10)
OTHER52:NUMBER(24,10)
OTHER53:NUMBER(24,10)
OTHER54:NUMBER(24,10
OTHER55:NUMBER(24,10)
OTHER56:NUMBER(24,10)
OTHER57:NUMBER(24,10)
OTHER58:NUMBER(42,10)
OTHER59:NUMBER(24,10)
OTHER60:NUMBER(24,10)
OTHER61:NUMBER(24,10)
OTHER62:NUMBER(24,10)
OTHER63:NUMBER(24,10)
OTHER64:NUMBER(24,10)
OTHER65:NUMBER(24,10)
OTHER66:NUMBER(24,10)
OTHER67:NUMBER(24,10)
OTHER68:NUMBER(24,10)
OTHER69:NUMBER(24,10)
OTHER70:NUMBER(24,10)

CONTACT DETAILS — 600

- ID: — 602
- FIRST NAME: — 604  MI: — 606  LAST NAME: — 608
- ADDRESS: — 609
- CITY: — 610
- STATE: — 612
- COUNTRY: — 614
- ZIP: — 616
- PHONE: — 618  FAX: — 620
- E MAIL: — 622
- FTP ADDRESS: — 624
- URL: — 626
- FUNCTIONAL TITLE: — 628
- DEPT/ORG: — 630
- ROLE: — 632

634 — ○ INTERNAL STAFF   636 — ○ EXTERNAL CONTACT

[CANCEL] — 640   [OK] — 642

DEAL MODIFY

DEAL ID: CCC97C — 882

DEAL DESCRIPTION: CHASE CREDIT CARD 1997C — 884

Tabs: SETUP | OUTPUT | CONTACTS | STEPS | VERIFICATION | INPUT | HEADER/FOOTER — 708

FUNCTION: WATERFALL – MONTHLY ▽ — 854

| DENY—856 | QUEUE—858 | NAME—860 | 863a ROLE—861 | DATE: DUE |
|---|---|---|---|---|
| ☑ 886a | DATA READY ▽ | TEX ▽ | ANALYST LRPS ▽ | 12 |
| ☐ 886b | LOAN LEVEL PROCESSED ▽ | JOSE ▽ | LRPS SUPERVISOR ▽ | 13 |
| ☑ 886c | READY FOR ASAP ▽ | ALLEN ▽ | BOND ANALYST ▽ | 15 |
| ☐ | APPROVAL ▽ | MAC ▽ | BOND ANALYST ▽ | 15 |
| ☐ | APPROVAL ▽ | ALLEN ▽ | SUPERVISOR ANALYST ▽ | 16 |
| ☐ | APPROVAL ▽ | EILEEN ▽ | ADMINISTRATOR ▽ | 17 |
| ☐ 886h | RELEASE FOR PAYMENT ▽ | KIM ▽ | ▽ | |

852 — 850 — 862 — 870

[ CANCEL ] 868  [ INSERT ] 864  [ DELETE ] 866  [ OK ]

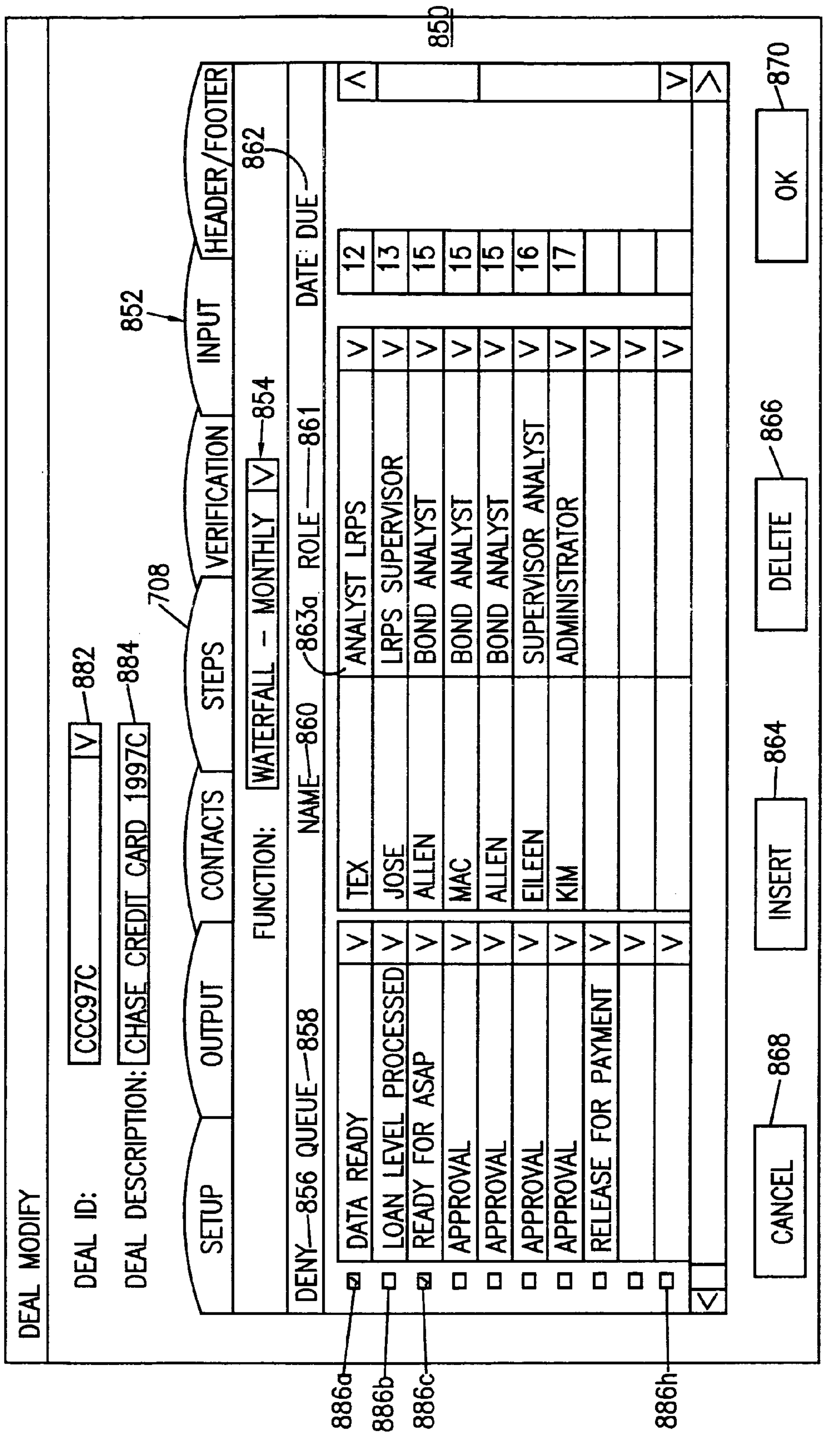

FIG. 7E

| DATE | FUNCTION | QUEUE | STATUS | NAME | COMMENT TYPE | DETAILS |
|---|---|---|---|---|---|---|
| 04/11/1998 | WATERFALL- | APPROVAL | READY | JOE | BEGINING BALANCE NO | ONLY OFF B |
| 04/07/1998 | WATERFALL- | DATA READY | NOT READY | BETTY | TAPE DAMAGED | |
| 04/01/1998 | WATERFALL- | DATA READY | READY | PAT | TAPE DELAYED | |

DEAL: CCC95B CHASE CREDIT CARD
PERIOD ENDING: 11/25/1997
FUNCTION: WATERFALL-MONTHLY

ADD  CANCEL  OK

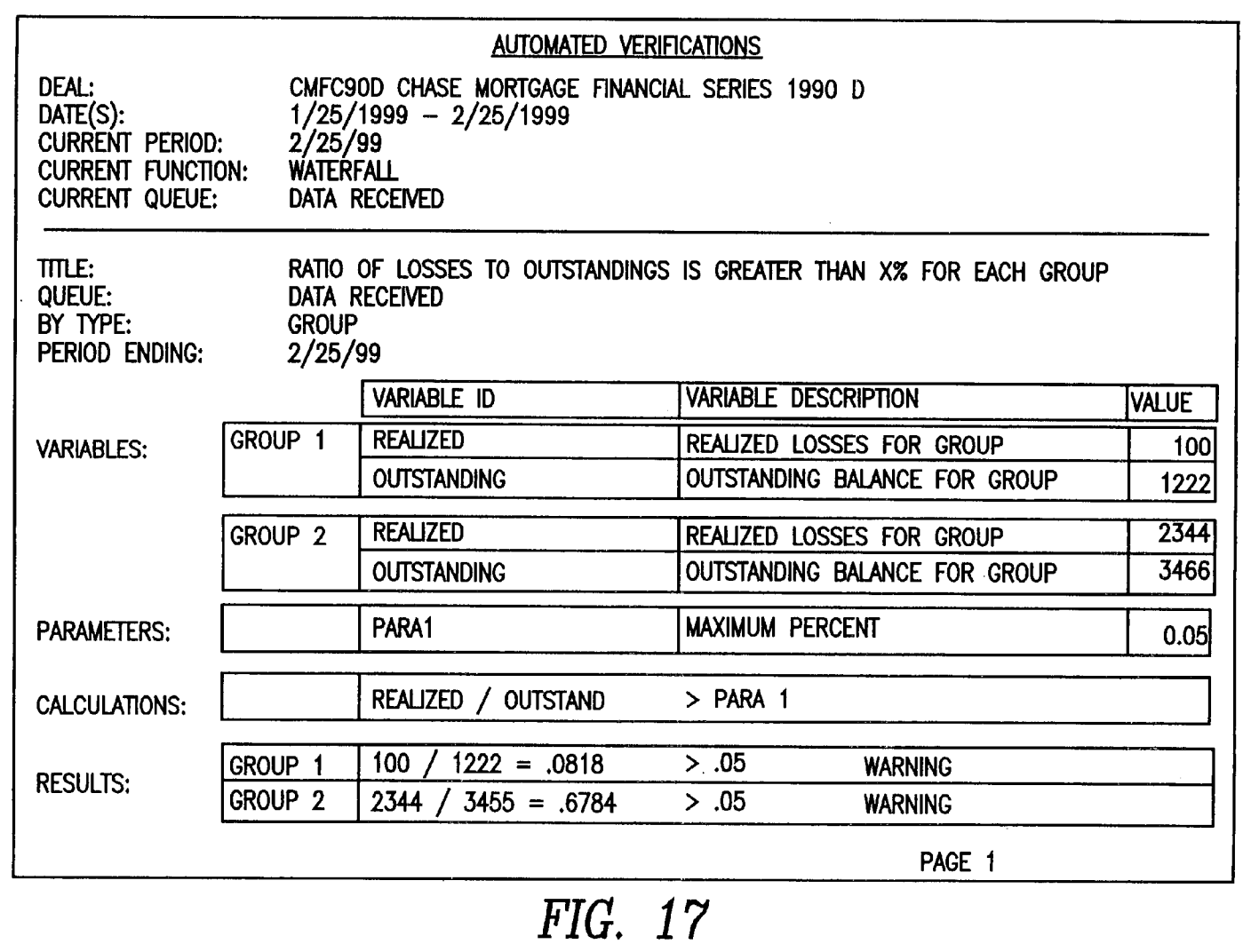

AUTOMATED VERIFICATIONS

DEAL: CMFC90D CHASE MORTGAGE FINANCIAL SERIES 1990 D
DATE(S): 1/25/1999 - 2/25/1999
CURRENT PERIOD: 2/25/99
CURRENT FUNCTION: WATERFALL
CURRENT QUEUE: DATA RECEIVED

---

TITLE: RATIO OF LOSSES TO OUTSTANDINGS IS GREATER THAN X% FOR EACH GROUP
QUEUE: DATA RECEIVED
BY TYPE: GROUP
PERIOD ENDING: 2/25/99

| | | VARIABLE ID | VARIABLE DESCRIPTION | VALUE |
|---|---|---|---|---|
| VARIABLES: | GROUP 1 | REALIZED | REALIZED LOSSES FOR GROUP | 100 |
| | | OUTSTANDING | OUTSTANDING BALANCE FOR GROUP | 1222 |
| | GROUP 2 | REALIZED | REALIZED LOSSES FOR GROUP | 2344 |
| | | OUTSTANDING | OUTSTANDING BALANCE FOR GROUP | 3466 |
| PARAMETERS: | | PARA1 | MAXIMUM PERCENT | 0.05 |
| CALCULATIONS: | | REALIZED / OUTSTAND | > PARA 1 | |
| RESULTS: | GROUP 1 | 100 / 1222 = .0818 | > .05 | WARNING |
| | GROUP 2 | 2344 / 3455 = .6784 | > .05 | WARNING |

PAGE 1

FIG. 17

RESTATED PROCESSES

DEAL: CCC97A ▼ — 2605

CHASE CREDIT CARD 1997A ▼ — 2610

FUNCTION: WATERFALL - MONTHLY ▼ — 2615

PERIOD ENDING: 11/23/97 ▼ — 2620

| DATE/TIME COMPLETED |
|---|
| 12/20/1997, 12:30 PM |
| 11/28/1997, 12:30 PM |
| 11/23/1997, 12:30 PM |

— 2625

2600

WORKFLOW MANAGEMENT SYSTEM AND METHOD

CROSS-REFERENCE TO RELATED APPLICATION

This patent application claims priority to U.S. Provisional Patent Application No. 60/196,003, filed Apr. 7, 2000, which is hereby incorporated by reference herein in its entirety.

BACKGROUND OF THE INVENTION

1. Field of Technology

The present invention relates to computerized workflow management and operational support for persons engaged in complex business or other processes. It has particular utility in supporting operations by financial organizations serving as trustees for securitizations, i.e., financial instruments such as Mortgage-Backed Securities (MBS), and other Asset-Backed Securities (ABS) or other financing arrangements involving debt instruments for which periodic valuation and distribution computations, disbursements and reporting must be set up and executed.

Securitization is commonly defined as a pooling of assets and issuance of securities to finance the carrying of the pooled assets. This process allows understanding of the behavior of a class of assets as a whole to be employed in creating a financial structure to finance such assets without the need to be concerned about the behavior of the specific asset within the class. (See Kravitt, Securitization, *The Financier*, Vol. 4, No. 5, December 1997.) The actual securitization process involves issuance of bonds which are backed, not by capital assets of the issuer, but rather by the cash flow from the pooled assets. These may be residential or commercial mortgages, credit card receivables, equipment leasing or even student loans, etc.

For a securitization to be an attractive investment vehicle, it must be carefully structured, for example, to take into account factors such early payoff of loans by mortgage holders. This often results in a very complex financial instrument, and correspondingly complex processing is required to manage the transaction.

Each of the participants in a securitization transaction serves a different role. For example, in the case of a residential MBS, the participants might include the originating mortgage lender, the issuer of the MBS (which could be the lender or a third party which aggregates mortgages from several lenders, the underwriter which provides the initial financing for the issue, the public investors and the trustee. The latter is usually a financial institution which is responsible for receiving payments collected by the servicer at the collateral (i.e., loan) level, for computing and distributing payments to the investors and for computing the taxes due on such distributions, for maintaining records of ownership and transfer of the securities and for producing and disseminating reports to investors and other interested members of the public.

Disbursements (commonly called "waterfall" payments) are usually made on a monthly basis, so the trustee must perform monthly waterfall calculations based on funds collected, and must generate monthly reports for the investors. Monthly, quarterly and annually tax computations must also be performed and reported to the investors. The trustee might be handling hundreds of securitizations, each of which may involve a different deal structure and different computations. It will be appreciated that fulfillment of the trustee's responsibilities may require the effort of many individuals to perform the many complex calculations and other tasks.

2. Prior Art

Task management and scheduling, and repetitive, complex computations obviously lend themselves well to computerization, but this has both positive and negative implications. Among the obvious benefits of computerization are improved speed and accuracy of computation. Indeed, it is difficult to imagine the trustee's role in securitization transactions without the availability of powerful computers and software. Similarly, computerization has expanded reporting capabilities, both in terms of data presentation and ease of delivery of information to a large number of users.

On the less positive side, computerization does not always take place in an environment of comprehensive planning and systems engineering, and securitization management software is not an off-the-shelf item. To accomplish the many processing, reporting, supervisory and quality assurance activities required of the trustee, it has proven easier to do the work using pre-existing functional sub-systems designed to perform the same or similar functions in other applications. Inevitably, though, when this is done, integration is virtually non-existent due to interoperability problems, and remedying such problems completely is usually not possible.

Another problem is that the transactions themselves often have longer lifetimes than the software on which the processing and reporting tasks were originally implemented. Software used for transactions created, for example, in the early 1990's may be quite different from what is currently used, yet the trustee must efficiently and accurately handle old as well as new transactions. Having to work with a collection of software platforms, some of which might be obsolete, and at the very least, do not interface well with each other, has also been a source of inefficiency and reduced functionality.

An additional problem in the prior art has been difficulty in implementing changes in existing data structures to accommodate evolutionary changes in the underlying financial structures. Database management software and database designs themselves can be quite resistant to these kind of changes. To add the capability for handling even a single piece of additional data has sometimes proven to be a major undertaking.

Up to now, there has not been available an integrated system which permits convenient and reliable performance of all of the tasks required of the trustee.

SUMMARY OF THE INVENTION

The present invention achieves an effective solution to the problems described above. In particular, it is among the objects of the present invention:

- to create a standard operating platform which facilitates economies of scale and processing efficiency, elimination of multiple outdated applications previously employed, and reduction of the number of platforms (and consequent need for maintenance) required for the universe of processing and reporting tasks;
- to unify the required operations and processing tasks thereby improving efficiency, and insuring consistency of results for these various participants in the transactions;
- to improve quality control environment for periodic processing and auditing integrity;
- to provide a scalable system which allows growth of the number of projects which can be handled without addition to the cost structure, along with improved reporting (e.g., via the Internet, E-mail, etc.), and provision of technical links (e.g. interfacing between pre-existing sub-system) to reduce manual work;

to provide the capability for handling presently existing securitization structures and the flexibility to handle new types of structures and new collateral (securities) types, both nationally and globally, through convenient modification of data structures;

to allow effective use of the Internet and the World Wide Web for deal reporting;

to provide improved workflow management capabilities for the performance of the complex analytical and other activities which are characteristic of securitization transactions;

to provide for graphical representation of the performance of the securities and underlying collateral;

to permit online updates of deal performance projections based on "what if" scenarios; and to allow creation of dynamic customized reporting formats based on user inputs.

The above-stated objectives are achieved in accordance with this invention on a computer network organized on a client-server model. Broadly stated, the software is implemented on a relational database management system ("RDBMS"), and is comprised of a command processor, workflow management software and a Workflow Database. The actual data-processing is carried out by several independent subsystems each implemented on an RDBMS, and which interface with, and are controlled by, the workflow management system.

Utilizing the programming capabilities of the RDBMS, forms are made available to the users for manually entering data, for generating data search queries, and for displaying data returned by the queries or created as a result of the various processing functions. The system also makes available to the user, a listing of the active deals for which he or she is responsible. The listing displays the status of each deal and thus serves both as a to-do list, and as a menu from which tasks to be performed may be initiated.

The system is designed to permit convenient editing of data by the users, as well as updating of the underlying database structures by a database administrator. The system also permits dissemination of reports both in print and electronically. Further, the system permits development and utilization of a wide range of verification or quality control tests by which the integrity of incoming data and computational output may be evaluated.

Another important aspect of the invention resides in the method of workflow management which may be performed using the above described system. Briefly, the method involves creating an underlying database structure for recording the processing steps and other information required for each deal, entering the necessary setup information by selection from lists of pre-stored information about processing functions, the associated workflow events (referred to herein as "queues") and status milestones for the queues, mapping the data structures of the subsystem databases and the workflow management database to provide transparent interfacing and convenient manual entry of data were necessary, displaying for the user the queue and milestones status of all the deals for which he or she is responsible, permitting menu driven initiation of the tasks required in each queue each the deals and automatically updating the database records for the universe of deals being managed by the system.

Another feature of the method according to this invention involves development by the user of verification tests from pre-existing lists of variables and parameters, from manually selected parameter values and a listing of mathematical operators, and the association of the verification tests with the deals to which they are applicable.

Other features and advantages of the present invention will become apparent from the following description of the invention which refers to the accompanying drawings, in which like functional units, processing steps, etc. bear like reference numerals.

BRIEF DESCRIPTION OF THE DRAWINGS

FIGS. 5E through 5K illustrates the database structure by which the present invention is implemented.

FIG. 17 illustrates an example of a verification report.

Throughout the drawings, like functional units, processing steps, etc. bear like reference numerals.

DETAILED DESCRIPTION OF A PREFERRED EMBODIMENT OF THE INVENTION

Figure 1:
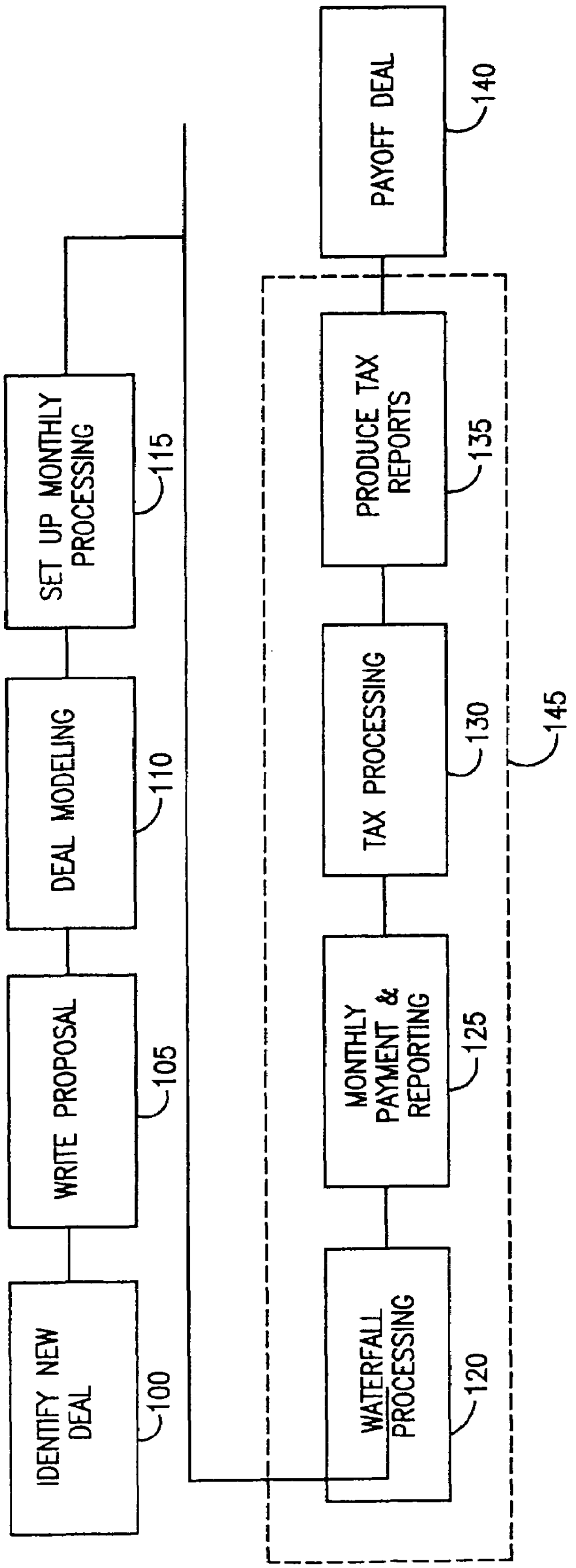
FIG. 1 is a conceptual overview of the life cycle of a new securitization or "deal".

To provide an understanding of a particular environment in which the present invention may be used, FIG. 1 illustrates the life cycle of a typical securitization from the viewpoint of the trustee. The life cycle begins with an Identification phase 100, in which a new deal first comes to the attention of the trustee. Then follows Proposal phase 105, in which a written proposal is prepared and submitted to the underwriter, a Deal Modeling phase 110, in which the underlying contract for the transaction is analyzed by the trustee to set up a deal model for the required monthly waterfall and tax calculations and reporting, and for the associated workflow, the Setup phase 115, in which the monthly processing steps for computations related to the waterfall and tax processing are specified and implemented in the software by the analyst, the Waterfall Processing phase 120, in which the monthly waterfall calculations are performed, the Monthly Payment and Reporting phase 125, in which the monthly investor payments are made and the investor reports are generated and disseminated, the Tax Processing phase 130, the Tax Reporting phase 135 and the Payoff phase 140, in which the bonds are redeemed. It should be understood that life cycle phases 100, 105, 110, 115 and 140 illustrated in FIG. 1 are one-time events, while phases 120, 125, 130 and 135 are repetitive events which may be thought of as part of a larger Processing, Disbursement and Reporting phase 145 shown in broken lines in FIG. 1.

Figure 2:
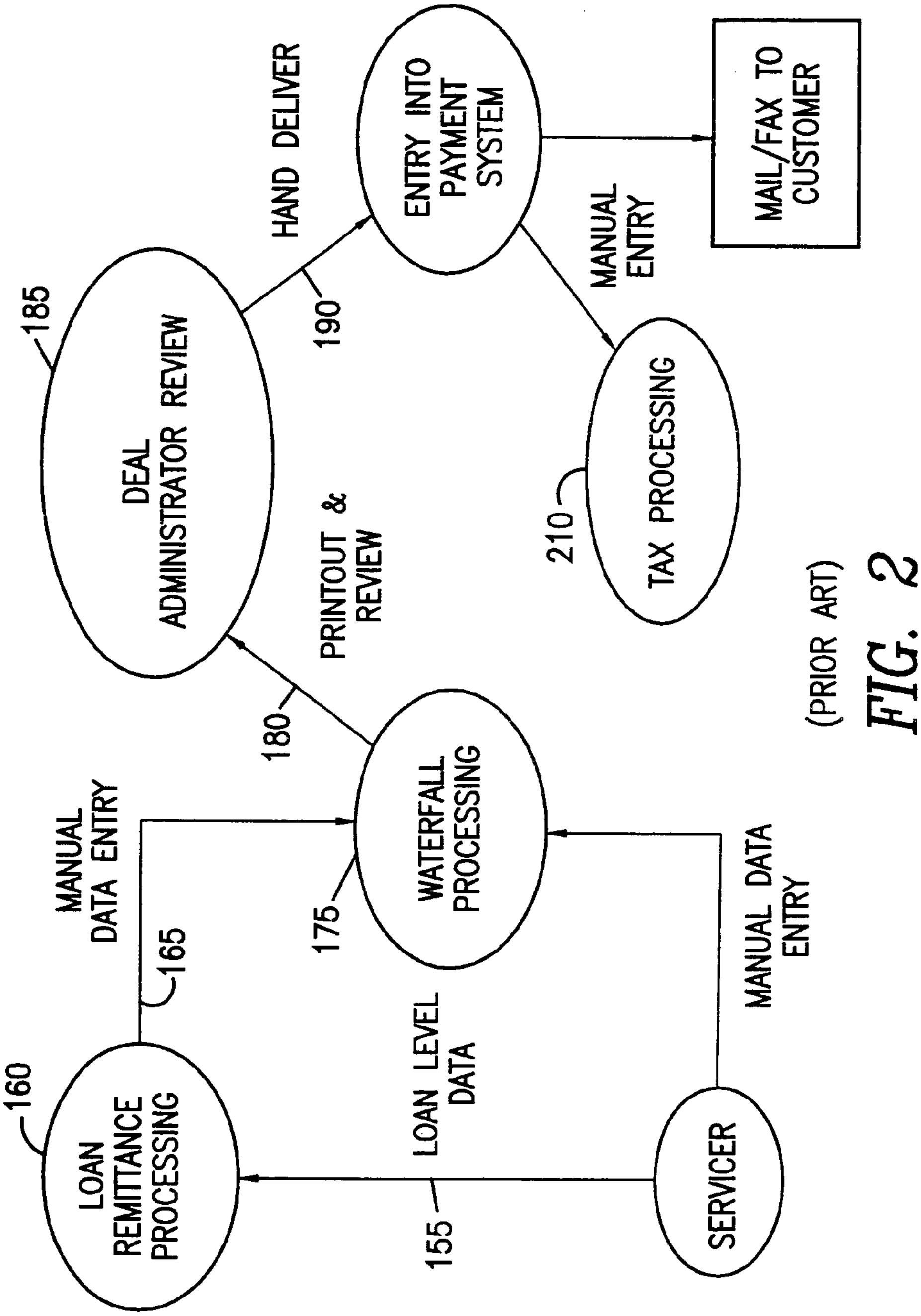
FIG. 2 illustrates the processing and reporting infrastructure according to the prior art.

FIG. 2 illustrates the infrastructure for processing a typical mortgage backed security deal according to the prior art. For simplicity, it is assumed that a single loan servicer 150, such as a mortgagee or a successor to which a portfolio of mortgages has been assigned, is responsible for monthly collection of mortgage payments, and transmittal to the trustee of funds and loan level data, i.e., information concerning principal, interest payments and balances on the individual loans, payment and delinquency history for the individual loans, loan payoffs, etc. However, it is possible for more than one servicer 150 may be involved in a particular deal.

Funds and loan level data are transmitted at step 155 to the trustee for loan remittance processing at step 160. This involves tabulation and summarization of the loan level information on an aggregate basis for further processing. This is commonly done using software designed for that specific purpose.

Referring still to FIG. 2, the next phase of the operation according to prior practices was monthly waterfall and tax processing. To support this, the aggregated loan remittance data and any other required data from the loan servicer was manually entered (steps 165 and 170) into computers running the applications by which the necessary calculations were performed (step 175). These applications often did not run under a single operating system and were of a broad range of vintages with correspondingly diverse capabilities. There was little or no interoperability or interfacing between these applications.

In the absence of effective integration, the resulting computations were printed out (step 180) and delivered by hand for review by the deal administrator (step 185). Again, because of interoperability problems, after approval, the printed computations were hand delivered (step 190) and manually entered into a separate payment system (step 195). After further processing, the payments and backup data were sent by mail and facsimile to the individual investors (step 200). Finally, the payment data were manually entered into the tax model (step 205).

Figure 3:
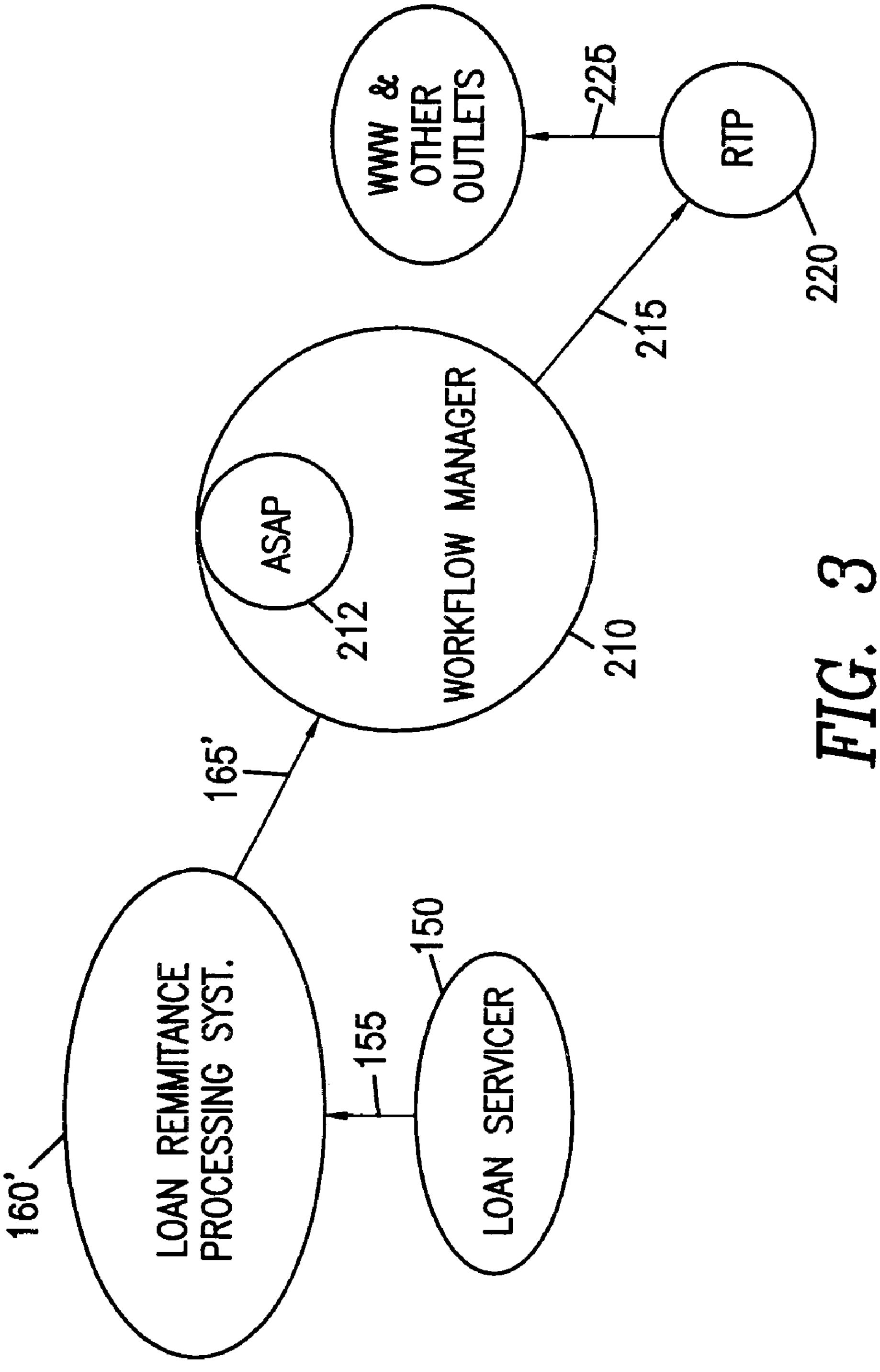
FIG. 3 illustrates the processing and reporting infrastructure according to the present invention.

In contrast, as illustrated in FIG. 3, according to the present invention, loan level data transmitted from the loan servicer(s) 150 at step 155 is aggregated at step 160' by a Loan Remittance Processing System ("LRPS"), and transmitted electronically at step 165' to Workflow Manager 210. This performs the required waterfall and tax processing, review, approval and verification (quality control) functions, and report generation and performs all the required workflow management functions.

Waterfall data produced by Workflow Manager 210 is transmitted electronically at step 215 to a Registration, Transfer and Payment ("RTP") module 220. This is a stand-alone sub-system which performs the payment functions, and also manages the registration and transfer of ownership of the security certificates. Upon completion of the payment process, investor reports and other data compilations are disseminated at step 225 to the World Wide Web and other outlets.

It should be understood that Workflow Manager 210 represents the present invention per se and an embedded processing module 212 which performs the waterfall and tax calculations. The specific software preferably used as processing module 212 is Asset Securitization Analysis Pro ("ASAP") developed by Price Waterhouse/Coopers, of Arlington, Va., but it should be understood that other software capable of performing the necessary calculations based on the deal structure, and operable under the control of workflow manager 210 may be used instead.

The ASAP module 212 also has the capability for so-called "reverse engineering". Typically, securitization transactions involve a number of different classes of securities (called "tranches") having different effective interest rates, principal repayment schedules, etc. The intended monthly cash flows for the tranches are stated in the prospectus for the deal. Reverse engineering involves analyzing the cash flow data to create the algorithms for waterfall and tax processing. This function is usually performed at the underwriting level but it may readily be performed in accordance with a present invention at the trustee level by use of the ASAP module under control of Workflow Manager 210.

Figure 4:
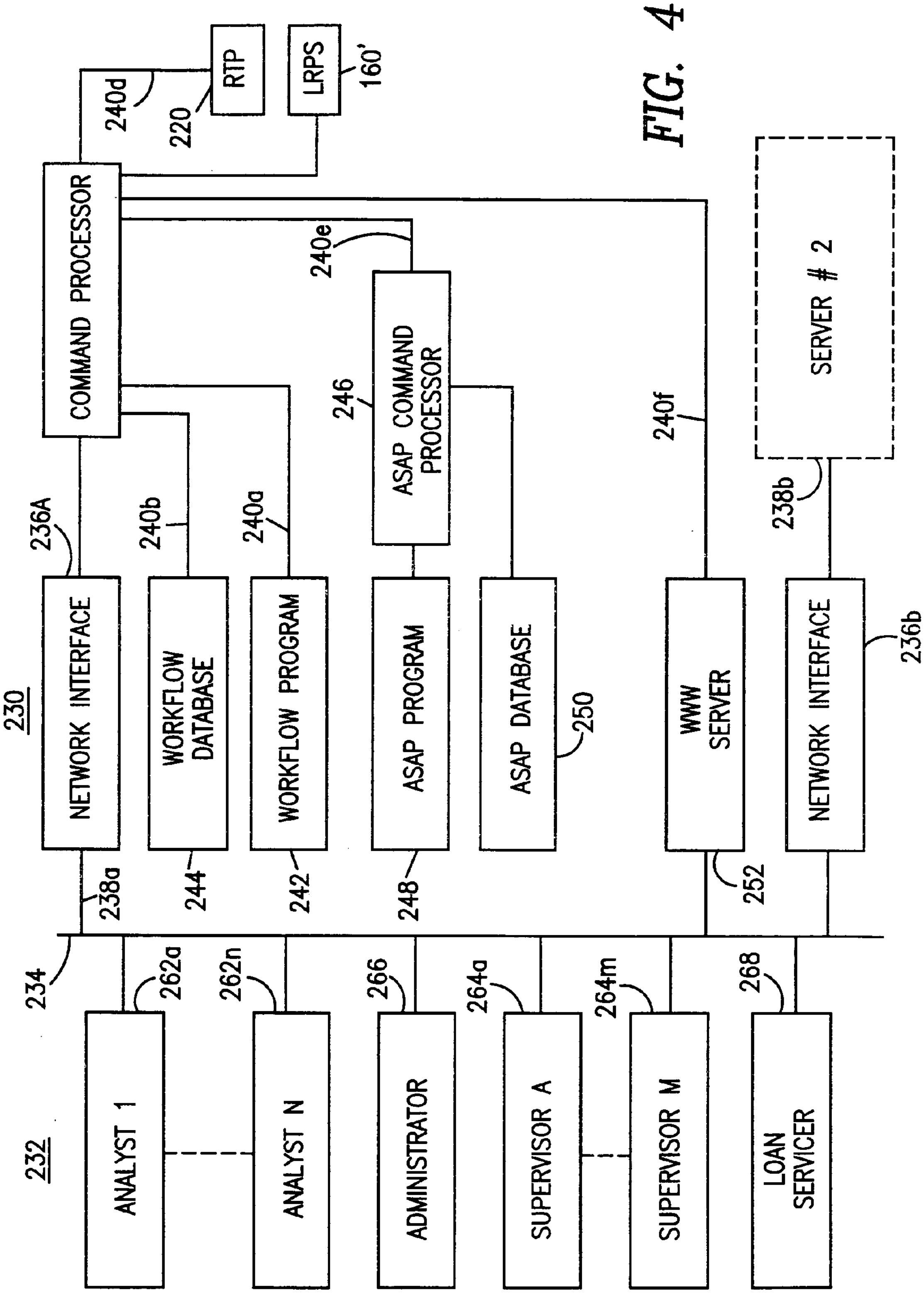
FIG. 4 illustrates in block diagram form, the architecture of the workflow management system according to the present invention.

Workflow Manager 210 provides an interface through which deal set up and daily operations may be performed. It also provides task prompting for system users, controls data flow from LRPS module 160' and to RTP module 215, manages the operations performed by ASAP subsystem 212 and coordinates of the administrative, quality control and reporting functions. FIG. 4 illustrates the architecture of a system for performing these functions according to the present invention. It should be understood that FIG. 4 is a hybrid representing information flow, processing, and storage, and is simplified to highlight the functional relationships.

As illustrated, the functions are preferably implemented on one or more suitably programmed general-purpose computers networked together. The system is based on a client-server model, with a server side generally denoted 230, and a client side generally denoted 232 connected together through a suitable network 234. In the embodiment illustrated, there are two separate installations 236A and 236B connected to network 234 by respective interfaces 238A and 238B, but additional installations and interfaces may be employed. Having two separate server installations 236A and 236B provides redundancy and allows geographic distribution of the various functions to accommodate the trustee's organizational structure.

On the client side 232, it is assumed that there are a several Analysts 262*a* through 262*n*, and Supervisors 264*a* through 264*m*, performing their assigned duties on separate personal computers connected to network 234. In addition, there is an administrator responsible for database maintenance and other similar functions performing his or her duties at an additional personal computer 266. Also connected to network 234 is a servicer installation 268 corresponding, for example to Loan Servicer 150 shown in FIG. 3. The system illustrated in FIG. 4 is designed to afford the greatest flexibility for distributed processing and redundancy to minimize down time due to system problems. In this regard, it may be understood that the various installations on both server side 230 and client side 232 may be located remotely from each other. This may be the case, for example, if the trustee has installations in several geographic locations.

Returning now to server side 230, server installation 236*a* may be comprised of a large capacity personal computer, mini computer, or main frame installation. This is comprised of a suitably programmed command processor 240, a workflow program 242, and a Workflow Database 244. As will be understood, the software is stored on a suitable storage medium such as a hard drive (not shown).

Server installation 236A also includes conventional input and output devices such as a keyboard, a monitor, a printer, a mouse, etc., which also have been omitted from the drawing in the interest of clarity. Two-way information flow for command and data transfer is provided between command processor 240, workflow program 242 and Workflow Database 244 by respective signaling paths 240*a* and 240*b*.

Command processor 240 is also connected by signaling paths 240*c* and 240*d* to LRPS unit 160' and RTP 220 previously described in connection with FIG. 3, and by signaling path 240*c* to ASAP subsystem 212. This includes a command processor 246, stored ASAP software 248 and ASAP database 250. In will be appreciated that the functional units 240 through 250 together correspond to the functions associated with workflow management system 210 (see FIG. 3).

Also as discussed in connection with FIG. 3, a data signaling path 240A is provided between command processor 240 and World Wide Web server 252 by which reports may be distributed to investors and other interested members of the public. Other Internet connections may also be provided, e.g., to an FTP site or an E-Mail server (not shown).

Server installation 236B may be similar in construction and architecture to server installation 236A. It will be understood, however, that one of the servers will exercise master control and the respective command processors will be programmed accordingly.

The functions performed by Workflow Manager 210 are preferably implemented using standard database management programming. In the embodiment illustrated, the underlying database management software is Oracle 8, provided by Oracle Corp. of Redwood Shores, Calif. The Oracle software and the implementation of the present invention are designed to run on a Unix operating system. However, it should be understood that other RDBMS and any other operating system having comparable capabilities may be employed instead.

FIGS. 5A through 5E illustrate the universe of tasks which are performed and managed by the present invention. These may be grouped in eight broad categories: (1) deal set-up, (2) monthly data input, (3) waterfall processing (4) waterfall approval, (5) waterfall payment (6) report distribution, (7) tax processing and (8) tax approval.

Figure 5A:
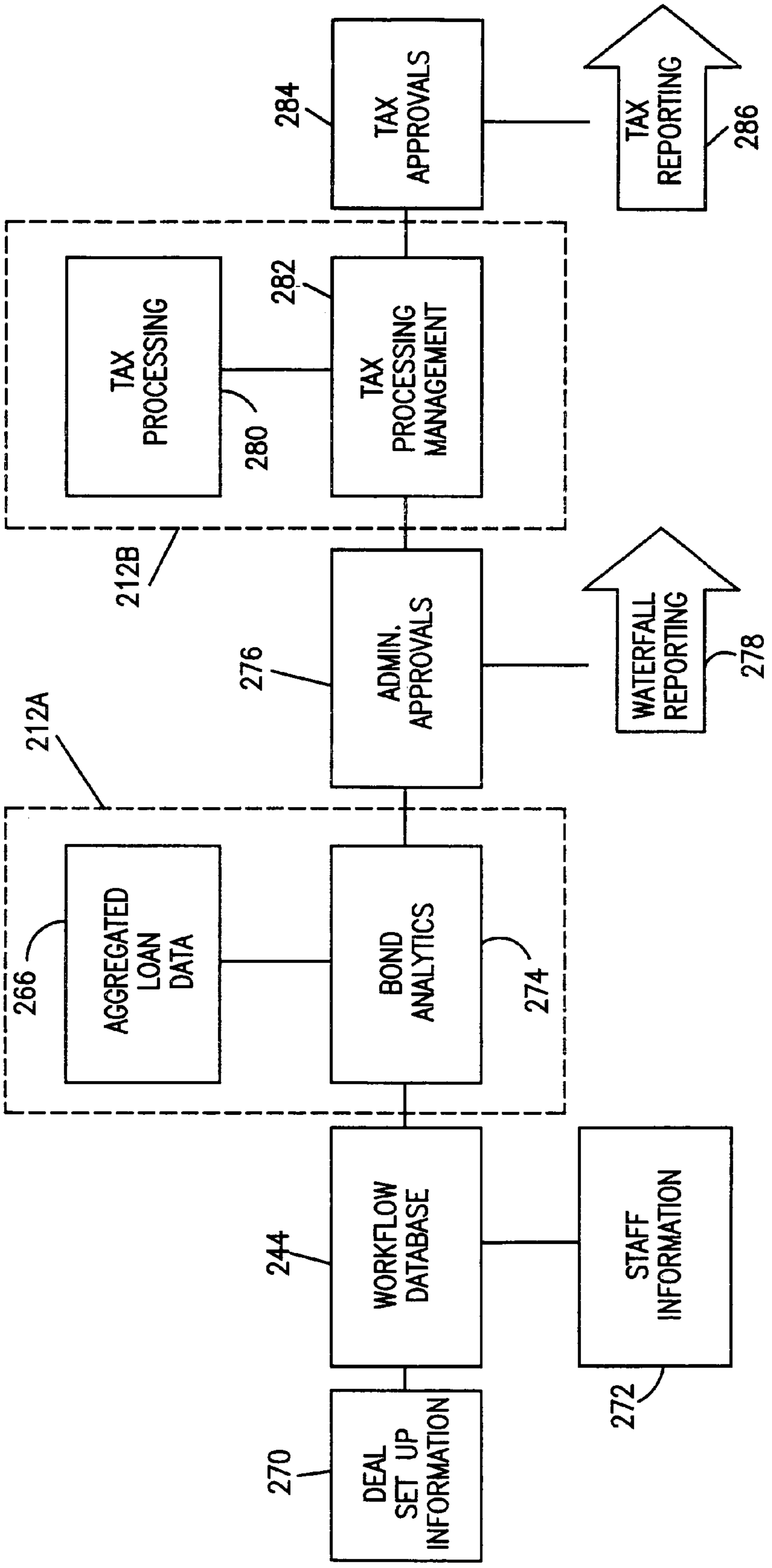
FIG. 5A is a schematic illustration of the functional features of certain of the life-cycle stages illustrated in FIG. 1.

Referring particularly to FIG. 5A, deal setup involves providing deal structure information, step 270 and staff/contact information, step 272, in Workflow Database 244. Monthly data input, mainly aggregated loan level information, is provided by LRPS 160'.

Waterfall processing is a monthly activity, performed by a portion of ASAP subsystem denoted 212*a* in FIG. 5A. This comprises a Waterfall Processing module 272 and a Bond Analytics module 274. The former performs the actual calculations, while the latter provides command processor functions for Waterfall Processing module 272, and organizes the waterfall data for use in subsequent processing steps.

Waterfall Approval, denoted at step 276 in FIG. 5A, involves performance of verification or quality control functions which are designed to ensure that the loan level data is accurate and complete, and that the waterfall computations have been properly performed.

Upon completion of the waterfall approval process, approval outputs are generated at step 278. These provide the necessary data for payment processing by RTP system 220 and for generating the investor and other reports (see steps 215, 220 and 225 in FIG. 3).

After a monthly waterfall computation and payment cycle has been completed, the tax processing function may be performed. This is done by a part of the ASAP subsystem denoted 212*b* in FIG. 5A. This is comprised of a Tax Processing module 280, which performs the required tax computations, and a Tax Management module 282 which provides command processor functions for Tax Processing module 280, and organizes the tax computation data for use in generating the investors' tax reports.

The final functional categories are tax approval and tax reporting. As in the case of waterfall processing, various quality control or verification steps, generally denoted at 284, are performed to assure that the tax computations were performed in compliance with applicable law and regulations. When this has been completed, the tax reports, e.g., IRS Schedule forms 1066 and 1099, and schedule Q's are generated at step 286. Balance sheets and income statements may also be generated.

Figure 5B:
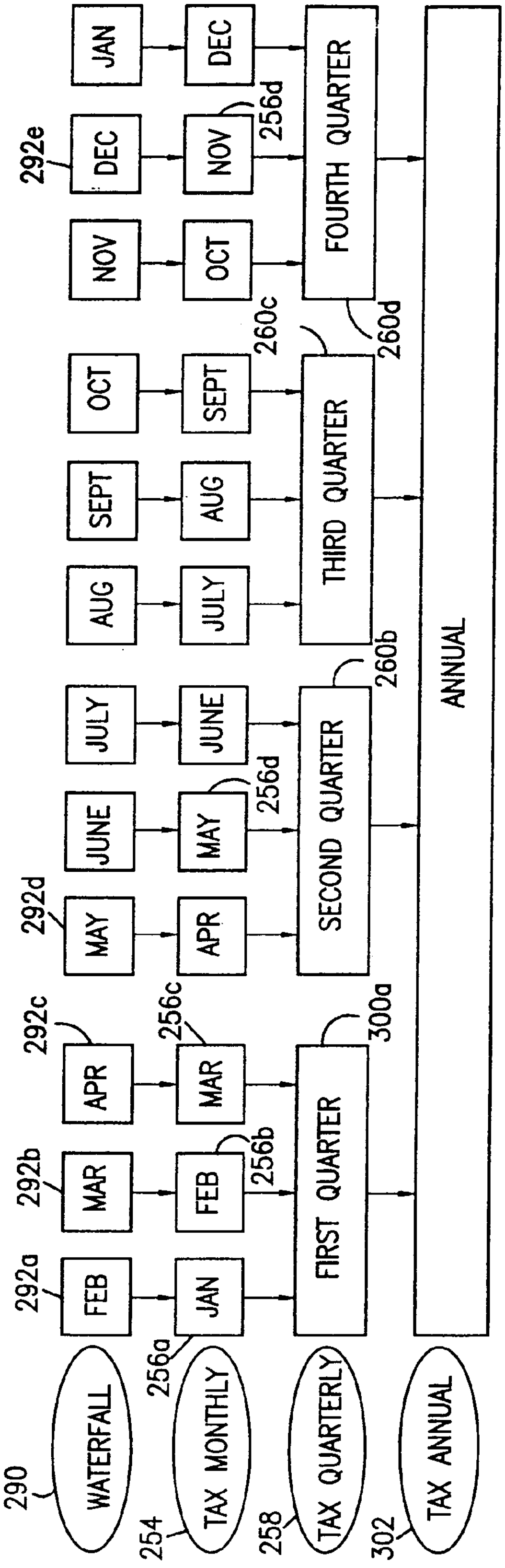
FIG. 5B broadly illustrates the workflow sequences for the functions managed in accordance with the present invention.

FIG. 5B illustrates the workflow processing order. At the waterfall level 290, the monthly investor distributions are computed. The computation labeled February (step 292*a*) is for a February distribution of income earned in January of that year. Similarly, step 292*b*, labeled March, represents a March distribution of February earnings.

At the Tax-Monthly level 294, tax liability computations are performed, but the monthly waterfall processing at level 290 for a particular month must be completed before the tax processing for that month can begin. In other words, January tax processing at step 296*a*, for income earned in January, is performed after the February waterfall processing at step 296*a*, and February tax processing, step 296*b*, is performed after the March waterfall processing at step 292*a*.

The Tax-Quarterly level 298 represents four quarterly tax aggregation/approval steps 300*a* through 300*d*. As illustrated in FIG. 5B, the February, March, and April waterfall processing steps 292*a* through 292*c*, and the January, February and March tax processing steps 296*a* through 296*c*, must be completed and before the tax processing for the first quarter can be performed. Similarly, the waterfall processing for May, June and July, and the tax processing for April, May and June must be completed before the second-quarter tax processing at step 300B can be performed.

Finally, at the Tax Annual level 302, the annual taxes processing is performed and approved. As will be understood, this can not be done until the monthly waterfall and tax computations and the quarterly tax approvals have been completed.

Waterfall processing is preferably performed on a monthly basis so that income earned in a particular month can be distributed the next month. However, as tax reporting is required only on a quarterly basis, the monthly tax processing is performed quarterly, so tax processing generally lags behind Waterfall processing.

Comparing FIGS. 5A and 5B, it will be understood that FIG. 5A represents a single monthly cycle for a single deal. In general, there may be hundreds of active deals, each with its own deal structure, and, at a given time, in a different processing stage. Thus, a workflow management system which can reliably track the processing status of multiple deals, and prompt the analyst through the steps which need to be done in connection with each of the deals on which he or she is working, is virtually essential for a successful high-volume operation.

According to the present invention, to permit the analysts and supervisory staff to keep track of the status of all active deals, and to perform their tasks in a timely and efficient manner, the workflow for the major functions, i.e., waterfall and tax processing, is organized in a series of steps or queues, each of which is characterized by one or more intermediate status milestones.

Figure 5C:
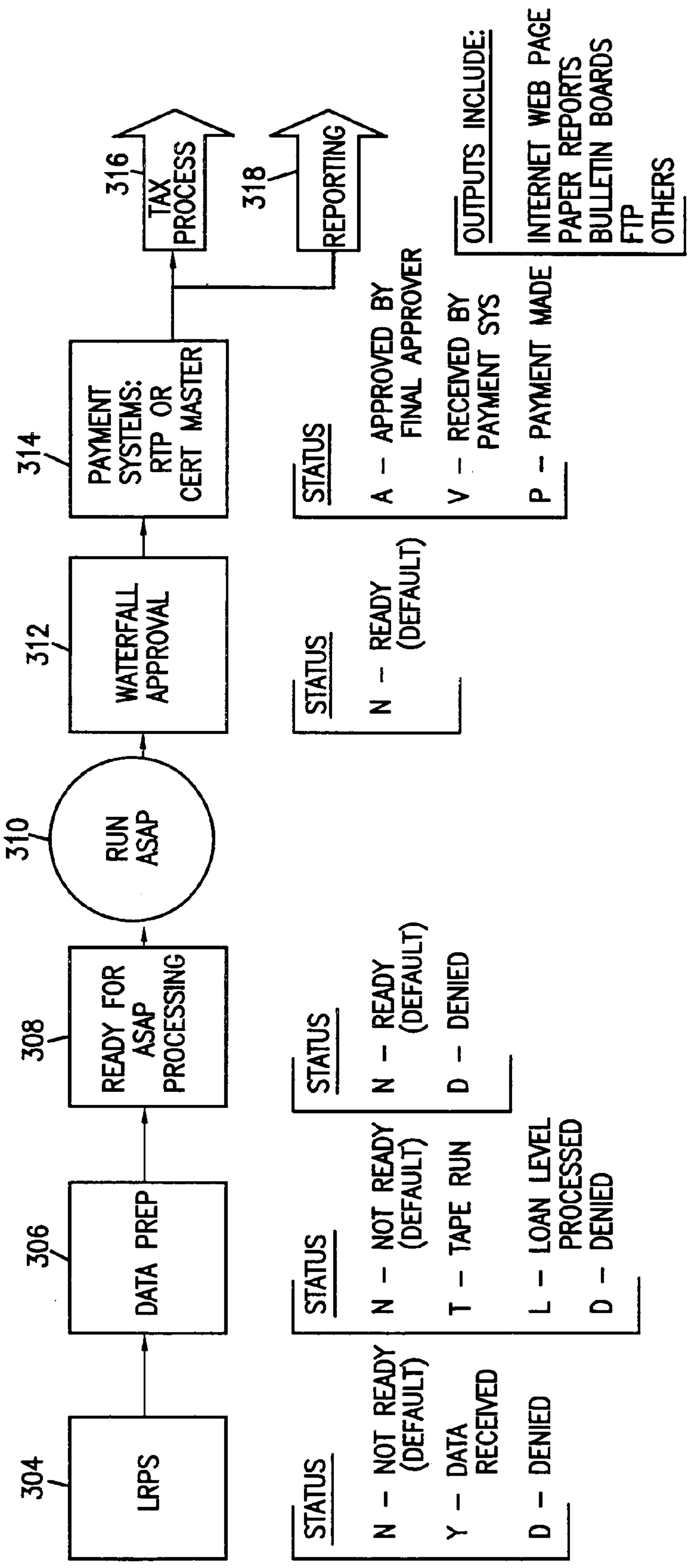
FIGS. 5C and 5D respectively illustrate the queue structures for waterfall and tax processing.

FIG. 5C illustrates the workflow organization for the waterfall processing function. The queues are shown in the normal processing order.

The queues for waterfall processing are LRPS queue 304, Data Prep queue 306, Ready for ASAP Processing queue 308, Waterfall Approval queue 312 and Payment queue 314. The Run ASAP queue 310, i.e., the actual waterfall processing, is performed between Ready for ASAP step 308 and Waterfall Approval queue 312.

Also shown in FIG. 5C are the Tax Processing Function 316 and Reporting 318. Tax output refers to the ASAP tax processing function previously referred to. Reporting represents the distribution of reports in various formats and access locations. These may include the World Wide Web, printed reports, Internet bulletin boards and FTP sites, etc.

As will be understood, the tasks to be performed will vary from queue to queue and will depend on the current status milestone. The preferred milestone structure and the tasks associated with each milestone are discussed below.

Generally, the user performs a task by selecting the task name from an Actions List on an Active Deals Screen described in connection with FIG. 11. For some actions, e.g., approval, nothing further is required; the workflow management software updates the status records for the deal in Workflow Database 244 (see FIG. 4), moves the deal to the next queue and/or milestone, and updates the listing for the deal on the user's Active Deals Screen. For tasks requiring data input, selecting the task brings up a data entry screen. For tasks involving review and/or editing of data, the reviewer can bring up the appropriate screen to ensure that all data are correct and process the approval or the editor can bring up the appropriate screen in order to edit the data. For yet other actions, e.g., Deny, Un-Approve (withdraw an approval) or Restate (i.e. to correct errors after a payment has been made), supporting comments are required. In those instances, after the task is selected, a comment entry screen appears. The actions available to the user for each queue and milestone, and the associated workflow program actions will now be described.

LRPS Queue

The milestones for the LRPS queue are Not Ready, Data Received, and Denied.

Not Ready (Default):

A deal is automatically placed in the LRPS queue and the Not Ready status as part of the end of cycle processing under control of command processor 240 when a previous payment cycle has been completed. When data for a new monthly cycle is received from servicer 150 (see FIG. 3), the status is updated to Data Received, but the deal remains in the LRPS queue. This may be done manually, or automatically by the workflow management software when the data is received.

Data Received:

At this milestone, the available actions are "Approve" and "Deny". The analyst checks the received data, e.g., by reviewing a summary report from the LRPS subsystem 160', and if it is incorrect, incomplete, or otherwise not ready for further processing, the Deny action is selected from the Actions List on the Active Deals Screen. After supporting comments are entered, the deal is moved to the Data Denied status.

If the received data is ready for further processing, the Approve action is selected, and the deal moves to the Data Prep queue and the Tape Run status.

Data Denied:

At this milestone, the available actions are New Data Received and Approval. If new or corrected data is received, the deal remains in the LRPS queue but its status returns to "Data Received". If new or corrected data is approved, as previously described, the deals moves to the Data Prep queue and its status is changed to Tape Run.

Data Prep Queue

The status milestones for the Data Prep queue are Not Ready, Tape Run, Loan Level Processed and Denied.

Not Ready:

At this milestone, the available actions are "Data Entry" and "Approve". If information, e.g. concerning loan losses, liquidations, foreclosures, etc. must be entered, Data Entry is selected, and an appropriate data entry screen appears. If Approve is selected, the deal goes to the Ready for ASAP queue and the Ready status.

Tape Run:

At this milestone, the available actions are "Deny" and "Approve". If, e.g., it is discovered bad data has been loaded, the system permits correction. To do this, Deny is selected, and the deal returns to the LRPS queue and the Data Denied status. If approve is selected, workflow command processor 240 runs LRPS Sub-system 160'. When that function is completed, the deal is moved to the Loan Level Processed status, but remains in the Data Prep queue.

Loan Level Processed:

At this milestone, the available actions are "Deny", "Approve", and "Copy". If the data is disapproved, e.g., if the beginning balance of a loan does not equal the ending balance for the previous month, the Deny action is selected, and the deal remains in the Data Prep queue but is placed in the Data Denied status. If the data is approved, the deal moves to the Ready For ASAP Processing queue and the Ready status. If the Copy action is selected, the LRPS processed data is transferred to the main Workflow Database 244 (see FIGS. 4 and 5A).

Denied:

At this milestone, the available actions are "Deny to LRPS," "Enter Data," "Run LRPS," "Copy" "and Approve". If Deny to LRPS is selected (e.g. if an error is discovered in the loan-level data), the deal is returned to the LRPS queue and the Denied status. To enter losses, liquidations, real estate owned (REO's), for example, Enter Data is selected, and an appropriate data entry screen appears. If Run LRPS is selected, the LRPS functions are performed and the deal is moved to the Loan Level Processed status within the Data Prep queue. The Copy and Approve actions are the same as described in connection with the Loan Level Processed milestone above.

Ready for ASAP Processing Queue

The associated milestones are Ready and Denied.

Ready:

At this milestone, the available actions are denied, "Run ASAP", "Enter Data", "Add Special Headers/Footers" and "Add Loan Level Information". If Deny is selected, the deal is returned to the Data Ready Queue and the Data Denied milestone. If Run ASAP is selected, command processor 240 initiates the ASAP Waterfall Processing function. When this is completed, the deal is moved to the Waterfall Approval queue and Ready status. If Enter Data is selected, an appropriate screen appears. When the data entry is complete, the deal remains in the same queue and milestone. Similarly, if the Add Special Headers/Footers or Add Loan Level Information tasks are selected, appropriate input screens appear. Upon completion of the required data input, the deal remains in the ready for ASAP Processing queue and Ready status.

Denied:

At this milestone, the available actions are "Deny" or "Run ASAP". If Deny is selected, the deal is returned to the Data Ready queue and the Data Denied status. The Run ASAP task results in the same actions described in connection with the Ready milestone above.

Waterfall Approval Queue

There is only one milestone for the Waterfall Approval queue, Ready. At this milestone, the available actions are "Deny" and "Approve". As previously noted, the approval process may involve several verification steps, in which different tests are applied. If any one of these indicates a problem, the Deny action is selected, and the deal moves to the Previous Deny Point with Denied Status. If a particular test is successful, the Approve action is selected, and the deal moves to the next approval queue, i.e. ready for performance of the next verification test. When the last required approval has been given, the deal moves to the Payment queue and Final Approval status.

Payment Queue

The milestones for the Payment queue are Final Approval, Received by Payment Systems, and Payment Made.

Final Approval:

At this milestone, the Waterfall data goes automatically to the RTP subsystem for processing. When this has been done, the status is changed to Received by Payment Systems.

Received by Payment Systems:

There are no specific tasks associated with this milestone. When the payment processing is complete, however, the status of the deal changes to Payment Made.

Payment Made:

At this milestone, there are no specific tasks, but the end of cycle processing is automatically performed, and the deal is returned to the LRPS queue and the Not Ready status. Also, the date for the next distribution is selected.

Common Tasks

In addition to the tasks described above which are associated with specific queues and milestones there are tasks or actions which may be performed at all queues and milestone levels. These are Comments, Go To Deal History, Cancel, Modify Deal Contacts, View Rules File, Change Distribution Date, Print Reports and Un-Approve (the last two, however, are not available for a deal in the Not Ready status).

The Comments action is used to record descriptive information at any stage of processing, and also to support Deny Un-Approve, or Restate actions. If Comments is selected, a comment entry screen described in detail below appears. When the comment has been stored, the comment entry screen closes. The queue and/or status changes as necessary for Deny Un-Approve or Restate actions. There is no change in queue or status if a comment is recorded for other reasons.

If the user selects Go To Deal History, an on-screen listing described below appears. No change of queue or status results from this action.

Selecting the Cancel action terminates work in progress and returns the user to a Main Menu as described below.

If the Modify Deal Contacts task is selected, the user is presented with a staff/contact details screen described below. This may be used to add or modify external contacts. (Changes in internal staffing are not permitted). No change in queue or status is associated with this task.

The rules file contains information which defines the computation processes for a particular deal and the required parameters. Selecting the View Rules File action brings up a read only display of this information.

If an upcoming distribution date needs to be changed for some reason, the Change Distribution Date action is selected. This brings up a data entry screen in which appropriate information is entered. The Print Reports task permits the printing of available reports.

The Un-Approve task is used when approval in a particular queue must be withdrawn. For those users authorized to do so, selecting this action brings up a distribution history screen in which the unapproval is registered, and the comment entry screen appears in which the user records a justification for the unapproval. When this has been completed, the deal is moved to a new queue and/or status depending on the particular deal, function, etc. at which the unapproval took place (usually the first waterfall approval stage).

Figure 5D:
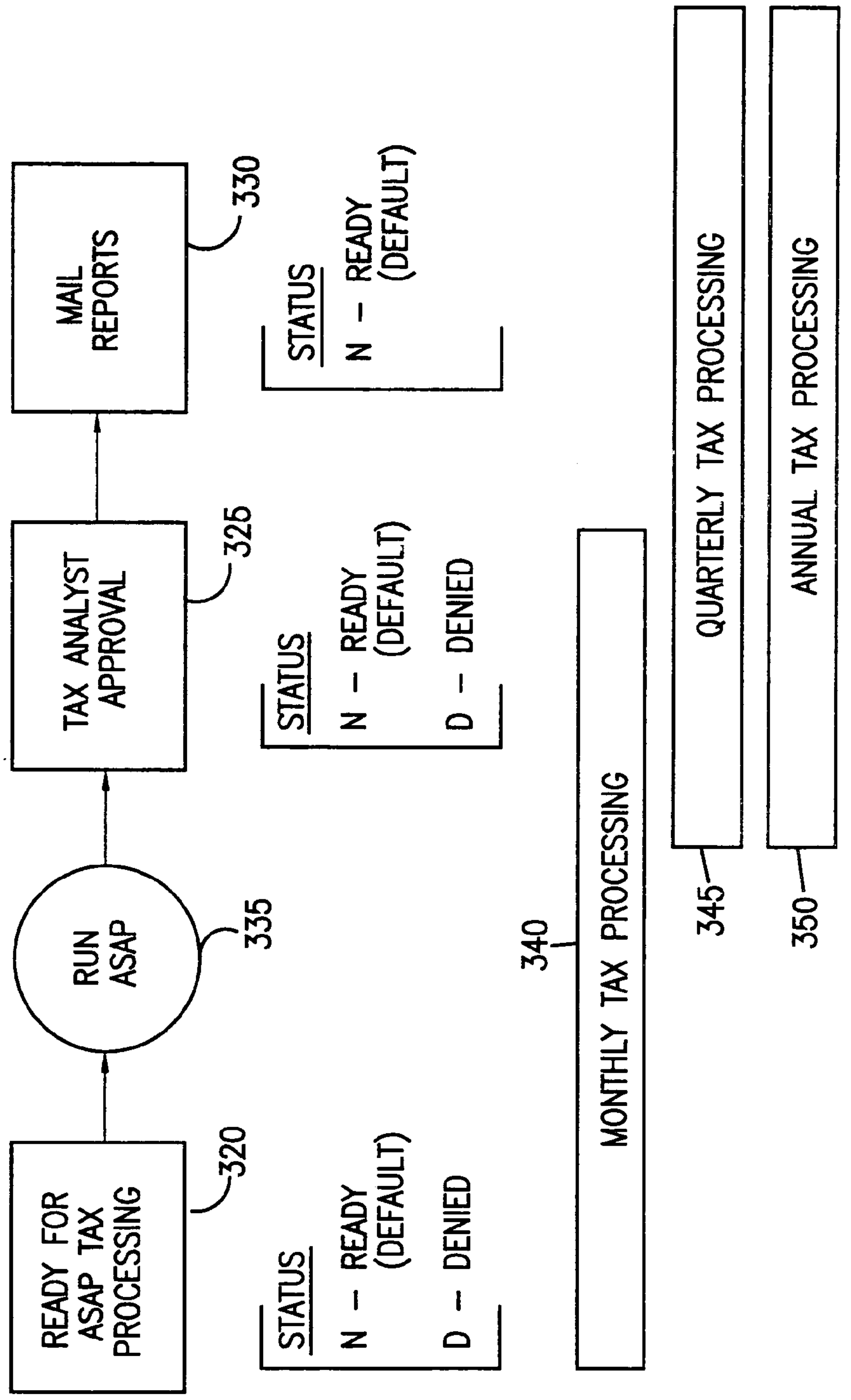
Figure 5E:
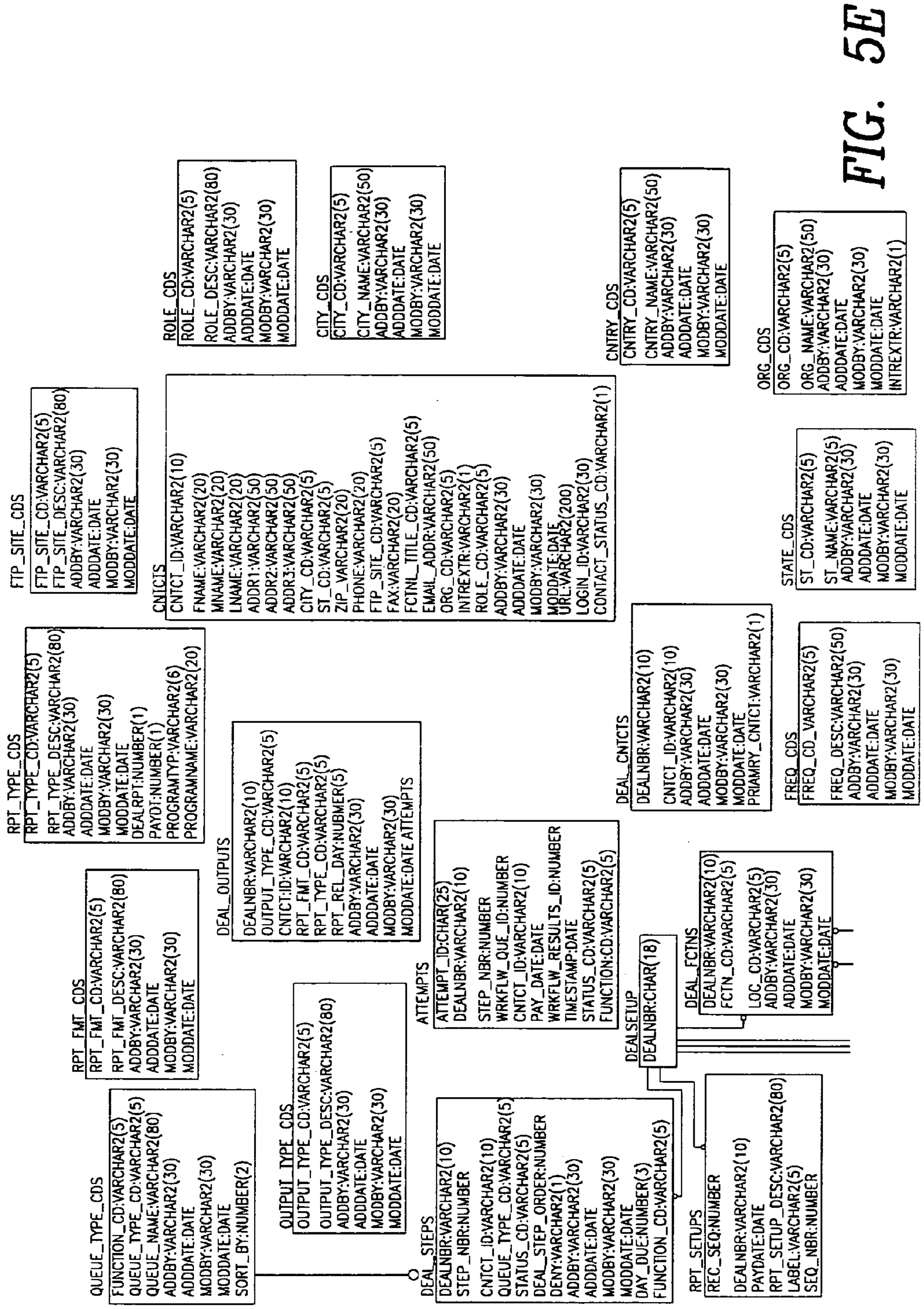
Figure 5F:
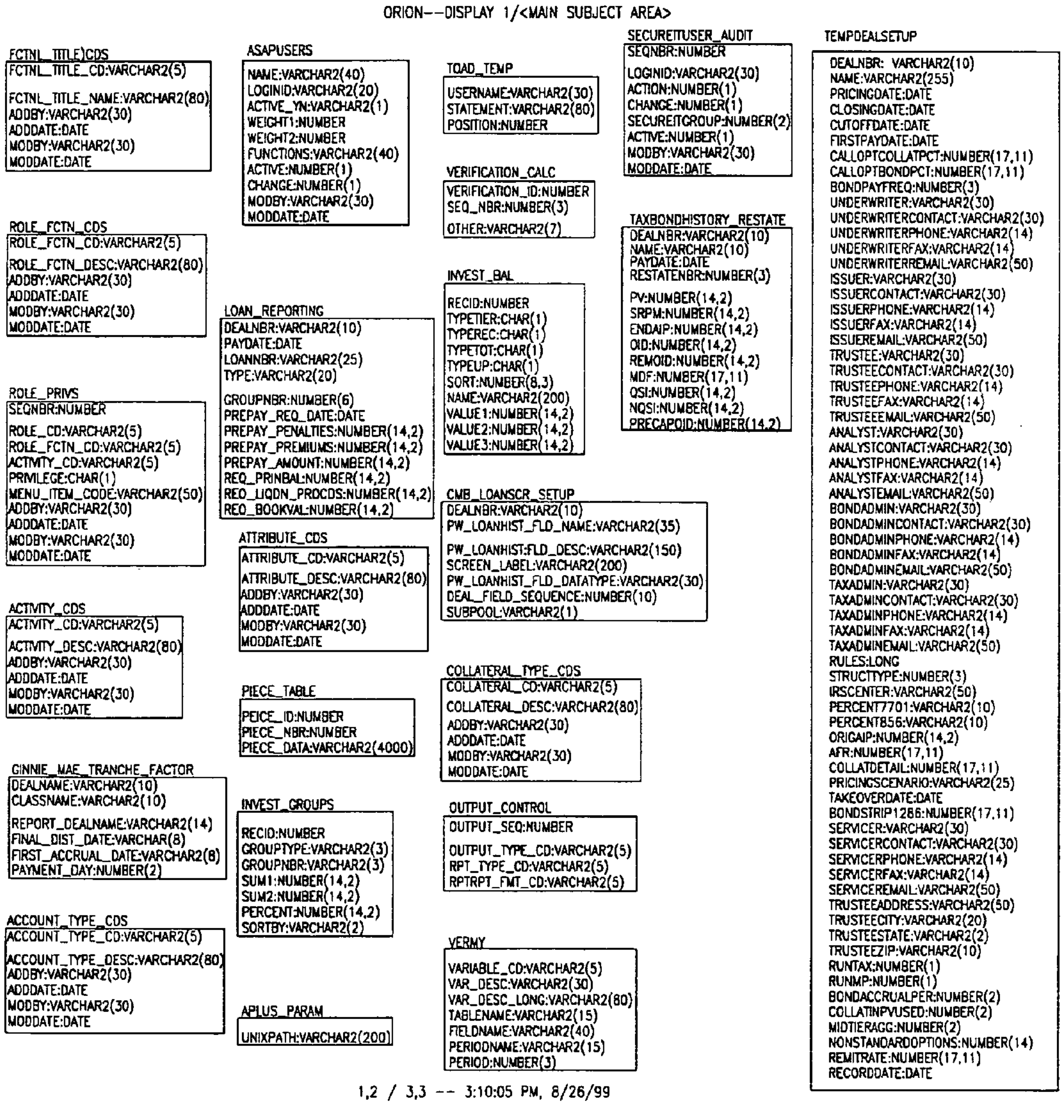
Figure 5H:
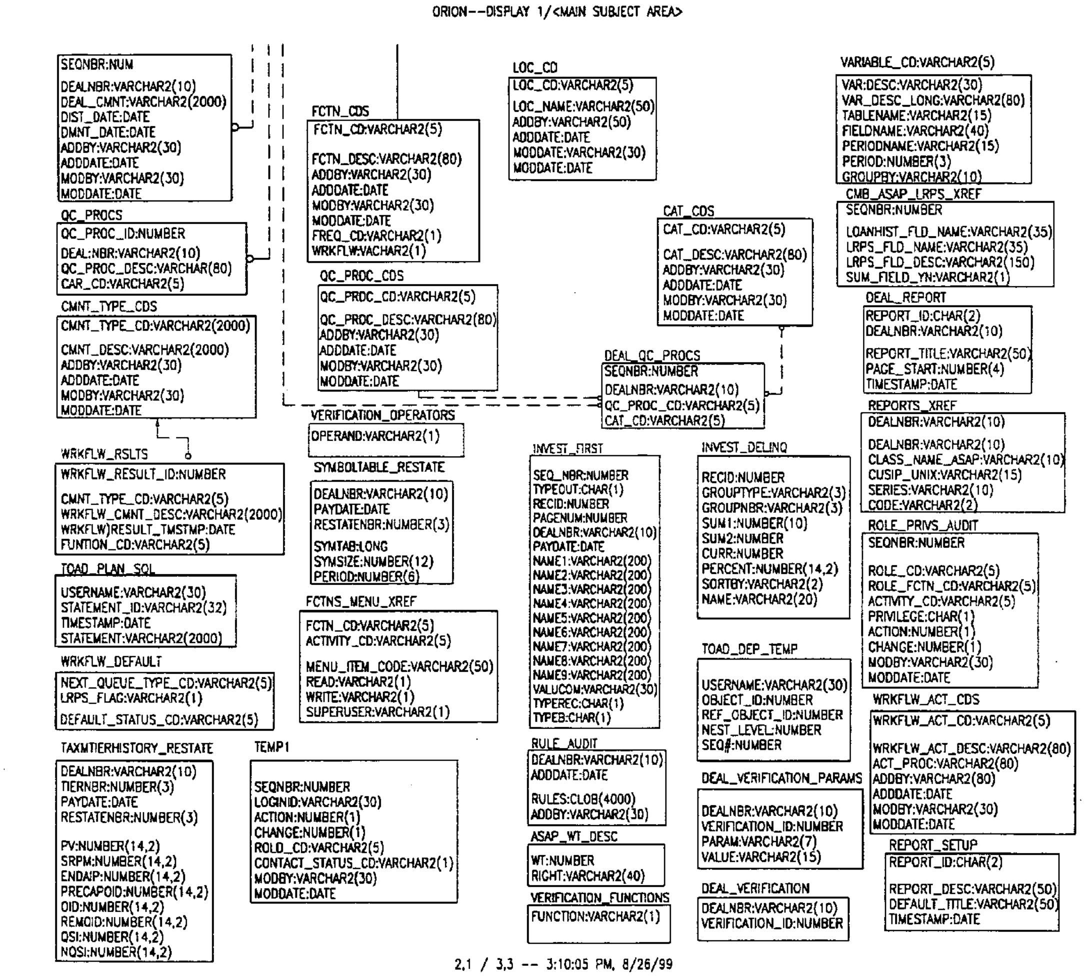
Figure 5I:
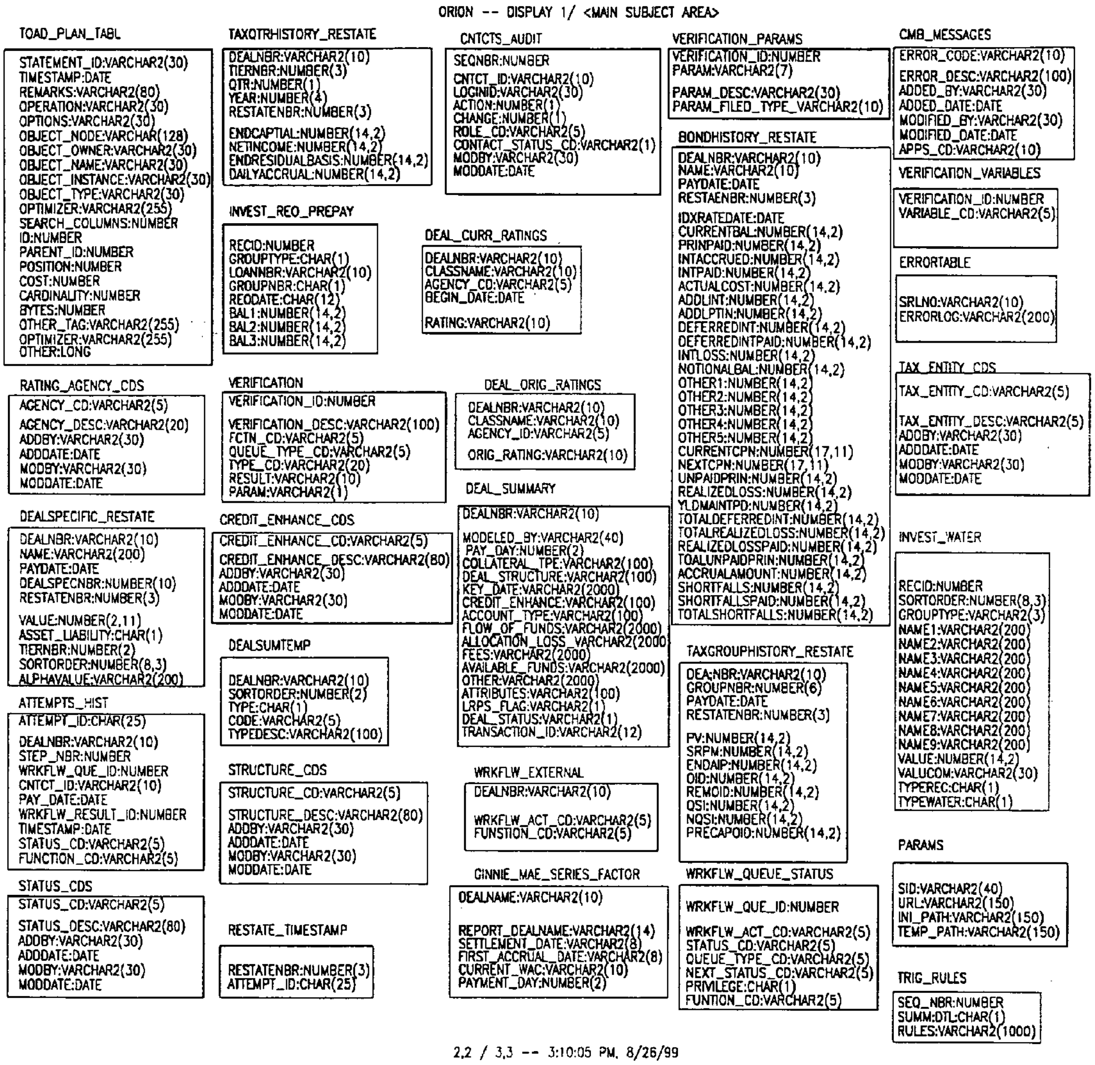

FIG. 5D illustrates the workflow organization for the tax processing function. The queues for this function are Ready for ASAP Tax Processing queue 320, Tax Analyst Approval queue 325 and Reporting queue 330. The Run ASAP step 335, i.e., the actual tax processing, is performed between Ready for ASAP queue 320 and Approval step queue. As will be recalled from FIG. 5A, there are monthly, quarterly and annual tax cycles. As indicated by bracket 340 in FIG. 5D, monthly tax processing involves the ASAP Tax Processing and Tax Analyst Approval queues. The quarterly and annual tax processing functions use data produced by the sequence of monthly tax computations, and thus involve only the Tax Analyst Approval and Reporting queues, as indicated by brackets 345 and 350.

As in the case of waterfall processing, there are specific tasks and actions associated with the tax processing queues and status milestones. These are described below.

Ready for ASAP Processing Queue

The milestones for the Ready for ASAP Tax Processing queue are Ready and Denied.

Ready:

At this milestone, the actions available are "Enter Data" and "Run ASAP". If Enter Data is selected, a tax data entry screen appears. No change in queue and/or status is associated with this action. If Run ASAP is selected, the required data is made available to the ASAP tax modules and the tax computations are performed. When the computations are completed, the deal moves to the Tax Approval queue and Ready status.

Denied:

At this milestone, the actions available are also "Enter Data" and "Run ASAP". The steps associated with these tasks are the same as described in connection with the Ready milestone above.

Tax Approval Queue

The milestones for the Tax Approval queue are Ready and Denied.

Ready:

At this milestone, the actions available are "Deny", "Tax Reports", and "Approval-Monthly", "Approval-Quarterly Annual". Selecting Deny moves the deal to another queue determined in accordance with the structure of the specific deal. The workflow path for this is established during deal set-up, as described below in connection with FIG. 7E. The Selection of Tax Reports action brings up a list of tax reports.

As in the case of waterfall processing, there may be several levels of approval associated with each of the tax processing cycles. As each approval is obtained, the deal is moved on to the next approval step. For example, in the case of monthly approval, when the last required approval has been given for a particular month, the approval process for the next month begins. Similarly, in the case of quarterly tax approval, when one level of approval has been given, the deal moves on to the next required approval level. When the last required approval has been given, the deal moves to the Mail Reports queue and Ready status.

Denied:

At this milestone, the actions available are "Deny", "Tax Reports", Approval-Monthly and Approval-Quarterly/Annual. Selection of any of these actions results in the same sequence of events described in connection with the Ready milestone for the Tax Approval queue.

Reports Queue

There is only one milestone for the Reports queue, namely, Ready. At this milestone, the available actions are "Mailed" and "Tax Reports". These are applicable only to quarterly and annual processing. If the Mail action is selected, the reports are printed, the next tax processing cycle is identified, and the deal returns to the Ready for Tax Processing queue and Ready status for that period. Selection of the Tax Reports action results in the same events described above in connection with the Tax Approval queue.

Common Tasks

In addition to the tasks described, there are several tasks available in all queues and milestone statuses. These are Comments, Waterfall Reports, Auto Verification, Go To Deal History, Cancel, Modify Deal Contacts and Un-Approve-tax. The events associated with the Comments, Go To Deal History, Modify Deal Contacts and Un-Approve actions are the same as described above in connection with waterfall processing. Selection of the Waterfall Reports action brings up a list of related waterfall reports from which a report may be selected for viewing or printing. Selection of the Auto Verification action brings up a list of related automated verification reports described below which are available for the current queue and status milestone, from which a report may be selected for viewing or printing.

As in the case of waterfall processing, when tax data is denied or disapproved, a supporting comment must be recorded. Thus, when the Deny or Un-Approve actions are selected, comment screens appear. Required changes in queue and/or milestone status do not take effect until the supporting comments have been recorded.

Users access the various features of the system according to the present invention through a series of data entry screens and menus. The data objects for these, and the associated triggering events and methods are programmed using the RDBMS. As will be appreciated, the available programming functions and techniques will depend on the RDBMS on which the system is implemented, but the use of the RDBMS, and also techniques for database optimization, will be understood by those skilled in the art. Accordingly, in the interest of brevity, a detailed description of the underlying database structure has been omitted, and only the functions performed by the system, and the associated user interface screens are described in detail. However, FIGS. 5E through 5K comprise a diagram of the database structure for the workflow management system according to the invention.

Figure 6:
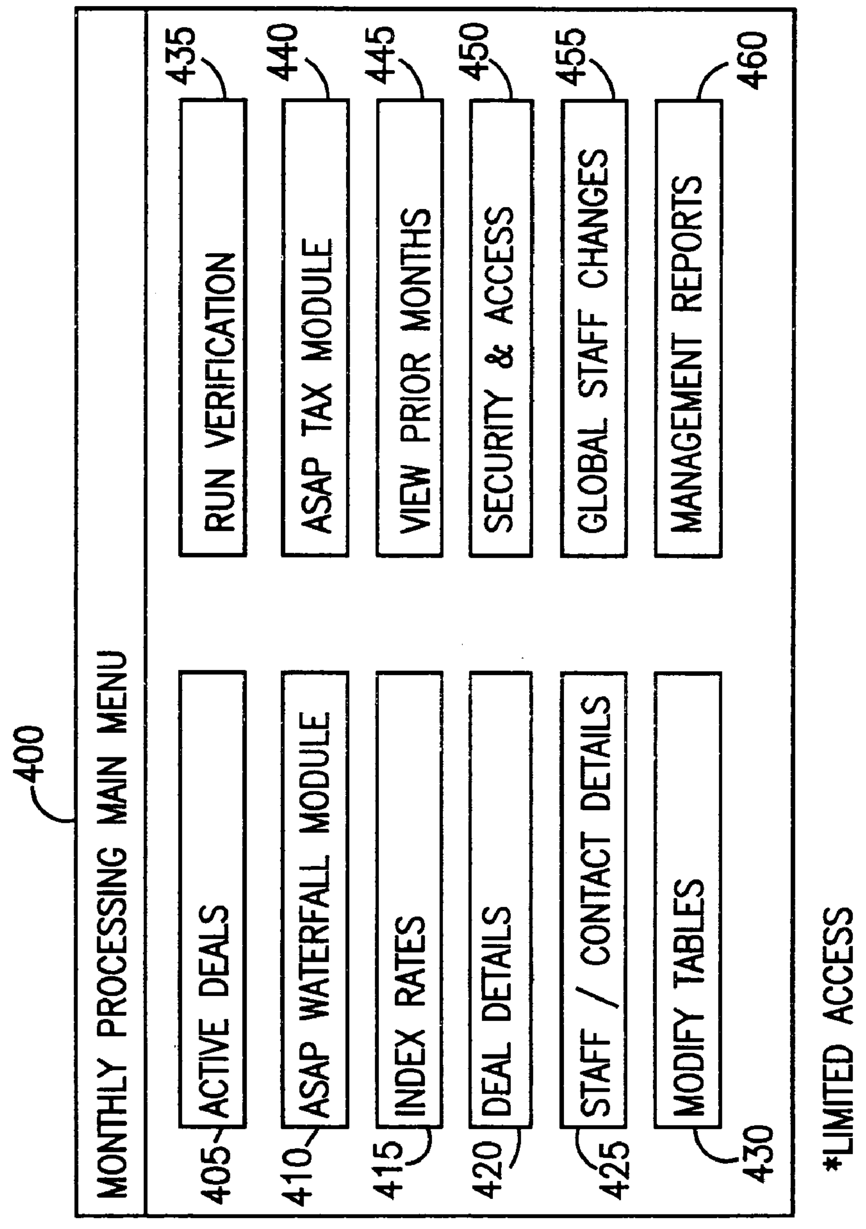
FIG. 6 shows an example of a Main Menu in accordance with the invention.

FIG. 6 illustrates an example of a Main Menu, generally denoted 400, which may be used as the general entry point to the various system functions. Main Menu 400 may be invoked a number of common ways, e.g., from a drop-down menu, a menu bar, by an icon, etc.

Main Menu 400 displays a series of buttons which provide access to the available system functions. These include a Waterfall Active Deals button 405, an ASAP Waterfall Module button 410, an Index Rates button 415, a Deal Details button 420, a Staff/Contact Details button 425, a Modify Tables button 430, a Run Verification button 435, an ASAP Tax Module button 440, a View Prior Months button 445, a Security & Access button 450, a Global Staff Changes button 455 and a Management Reports button 460. Each of these functions is described in detail below.

FIGS. 7A through 7H illustrate the Steps Involved In setting up a deal. These correspond to steps 270 and 272 shown in FIG. 5A.

Staff Information Set-Up

Figure 7A:
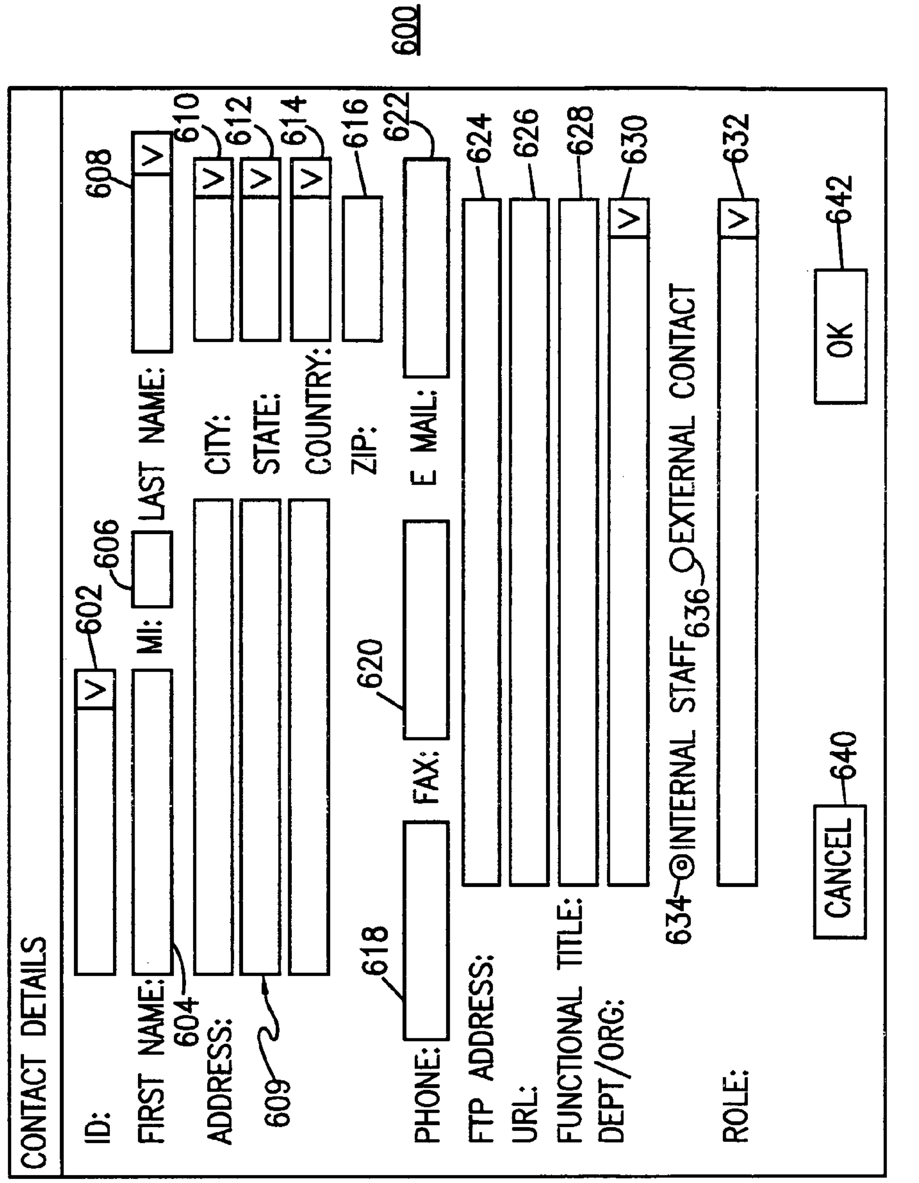
FIGS. 7A though 7H illustrate examples of data input screens for deal setup.

FIG. 7A illustrates Staff/Contact Details Screen 600. This is the data entry form for a Master Contacts Table in Workflow Database 244. Here, information is recorded about individuals having responsibility for or other involvement in a particular deal. This is accessed by selecting the Staff/Contact Details button 425 on Main Menu 400 (see FIG. 6).

Screen 600 may be used to select contacts for a particular deal from among individuals already in a Master Contacts Table, to edit previously existing contact information in the Master Contact Table, or to create records for new individuals. For names already in the database, the user may select either an ID number from a drop-down list for ID field 602 or a last name from a drop-down list for Last Name field 608. The data objects on screen 600 are programmed so that when an existing name or ID number is selected, the remaining fields are automatically populated from the record corresponding to the selected name or ID number.

To edit existing records, the user simply revises the information in the displayed fields as necessary, and selects OK push-button 642. This is programmed to display a confirmation message, such as, "Are you sure you want to save changes?", and upon confirmation, to update the record, and to return the user to Main Menu 400. It will be understood, of course, that the methods associated with OK push button 642 may be alternatively programmed so the user has the option to remain in an empty Staff/Contact Details Screen 600.

To add new records to the Master Contacts Table, the user invokes the Add Record function. In the illustrated embodiment, this may be accessed by commencing to type information in any of the available fields, but an "Add Record" push button may be provided if desired. New ID numbers may be created sequentially or in any other desired manner. For example, employee ID numbers may be used for employees of the trustee, and screen 600 may be programmed so that entry of an employee ID number in field 602, or the name of an existing employee in field 608, causes the remaining fields in screen 600 to be populated automatically from the corresponding database record. An ID number from a non-employee sequence would be assigned for outside contacts.

As illustrated in FIG. 7A, the data objects for the City, State, Country, Department/Organization and Role fields are programmed as drop-down lists. Existing selections may be used when creating a new record, or information may simply be typed into the text boxes for the fields.

After screen form 600 has been completely filled in, the user selects OK button 642 which functions as previously described. Alternatively, if the user decides not to save the newly entered data, a cancel button 640 may be selected. This is programmed to display a confirmation such as "Are you sure you do not want to save changes?", and upon confirmation, to discard the changes, and to return the user to Main Menu 400.

Deal Details Setup

Figure 7B:
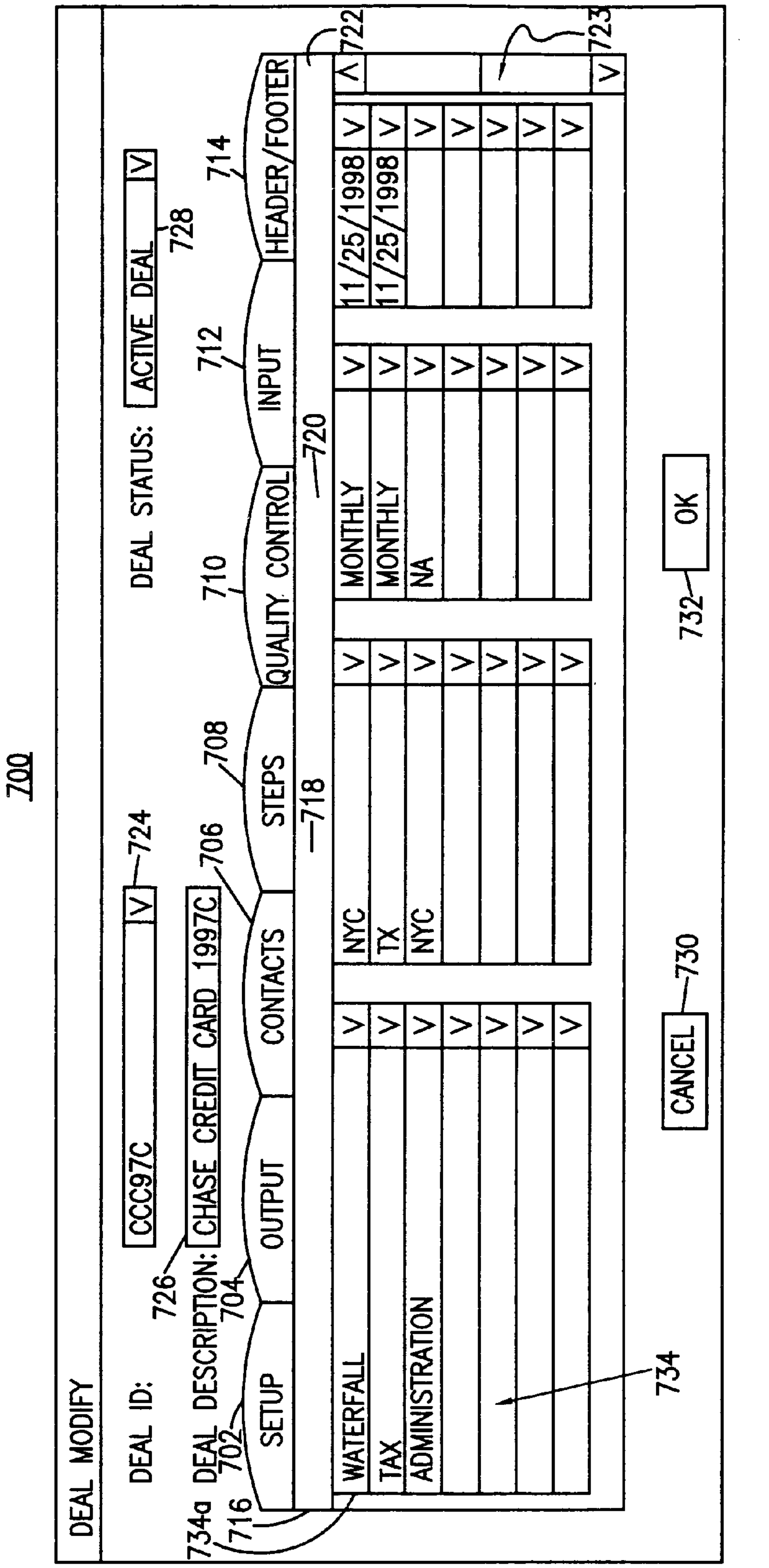

FIGS. 7B through 7E illustrate a series of Deal Modify data entry screens for setting up and/or editing some of the workflow features for a deal. The set up functions are accessed by selecting the Deal Details push button 420 on Main Menu 400 (see FIG. 6). As illustrated in FIG. 7B, a series of tabs provides access to the different setup screens. These include Setup tab 702, Output tab 704, Contacts tab 706, Steps tab 708, Quality Control tab 710, Input tab 712, and Header/Footer tab 714.

Deal Status/Functions

Screen 700 shown in FIG. 7B corresponds to Setup tab 702. This is used to enter data concerning the status of a deal, the processing functions to be performed, locations at which the functions are performed, the frequency of each task and an initial distribution date for the function. Screen 700 is programmed to display drop-down list boxes 724 and 728 for Deal ID and Deal Status fields, a Deal Description text box 726, and an embedded sub-form 723 for entry of information concerning the trustee's functions. Deal ID field 724 is linked to a Master Deal Table in Workflow Database 244. The drop-down list displays the existing deals from which the user may select. Records may not be added to the Master Deal Table from screen 700. Changes must be made by the database administrator, as described below.

Deal Description text box 726 is automatically filled in from a record in a Master Deal Description Table in Workflow Database 244 corresponding to the entry in field 724.

A selection for the Deal Status field 278 is made from a drop-down list which may include choices such as New, Active, Dead, etc. The "New" status may advantageously by used to designate a deal which is in the setup process. When setup has been completed, the deal may be designated as "active". At that time, the deal goes "on line", and is managed by the workflow program as described herein.

Sub-form 723 is comprised of a series of rows, each representing a database record for a particular function. The fields (columns) for each record may, for example, be Function, 716, Location 718, Frequency 720 and First Date 722.

The drop-down list for the Function field 716 is linked to a Master Function Table in the Workflow Database 244. The entries may, for example, include Waterfall, Tax Administration, Paying, etc.

The drop-down list for the Location Field 718 is linked to a Master Location table in the Workflow Database 244, which lists the locations, e.g., processing centers, for the trustee's securitization support operations. To accommodate the possibility that the trustee performs a single function only at some locations and multiple functions at other locations, the database object for field 718 may be programmed to limit the entries which appear in the drop-down list in accordance with the selection made in field 716. For example, if waterfall processing is only done at one location, when "Waterfall" is selected for field 716, only that location appears in the field 718 drop-down list. If waterfall processing is done at two locations, the drop-down list includes both locations.

The drop-down list for Frequency field 720 is linked to a Master Frequency table in Workflow Database 244. This lists the processing periods associated with the various deals being managed by the system. The entries may include, for example, "Monthly", a specific day of the month (or the previous or next business day), "Quarterly", "N/A" (not applicable), the latter for non-periodic activities, etc. Additions to the Master Frequency table may not be made by the user from screen 700, but only by the database administrator.

Some functions may be performed only at specified frequencies; others may have no associated frequency. To accommodate this, the data object for field 720 may be programmed so the drop-down list displays only permitted values depending on the selection for field 716.

First Distribution Date field 722 is used to record the initial date or period for each function. The data entered here in conjunction with the corresponding data entered in field 720 is used to calculate recurring dates for the particular function and is used by the workflow prompting functions described below. Field 722 is rendered inaccessible for those functions not requiring an initial date.

Screen 700 also includes a cancel button 730 and an OK button 732. These function as previously described.

The default structure for sub-form 723 has seven rows, 734, of which the first three, such as 734*a*, contain records corresponding to required functions. Sub-form 723 is designed to expand vertically if more than seven functions are required.

Report Setup

Figure 7C:
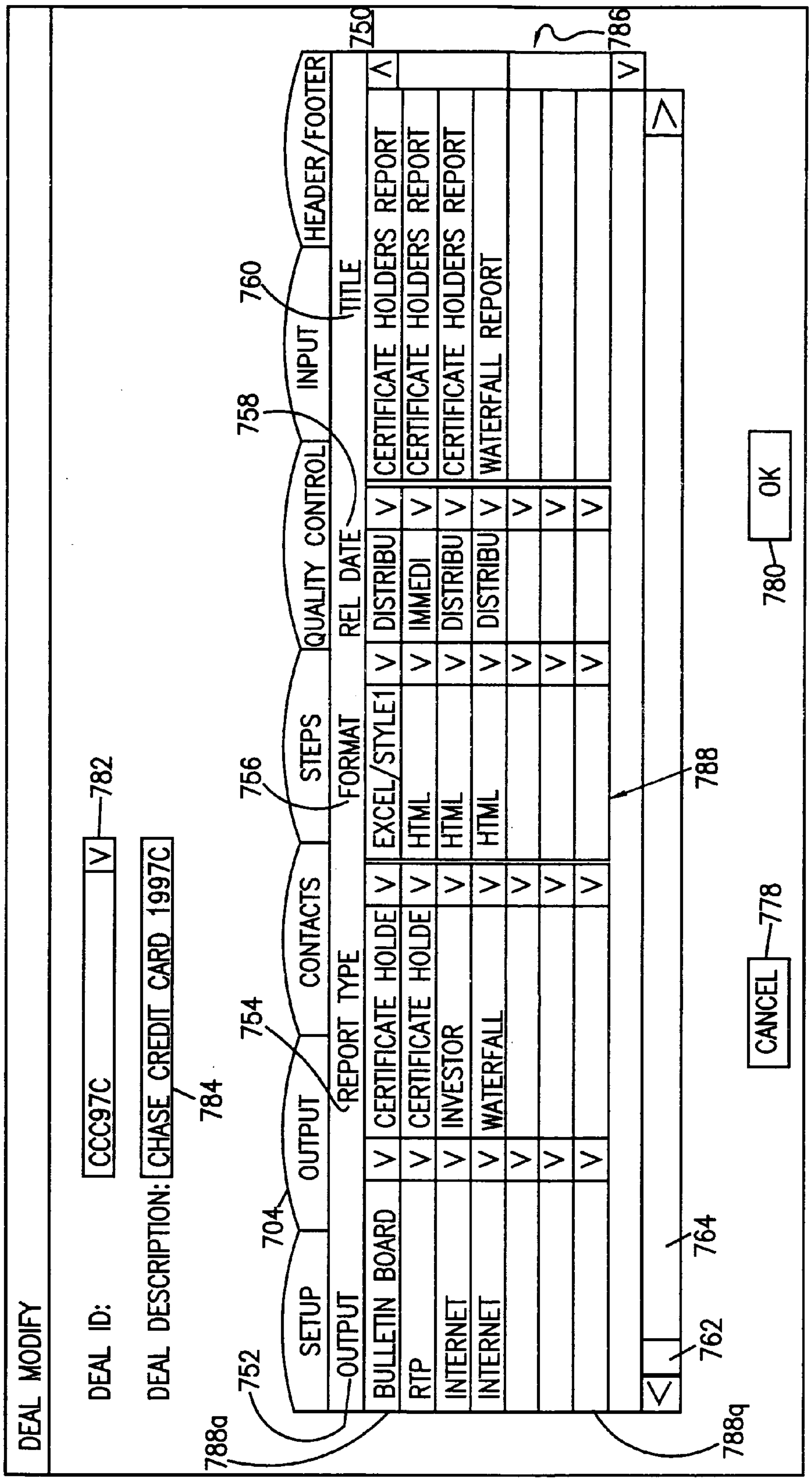

FIG. 7C shows data entry screen 750, which appears when Output Tab 704 is selected. This is used to enter data concerning reports to be produced. The data object for screen 750 is programmed to display a drop-down list box for Deal ID field 782 and a text box 784, in which a Deal Description is automatically entered, corresponding to the Deal ID selected.

Information concerning the required reports is entered in an embedded sub-form 786, comprised of a series of rows 788, to display a database record for a particular report, and a series columns to display the fields in the record. In the example illustrated, the available fields include Output 752, showing the intended destination for the report, Report Type 754, Report Format 756, Release Day 758, Report Title 760. There may also be fields for Recipient Name, Company Name, Fax Number, Bulletin Board Address and FTP Address (not shown).

As will be appreciated, depending on the size of the monitor and resolution being employed, the available fields may not all be visible on the monitor at one time. Thus, for purposes of illustration, only the first five fields have been shown. A scroll button 762 on a scroll bar 764 allows display of the remaining six fields. Programming the scroll bar may be done in any conventional or desired manner.

The underlying data object for each field is programmed as a drop-down list box linked to a master table in Workflow Database 244 which displays only the permitted entries for that field.

In the example illustrated, the default structure of sub-form 786 has seven rows 788, of which the first four, such as 788*a*, already contain records corresponding to required reports. Sub-form 786 is programmed to expand vertically to accommodate additional reports.

The drop-down list for the Output field 752 is linked to a Master Output Table in Workflow Database 244. The entries may, for example, include Bulletin Board, RTP (see FIG. 3), World Wide Web, E-Mail, FTP, etc.

The drop-down list for Report Type field 754 is linked to a Master Report Table in Workflow Database 244. The entries may, for example, include Investor's Report, Waterfall Report, etc. Fields 752 and 754 are not mutually exclusive. In other words, as shown in FIG. 7C, Investors' Reports may be distributed by Bulletin Board, on the Internet, and sent to the RTP module (see FIG. 3) for payment processing. Similarly, both Investor's Reports and Waterfall Reports may be distributed over the Internet. Thus, one or more Destination/Report Type combinations may be selected.

Some output destinations may be associated with only one report type, for example, only investors' reports would be sent to the RTP module. To accommodate this, the drop-down list for field 752 is programmed to display only entries which are valid for the selection made in field 754, and vice versa.

The drop-down list for Format field 756 is linked to a Master Format Table in Workflow Database 244 to display the available report formats. As will be understood, the properties of the individual report objects themselves determine the actual report format. The preprogrammed formats are designed to accommodate a wide range of user access capabilities. For example, available formats may include HTML, ASCII, various commercial spreadsheet format, etc.

Based on the Output and Report Type selections, the format object may be programmed to provide a default format selection. It may also be desired that a given report be available in more than one format, and/or that some reports be available only in one or more specific formats. The underlying objects for fields 752, 754 and 756 may be programmed to provide such features.

The drop-down list for Release Day field 758 may include selections such as "Immediate", or "Distribution Date". Selection of the latter displays a text box in which a specific date may be entered. The default selection for field 758 is Distribution Date. The data object for field 758 is programmed to permit entry of only a single date for a given report, irrespective of the number times the particular report type appears in sub-form 786.

Title field 760 provides a default report title from a Master Title Table in Workflow Database 244 depending on the report type selected in field 754. However, the underlying data object is programmed to permit the default to overridden.

The remaining fields, pertain to information about the intended recipient of the report. The data objects for these fields are programmed to display drop-down lists linked to the Master Contacts Table. Preferably, the objects for Recipient Name, Company, and Fax Number are programmed to permit selection only from the associated list box, while the objects for the Bulleting Board, FTP Address and Others fields may accommodate manual data entry.

There are also available Cancel and OK push buttons 778 and 780. These function as previously described.

External Contact Setup

Figure 7D:
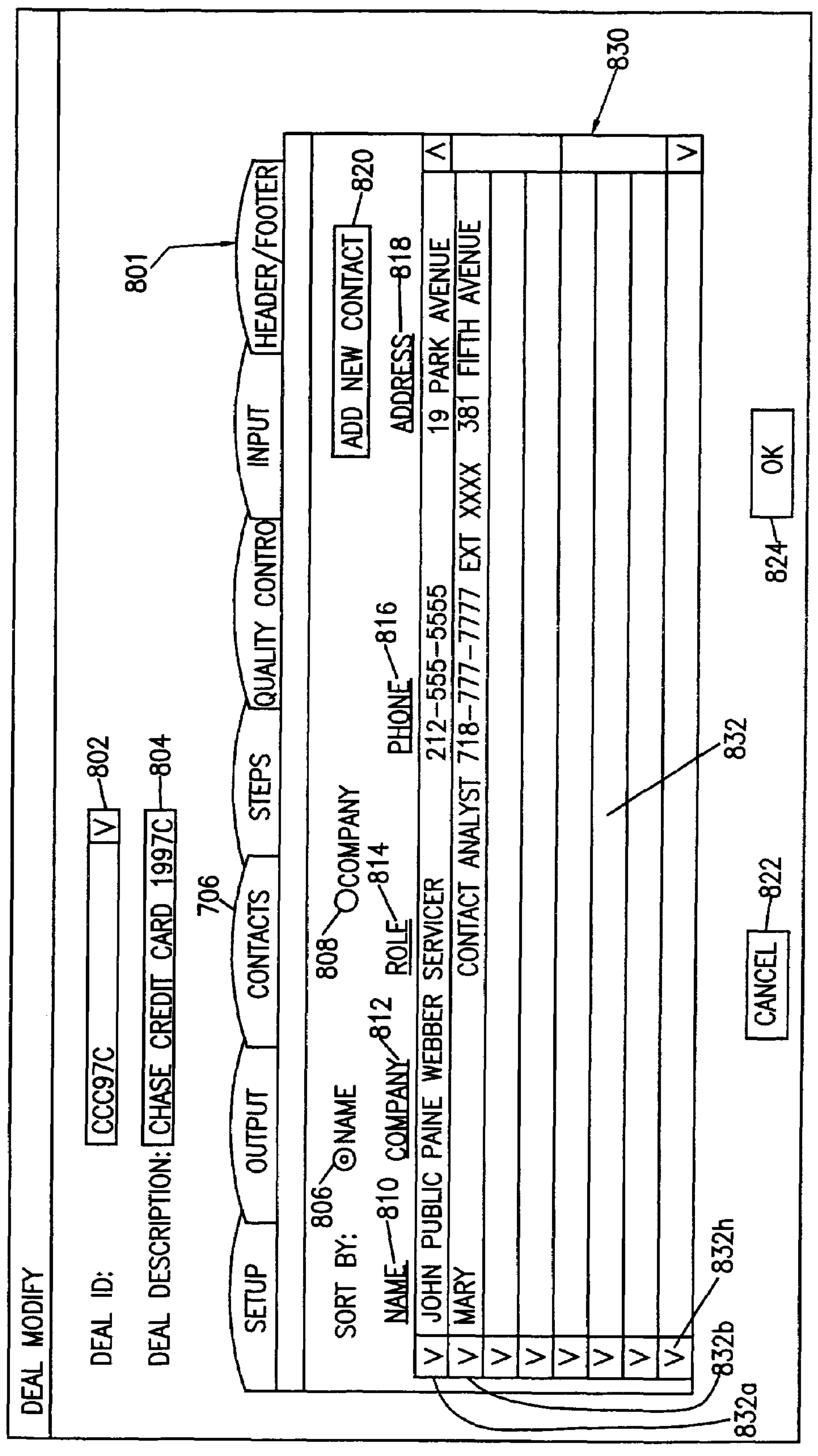

FIG. 7D shows data input form screen 800, which appears when Contacts tab 706 is selected. This screen is for selection of external contacts for a particular deal. New contact entries are not made from this screen; this must be done from screen 600 (see FIG. 7A), accessed by selecting the Add New Contact push button 820, or by push button 425 on Main Menu 400 (see FIG. 6).

Screen 800 includes a drop-down box 802 which displays a list of deal identification numbers and a text box 804 in which a Deal Description is automatically entered, depending on the deal ID selected in drop-down list box 802.

The selected contacts are listed in an embedded sub-form 830, comprised of a series of rows 832, each displaying database record for a particular individual or company, and five columns 810 through 818, which display the fields in the respective records.

In the illustrated example, the available fields are Name 810, Company 812, Role 814, Phone 816 and Address 818. The data object for each row is programmed as a drop-down list box linked to a Master Contacts table but is programmed to display only external contacts. The list is in alphabetical order, sorted by last name or by a company name, depending on whether Sort By Name radio button 806 or Sort By Company radio button 808 is selected. The default entry is blank. Advantageously, the drop-down list object may be programmed for smart look-up, i.e., the list scrolls automatically as a sequence of letters are typed in the text box. Upon selection of a contact, all the columns (fields) for that record are automatically populated.

In the example shown, the default structure for sub-form 830 comprises eight rows 832, of which the first two, 832*a* and 832*b*, contain records corresponding to selected contacts. It should be understood, however, that the number of contacts associated with a particular deal may vary, and sub-form 830 is programmed to expand vertically as necessary.

Screen 800 also includes Cancel and OK push buttons 822 and 824. These function as previously described.

Queue & Responsibility Setup

FIG. 7E shows data entry form screen 850, which appears when Steps tab 708 is selected. This screen is for set up of the queues for each function as described in connection with FIGS. 5C and 5D, and other information concerning those functions, such as the order of the processing steps and the responsible internal staff member.

Screen 850 includes a drop-down list box 882 which accesses a list of deal identification numbers and a text box 884 in which a Deal Description is automatically entered, corresponding to the selected Deal ID.

Screen 850 also includes an embedded sub-form 852, comprised of a series of rows 856 which display the database records for the selected queues, and six columns 856 through 862 which display the fields (described below) in the respective records.

Sub-form 852 includes a drop-down list box 854 linked to the Master Function table in Workflow Database 244 from which the available processing functions are selected. As discussed in connection with FIG. 5C, these include Waterfall-Monthly, Tax-Monthly, Tax-Quarterly, and Tax-Annual. Using sub-form 852, the workflow details for each function are specified separately. The functions are selected (in drop-down list 854) one at a time, and the desired information is entered in each of fields 856 through 862. After a function has been set up, the information is stored using OK push button 870. Screen 850 is then re-accessed, and the process repeated as many times as necessary to set up all the required functions.

In the example illustrated in FIG. 7E, the default structure for sub-form 852 has ten rows 863, of which the first eight, such as 863*a*, contain records corresponding to selected queues for the Waterfall-Monthly function selected in list box 854. Since the number of queues required may vary depending on the function, sub-form 852 is programmed to expand vertically as necessary.

The five fields available in sub-form 852 are a Deny field 856, a Queue Type field 858, a Name field 860, a Role field 861 and a Date Due field 862. Deny field 852 is programmed as a series of check boxes. Queue Type field 858 is programmed as a drop-down list box linked to a Master Queue Table in Workflow Database 244.

As will be understood from FIGS. 5C and 5D previously described, the available queue types are different for each function. Field 858 is programmed to present only those queues applicable to the function selected in field 854.

The drop-down list presents the available queues in the default processing order. However, one of the programming features of field 858 is that the sequence may be edited using the Insert push button 864, which adds a blank line preceding a selected line and the Delete button 866, which deletes a selected line (a confirmation query may be presented, if desired, which must be responded to before the actual deletion takes place).

Another programming feature of field 858 is that more than one entry may be selected from the drop-down list, e.g., by using the CTRL and SHIFT KEYS on a standard keyboard in conjunction with a mouse or other pointing device. In addition, some queues may be repeated, while others may be used only once for each processing function. For example, the Release to Output and Run ASAP queues are performed only once per processing cycle, but the Approval queue may be used as many times as necessary for the verifications which will be performed.

Name field 860 is used to identify the individual responsible for the particular queue. The drop-down list for this field is linked to the Master Contacts Table. Only internal staff names are listed, and selections are limited to those names on the list.

Among the other programming features of the drop-down list for field 860 are alphabetical ordering by last name, smart look up, and vertical scrolling. Upon selection of a responsible individual from the list, the Role field 861 is automatically filled in from data in the Master Contacts Table.

A name must be selected for each queue, except that name selection is not permitted for the Run ASAP and Release To Output queues. Otherwise, names can be used and repeated as needed.

Due Date field 862 represents the date of the month on which the particular queue is expected to be completed. In the illustrated example, field 862 is programmed as a text box which accepts numeric entries from 1 through 28. As will be understood, only one date may be selected for each line 863 in sub-form 852.

Referring back to Deny field 856, there is a check box such as 886(*a*) associated with each existing line in sub-form 852. These are programmed as flag fields, and the presence or absence of a check in a particular box defines the data flow path in the event of a data or processing error which results in a "Deny" action. For a denial in a particular queue, the task is returned to the nearest checked queue above in the processing order, except that if the denial takes place in a checked queue, the task is returned to the immediately previous queue. The name of a responsible individual must be entered in Name field 860 for any Deny field which is checked.

Verification Setup

Figure 7F:
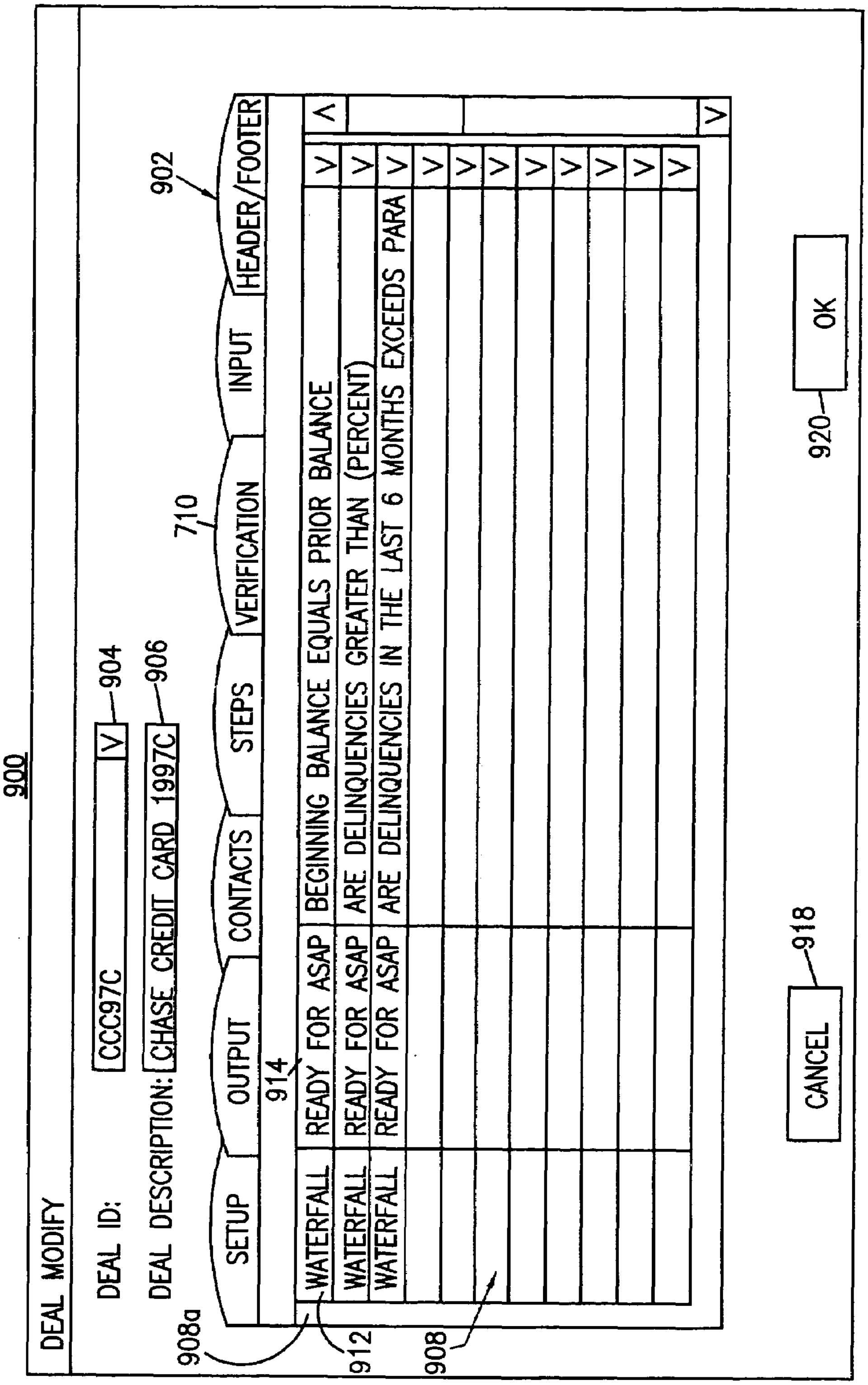

FIG. 7F shows a data entry screen 900 which appears when Verification tab 710 is selected. This is used to specify predefined automated verification (quality control) procedures. The manner in which these procedures are defined is described in detail below in connection with FIGS. 15 through 17.

Screen 900 is linked to the Master Deals Table, and is programmed to display a drop-down list of existing Deal ID numbers from which the entry for field 904 is selected. A Deal Description text box 906 is automatically filled in with a deal description corresponding to the selected Deal ID. Also displayed is an embedded sub-form 902, comprised of a series of rows 908, which display the database records for the selected verification procedures, and three columns 912 through 916 as described which display the fields described below in the respective records.

In the illustrated example, the available fields (columns) for sub-form 902 are Function 912, Queue 914 and Procedure Name 916. The data object for field 916 is programmed as a drop-down list box linked to a Master verifications table with the drop-down order corresponding to the order in which the verification are performed. As many selections from the list may be made as needed (using, e.g., the SHIFT and CTRL Keys and the pointing device, but selections may not be repeated. Selected entries (in the drop-down order) then appear in column 916, and the corresponding data for fields 912 and 914 are automatically entered. The update is canceled or saved using push buttons 918 or 920 respectively.

In the example shown, the default structure for sub-form 902 is comprised of eleven rows 908 of which the first three, such as row 908*a*, already contain records corresponding to selected procedures. Sub-form 902 is programmed to expand vertically as necessary.

Input Setup

Figure 7G:
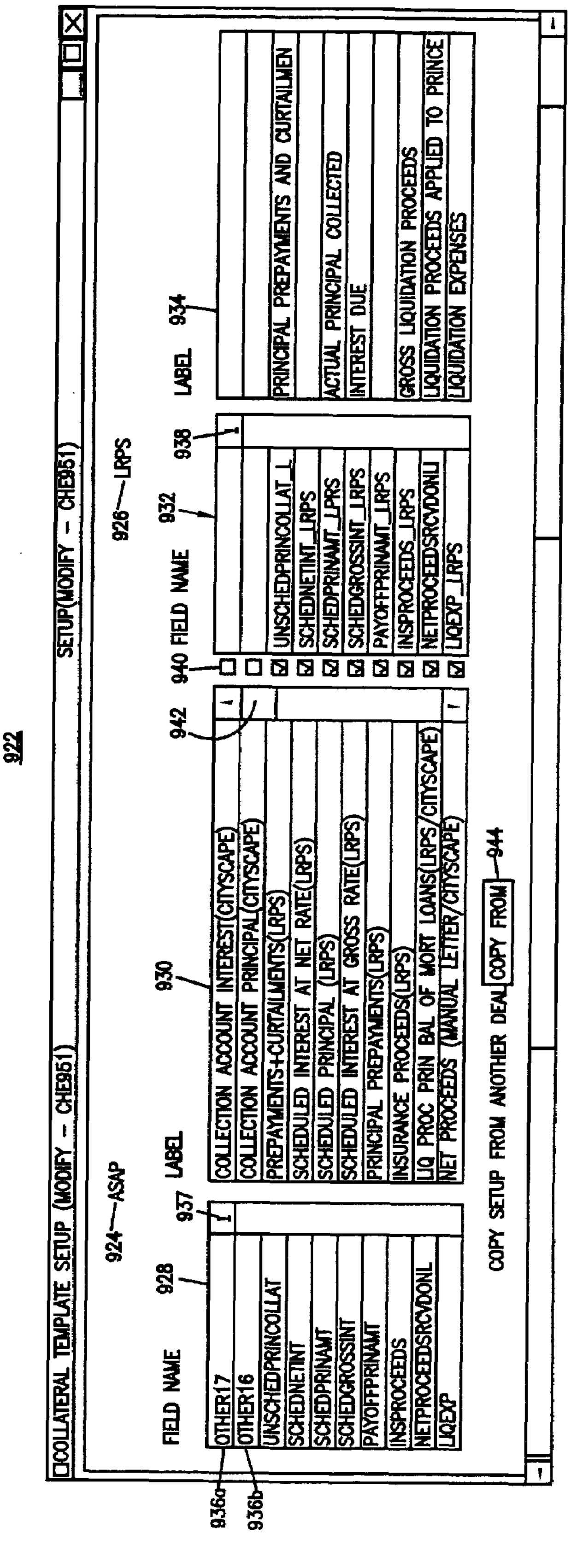

FIG. 7G shows a data entry screen 922 which appears when Input tab 712 is selected on one of the deal modify screens shown in FIGS. 7A through 7F. This is used to define summary (input) fields which implement the interface between LRPS subsystem 160' and ASAP subsystem 212 (see FIG. 3) by mapping the LRPS data structure to the ASAP data structure. This mapping will generally vary from deal to deal, so the mapping process is a necessary part of the deal setup.

Screen 922 is programmed to display two side-by-side windows, an ASAP window 924 and an LRPS window 926. ASAP window 924 is comprised of two columns, a Field Name column 928 and a Label column 930. LRPS window 926 is similarly comprised of a Field Name column 932 and a Label column 934. When screen 922 is opened, each column includes several aligned blank rows such as 936*a*, 936*b*, etc.

Data to be entered in the rows of columns 928 and 930 are selected from smart search drop-down lists controlled by respective search buttons 937 and 938. The selections available in the drop-down lists correspond to the database field names for the ASAP and LRPS subsystems respectively. Columns 930 and 934 may be used for manual entry of descriptive names corresponding to selected database field names.

Screen 922 may be used in two ways. The empty fields of columns 928 and 932 may be populated on a line by line basis, in which case the analyst will use the smart search buttons 936 and 938 to select the field names to be mapped.

Alternatively, the user may create a template based on some earlier deal. To do this, the user clicks on the Copy From pushbutton 940, which brings up a list of existing deals from which the user may select. Upon making a selection, the fields in columns 928, 930, 932 and 934 are automatically populated with the field mapping from the selected deal. This, in turn, may be edited to define the mapping for the new deal being set up, by clicking on the field to be edited and selecting a new item from the list.

The LRPS fields which are to be used for a particular deal are specified by use of check boxes 940 adjacent each row of column 932. Particularly, if a template is invoked (by use of the Copy From button) there may be LRPS fields not needed for a particular deal. The selected check boxes identify the fields which are required.

FIG. 7G shows an exemplary mapping. (A conventional scroll button 942 may be programmed to appear when the number of rows exceeds the default capacity of the screen.) It should be understood, however, that FIG. 7G is purely illustrative, as the mapping may vary from deal to deal, and not all available ASAP or LRPS fields may be needed. Also, information needed for one or more ASAP fields may not be available in the LRPS database. In that event, data for the particular parameter may have to be entered manually when needed. To accommodate this, the LRPS Field Name entry in a particular row is left blank.

Header/Footer Setup

Figure 7H:
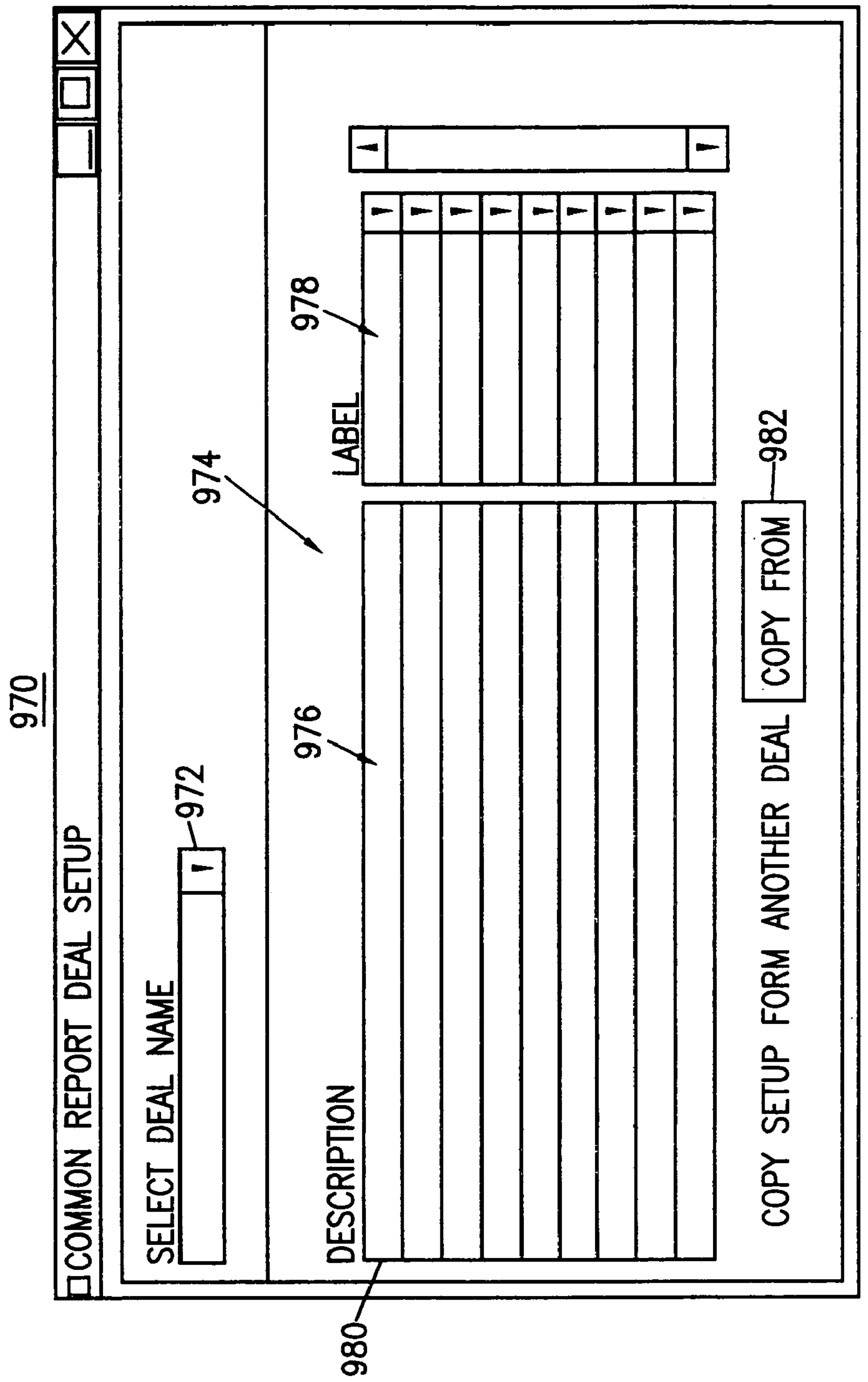

FIG. 7H illustrates a data entry screen 970 which appears when Input tab 714 is selected on one of the Deal Modify screens shown in FIGS. 7A through 7F. This is used to define standard headers and footers which will appear on the monthly reports for a particular deal.

Screen 970 is comprised of a drop-down list box 972 from which the name of an active deal may be selected, and an embedded sub-form 974. Sub-form 974 is comprised of a Description field (column) 976 and a Label field (column) 978. Description field 976 is programmed as a series of manual entry text boxes representing the actual text of a header or footer. Label field 978 is preferably programmed to display a drop-down list of header and footer locations, e.g., “Cover page footer”, “Text page header” or the like.

Like screen 922 (FIG. 7G) screen 970 may be used in two ways. The empty fields in columns 976 and 978 may be populated on a line by line basis, in which case the user will select labels from the drop-down list box, and will manually enter the text for the particular header or footer in the succession of rows 980*a*, 980*b*, etc. Alternatively, the user may create a template based on some earlier deal by clicking on the Copy From pushbutton 982, which brings up a list of existing deals from which a selection may be made. Upon making a selection, the cells in sub-form 970 are automatically populated with the header/footer information from the selected deal. These, in turn, may be edited to define the headers and footers for the new deal being set up.

Index Rate Data Entry

Figure 8:
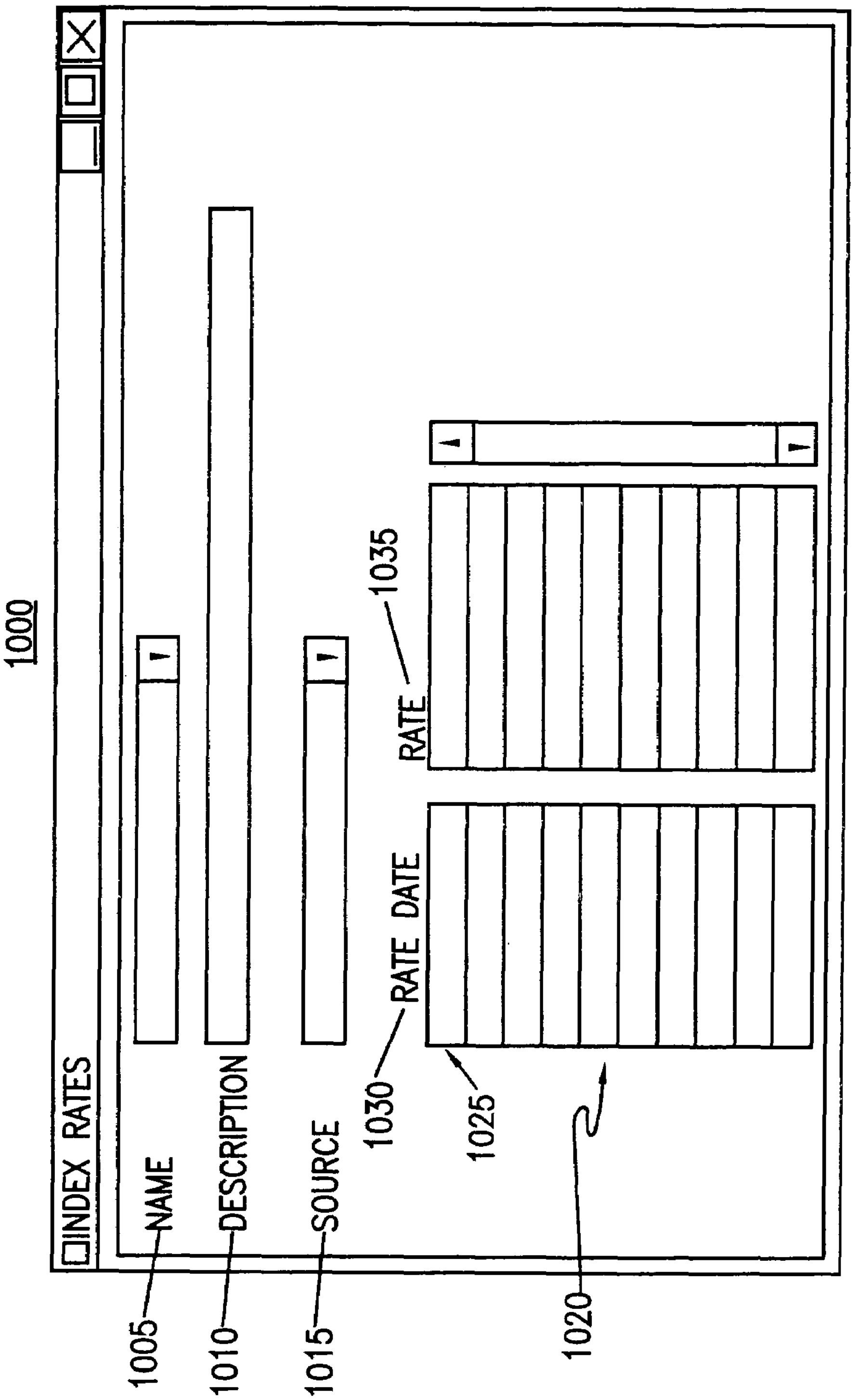
FIG. 8 illustrates an example of a data entry screen for index Rate information.

FIG. 8 illustrates a data entry screen 1000 which is used to enter index rate information. This screen is accessed when pushbutton 415 on Main Menu 400 is selected (see FIG. 6). Index rate information is used for those deals in which the bonds have variable interest rates keyed to a published index. For example, a particular bond, or one of the classes of bonds in a deal, may have an interest rate expressed as “one month LIBOR rate on a particular date plus 20 basis points.” (“LIBOR” is the London InterBank Offered Rate, the base interest rate paid between banks trading Eurodollars. It is quoted for one, three, six and twelve month periods, and changes daily. A “basis point” is 0.01%.)

The parameters and variables for rate computations on all active deals are stored in a Master Rules Table in ASAP database 250 (see FIG. 4). The analyst uses screen 1000 to record the daily fluctuations of the various indices applicable to the deals for which he or she is responsible.

Screen 1000 includes an Name field 1005, a Description field 1010, a Source field 1015, and an embedded sub-form 1020. The latter is comprised of a series of rows 1025 and field columns 1030 and 1035 in which dates and corresponding rate values for the Index selected in field 1005 may be entered. Sub-form 1020 is initially comprised of nine rows but expands vertically as necessary.

When a deal is being set up, data is entered in fields 1005, 1010, 1015 and 1030. A required index rate is selected from the drop-down list linked to a Master Index Rate Table in Workflow Database 244, and entered in field 1005. The entries include various customarily used indices such as 1 month LIBOR, 3 month LIBOR, etc. Description field 1010 is also linked to the Master Index Rate Table, and is automatically filled in with information corresponding to the selected Index Rate.

Source field 1015 is also a drop-down list which is linked to the Master Index Rate table. The drop-down list for this field includes the sources such as the Wall Street Journal, etc. in which the various indices are published. Field 1030 is used to enter the applicable dates (e.g., the dates required for interest calculations on the succession of monthly distribution dates) for the new deal.

As part of the analysts’ daily activities, screen 1000 is updated by entering in field 1035, the value published in the applicable source for those indices having that day’s date in column 1030. Cancel and OK buttons (not shown) are also be provided and function as previously described. Screen 1000 may be used repetitively if necessary to specify more than one index rate both during setup and on a daily basis.

Global Staffing Changes

Figure 9:
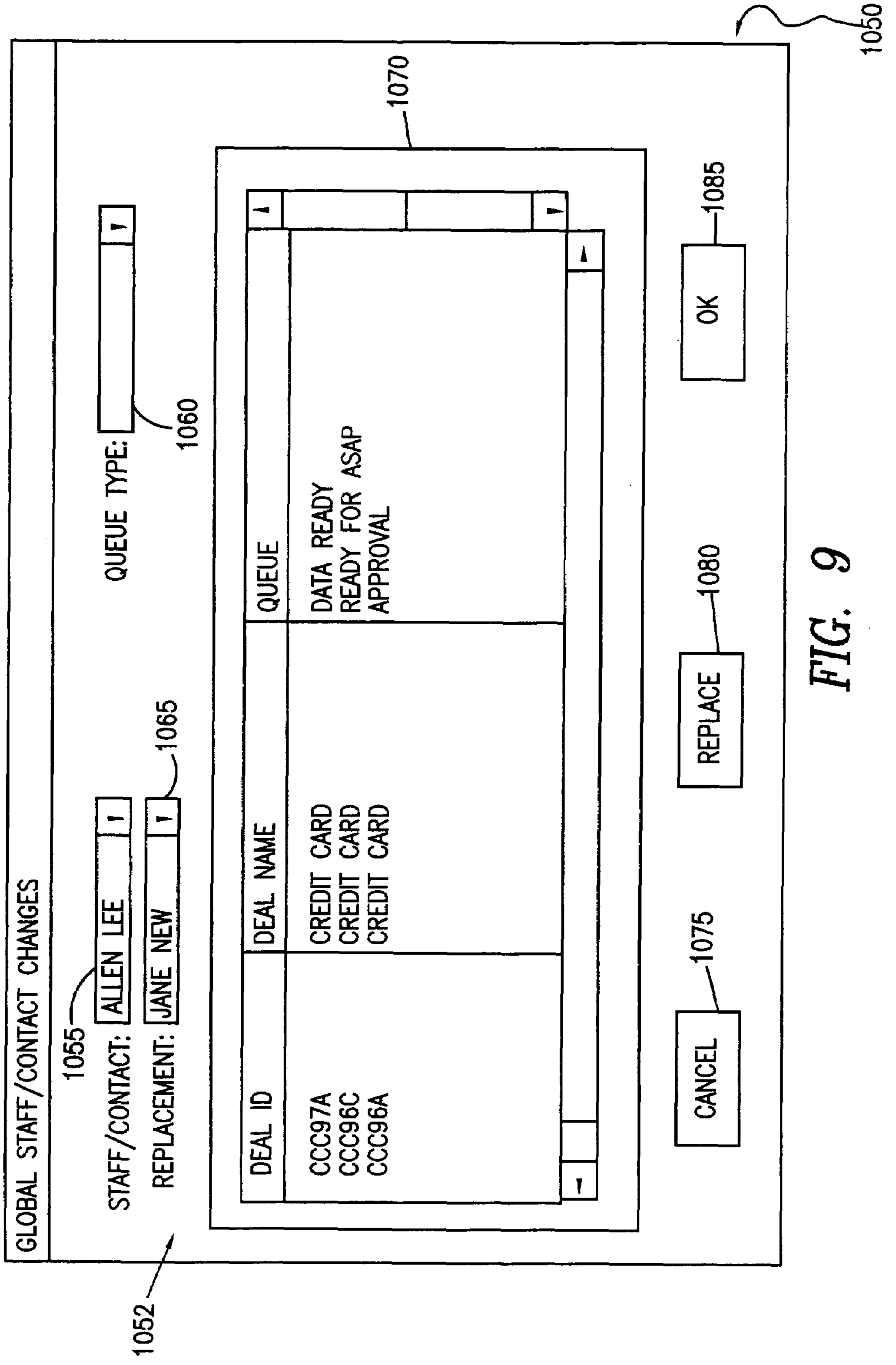
FIG. 9 illustrates an example of a data entry screen for making changes to staff assignments for more than one deal had time.

FIG. 9 illustrates Global Staff/Contacts Screen 1050 which is used to make changes in assigned staff and contacts for more than one deal at a time. Screen 1050 is accessed by selecting push button 455 in main menu 400 (see FIG. 6).

Screen 1050 is programmed as a combined query creation and report form. Upper portion 1052 of screen 1050 contains a Staff/Contact field 1055, a Queue Type field 1060 and a Replacement field 1065. Together, these specify the parameters for an “assigned deal” query.

On the lower portion of screen 1500, a sub-form 1070 displays a report based on the data returned by the query.

The drop-down lists for fields 1055 and 1065 are linked to the Master Contact Table. Programming features may include alphabetical listing by last name, and smart look-up as previously described. Fields 1055 and 1065 are blank by default. Since screen 1050 represents replacement for a single individual, only one name is entered in field 1055. Replacements must have the same role (as indicated in the Master Contacts Table) as the person being replaced.

The drop-down list for Queue Types field 1060 is linked to the Master Queue Table. The staff assignment changes are made on a queue by queue basis so only a single queue type may be selected at a time. The default condition for Queue Type field 1060 is blank. If it is left blank, it is assumed that all queues for which the outgoing individual had responsibility are to be updated. Sub-form 1070 then lists all of the Deal ID numbers, the Deal Names and the Queue Types for which the outgoing individual was responsible.

When the user has completed the entries for sub-form 1070, the Replace push button 1080 is pushed. This saves the changes and clears screen 1050 in preparation for further use. To save the changes and return to main menu 400, OK push button 1085 is pushed. To return to the main menu without saving the changes, the user pushes cancel button 1080. In both instances, confirmation messages as previously described are displayed before the requested actions are executed.

Privilege Level Setup

Figure 10:
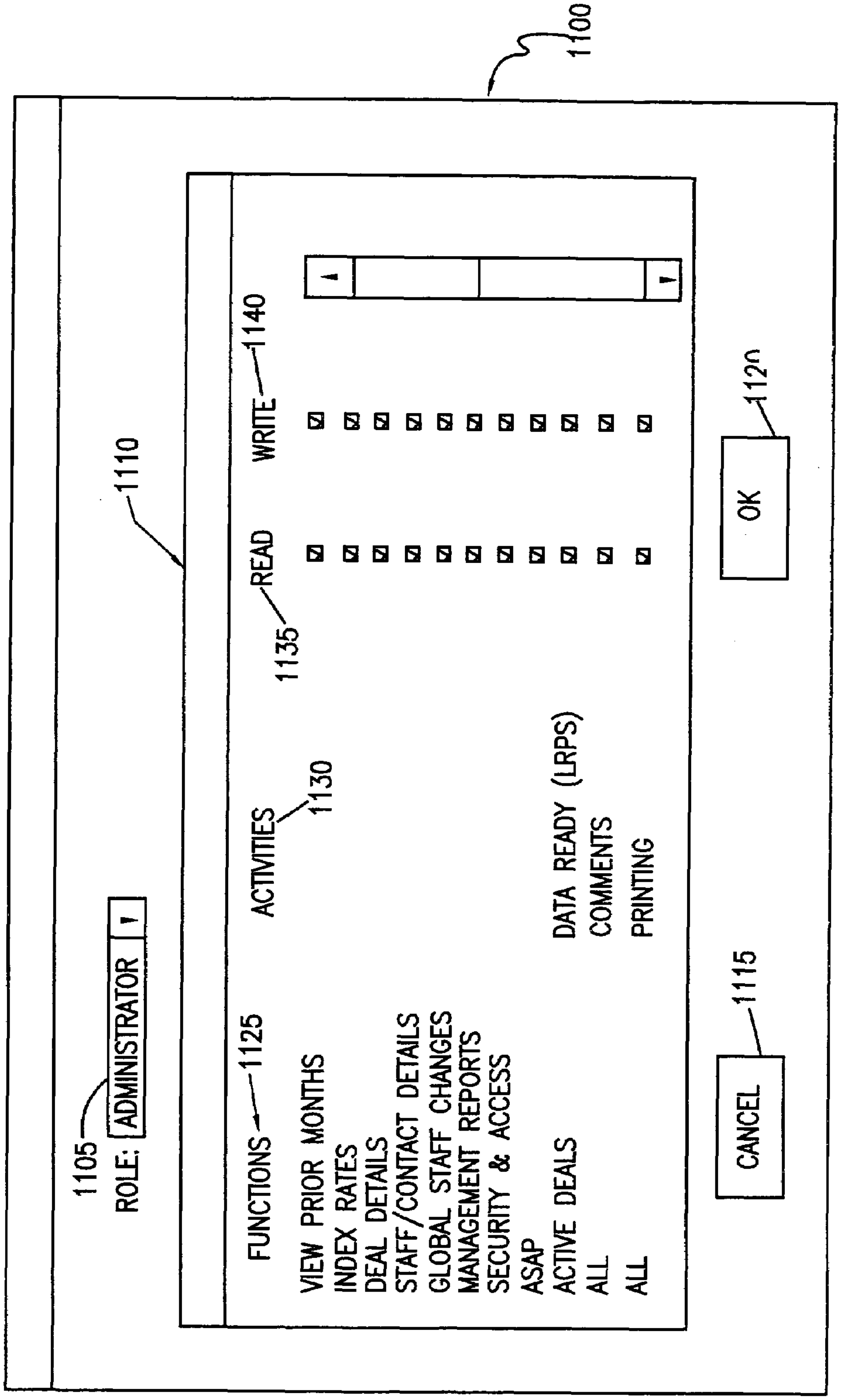
FIG. 10 is an example of a entry screen for assigning privilege levels to system users.

FIG. 10 illustrates Access Screen 1100 which is used to assign access levels to various users according to their responsibilities. This screen is accessed by selecting the Security & Access push button 450 on main menu 400 (see FIG. 6).

Screen 1100 displays a Role field 1105 and a sub-form 1110 which displays functions and activities for which different privilege levels may be assigned and check boxes by which the desired privilege levels may be selected.

The drop-down list for Role field 1105 displays an alphabetical listing of internal staff roles required for performance of the trustee's functions. New internal staff functions may also be entered for field 1105. When a selection has been made in field 1105, sub-form 1110 displays a list of the functions corresponding to the push buttons on main menu 400 in column 1125 and the activities associated with each function for which different levels of access may be assigned in column 1130.

Privilege level selection is made using two columns of check boxes 1135 and 1140, labeled Read and Write, respectively. By default, the check boxes are empty; placing a check establishes access to a particular function and activity for inquiry purposes, i.e., for the role selected in text box 1105. The Read privilege (which includes the ability to print) represents access to a particular function or activity only for inquiry purposes, i.e., only to review the data. The write privilege represents the ability to edit, as well as view data.

Screen 1100 also includes a cancel push button 1115 and an OK push button 1120, both of which function as previously described.

Active Deal Processing

The Active Deals Screen

Figure 11:
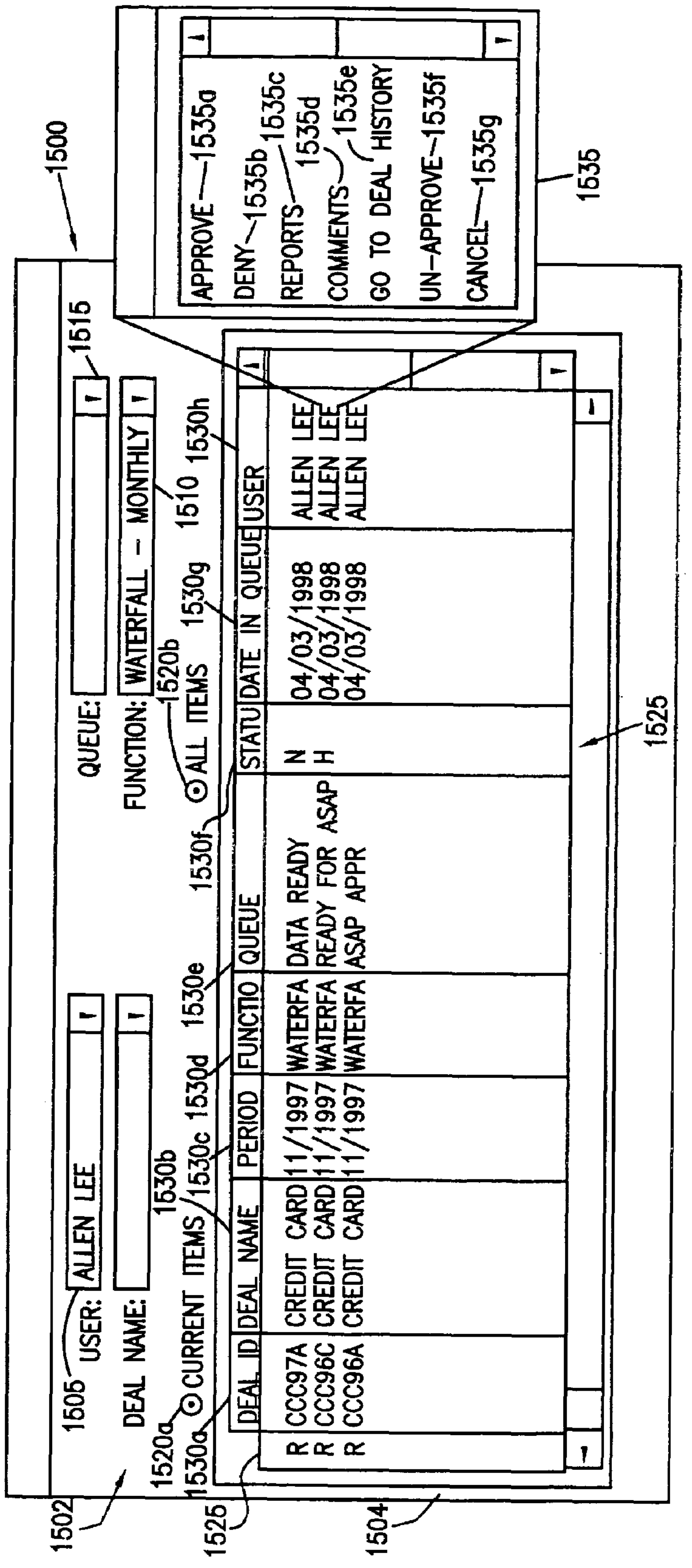
FIG. 11 illustrates an example of a work flow screen according to the invention which provides task prompting and selection capability for users of the system.

FIG. 11 illustrates Active Deals Screen 1500. This may be accessed, for example from a menu bar (not shown), or in any other desired manner, and is basically the daily starting point for the tasks performed by the trustee's employees. Screen 1500 provides a workflow status summary (essentially a "to do" list) of the deals for which user is responsible. The user can also initiate various tasks by selecting from a pop-up Action List on the Active Deals Screen.

Screen 1500 is programmed as a combined query creation and report form. In the illustrated example of FIG. 11, upper portion 1502 contains a User (name) field 1505, a Deal Name (ID) field 1507, a Function field 1510 and a Queue Type field 1515, and radio buttons 1520*a* and 1520*b* which select between Current Items, i.e., those queues which are in "ready for action" status, or All Items, i.e., all deals that are related to that user, regardless of status. Together, these specify the data for an "active deal" query. On the lower portion of screen 1500, a sub-form 1504 displays a report based on the data returned by the query.

The drop-down list for User field 1505 is linked to the Master Staff/Contact Table. Programmed features for this field include limiting the drop-down list to staff names only, alphabetizing by last name, smart look-up and limitation to selection of only one name at a time. The default entry in text box 1505 is the name of the logon user.

Selection for Deal Name field 1507 is made from a smart look-up drop-down list linked to the Master Deals table. All active deals are listed. Selection for Function field 1510 is made from a smart look-up drop-down list linked to the Master Functions Table. Choices may include Waterfall-Monthly, Tax-Monthly, Tax-Quarterly, Tax-Annual. The default entry is blank; the user may select only one function at a time.

A smart look-up drop-down list for Queue field 1515 is linked to the Master Queue Types Table. Only queue types applicable to the entry in Function field 1510 are shown, with the entries listed in processing order. The default entry is blank; only one queue type may be selected.

Any or all of the fields in query form 1502 may be left blank. In that case, the state of radio buttons 1520 will solely determine the data returned. If radio button 1520*a* (the default value) is selected, the query will return a list of all ready queues for all active deals. If radio button 1520*b* is selected, the query will return a list of all queues for all active deals.

If a selection has been made in one or more of fields 1505, 1507, 1510 and 1515, the query will return data accordingly. For example, if radio button 1520*a* is selected, and the User field is left blank but entries are made in the Function and Query fields, the query will return a list of all deals which are in the specified queue for the selected function, and for which the queue is ready for processing. If there are entries in the User field and the Function field, but not in the Queue field, the query will return a listing of all of the user's deals for the specified function, for all queues ready for processing.

Report sub-form 1504 displays a row for each deal record which meets the query selection criteria, and a succession of columns displaying the fields in each record. In the example illustrated, a first column 1525 contains the entry "R" if the deal is in restatement, but is blank otherwise.

Again, by way of example, eight columns 1530*a* through 1530*h* display fields such as Deal ID 1530*a*, Deal Name 1530*b*, Period (distribution date) 1530*c*, Function 1530*d*, Queue 1530*e*, Status 1530*f*, Date In Queue 1530*g* and User 1530*h*. It should be understood, however, that some of these fields may be omitted and others added or substituted. The named fields have been described in detail previously, and need not be repeated. Similarly, the status codes for the various queues were discussed in connection with FIGS. 5C and 5D.

The Date In Queue column 1530*h* represents the date of the last status change. Time may also be presented if desired. The User field 1530*h* represents the individual responsible for the deal in its current status.

The Actions List

When the report in sub-form 1525 first appears, none of the rows is highlighted. When the user selects one of the rows, e.g., by right-clicking, a pop-up Actions List 1535 for that particular deal appears. This list is linked to a Master Action Table in Workflow Database 244 and is programmed to display only actions which may be taken for the selected queue and status, as described in connection with FIGS. 5C and D. In FIG. 11, the actions listed in pop-up menu 1535 correspond to a deal in the Waterfall Processing function, in the "Ready For ASAP Waterfall Processing" queue, and in the "Ready" status.

All of the actions permitted or required for the function, queue and status of the deal highlighted on sub-form 1504 may be accomplished or initiated by selecting an item from the Actions List. For the example illustrated in FIG. 11, these include disapproving or un-approving a queue, running one of the ASAP computations, inputting data, viewing deal structure information, viewing deal history, viewing or generating reports and resetting the workflow, i.e. going back to the beginning of the workflow cycle, typically the LRPS queue. It will be understood that "Approval" is not an available option as the status of the current queue, "Ready for ASAP Processing" is "ready", i.e., already approved.

Reports

Figure 12A:
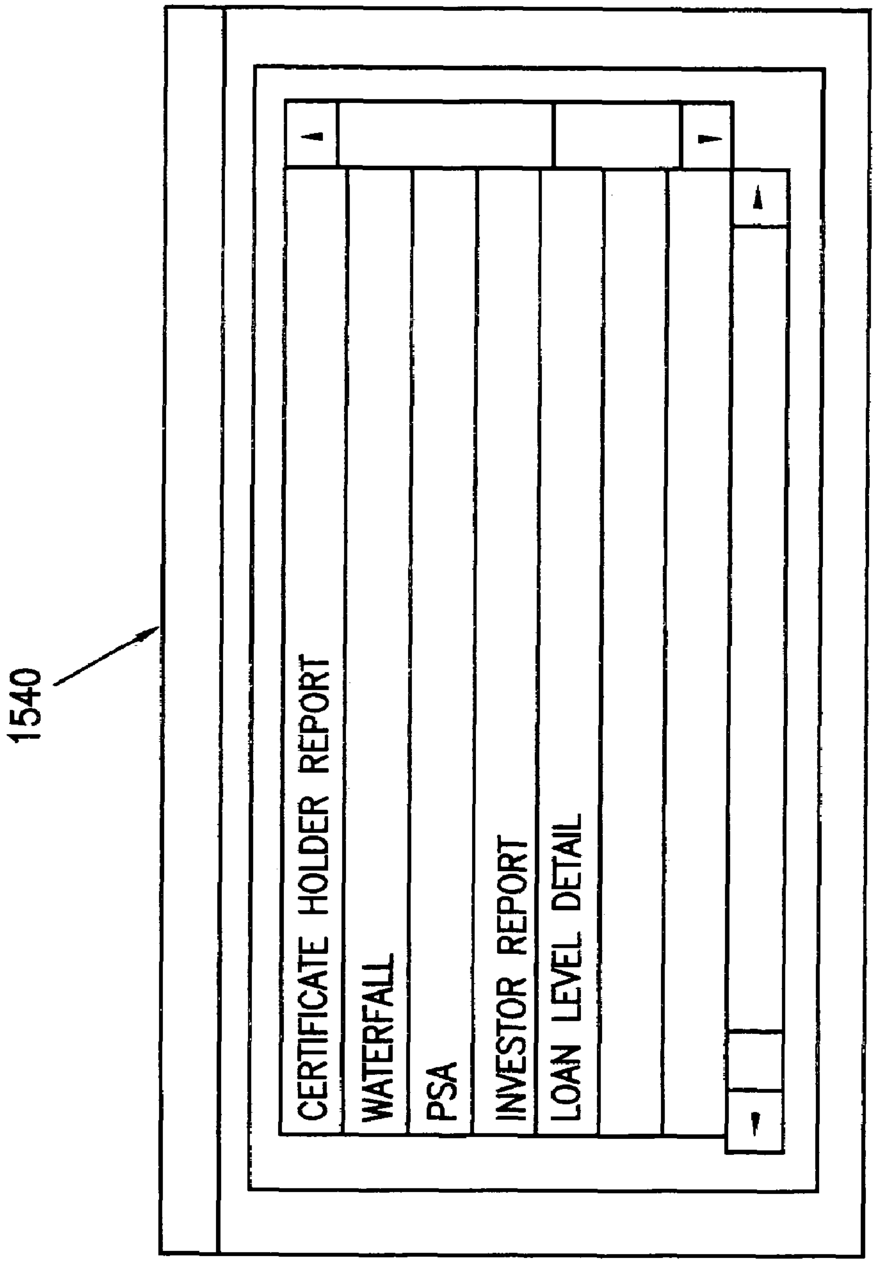
FIGS. 12A through 12D illustrate examples of user screens associated with various processing operations.

Selecting Deal Reports line 1535*c* in Actions List 1535 brings up a window 1540 illustrated by way of example in FIG. 12A. Window 1540 accesses the list of reports for the highlighted deal selected during deal set-up as described in connection with FIG. 7C. These may include, for example, Investor Report, Loan Level Detail, Waterfall, etc. The available selections are limited, however, to those reports applicable to the function selected in field 1515 (see FIG. 11) and to the current queue for the selected deal.

Selecting one of the reports from the list, e.g., by highlighting and clicking on the entry, generates the selected report. If the report already exists, it is brought up for viewing and printing.

Approval and Disapproval

The Deny, Un-Approve and Approve functions are initiated by clicking the respective lines on the Action List 1535, when these actions are available for the selected deal, function and queue. (See, e.g. lines 1535*b*, 1535*f* and 1535*e*, respectively in FIG. 11).

Figure 12B:
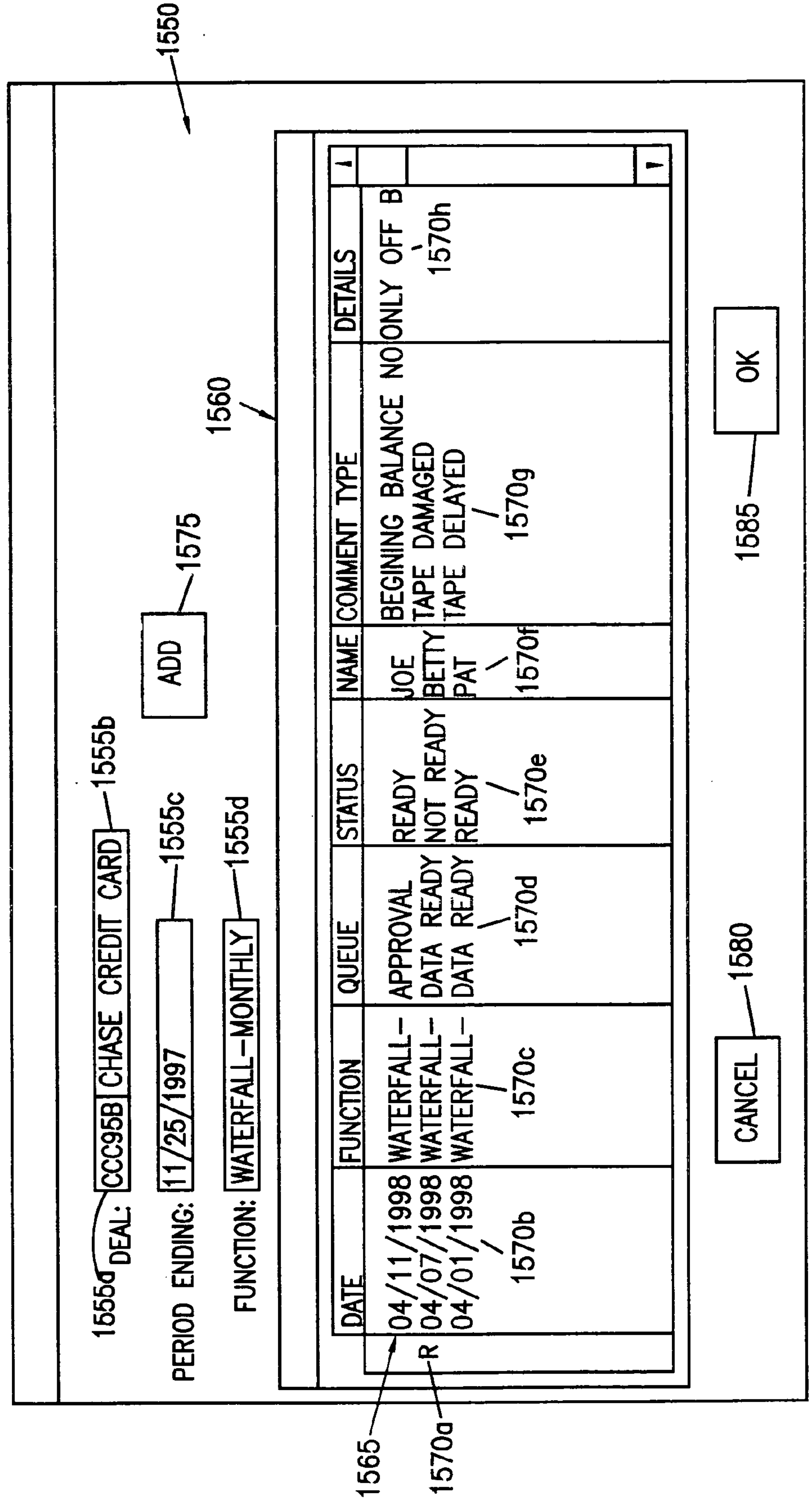

Selecting Approve updates the status record for the deal and returns the user to the active deals screen. Selecting Deny or Un-Approve brings up a Comments History Screen, an example of which is illustrated 1550 in FIG. 12B. The Comments History Screen 1550, displays the Deal ID in text box 1555*a*, the Deal Description in text box 1555*b*, the Period Ending date in text box 1555*c* and the Function in text box 1555*d*. The data corresponds to the highlighted entry in Active Deals Screen 1500 (see FIG. 11).

A listing of previous comments, with the most recent one first, appears in an embedded sub-form 1560. Each row 1565 represents the record for one comments. The fields for each record are displayed in columns 1570. The first of these, column 1570*a*, displays the letter "R" if the deal is being restated, and is blank otherwise. Date column 1570*b*, Function column 1570*c* Queue column 1570*d*, Status column 1570*e*, Name column 1570*f*, Comment Type column 1570*g* and Comment Details column 1570*h* display information concerning the deal at the time the comment was made.

New comments are not added from screen 1550. Instead, clicking on an Add push button 1575 brings up a Comment Entry Screen illustrated in FIG. 12C and described below. Comments List Screen 1550 also displays a Cancel push button 1580 and an OK pushbutton 1585. Pressing Cancel pushbutton 1580 displays a confirmation dialog box including a message text and "yes" and "no" buttons (not shown). If entry to Comments History Screen 1550 was from a Deny action, the message text is preferably "You must select a comment or deny will not take effect. Do you wish to cancel deny?" If the user pushes the "yes" button, Active Deals Screen 1500 reappears.

If the entry to Comments History Screen was from an un-approval action, the message text is preferably "You must select a comment or unapprove will not take effect. Do wish to cancel unapprove?" If the "yes" push button is selected, the user is returned to the Distribution History screen described below in connection with FIG. 12D.

If entry to the Comments List screen was from a Restatement action, the message text is preferably "You must select a comment or reinstatement will not take effect. Do you wish to cancel reinstatement?" If the "yes" push button is selected, the user is returned to the Distribution History screen.

If none of the foregoing conditions apply, the message text is preferably "Are you sure you do not want to save changes?" If the "yes" push button is selected, the user is returned to Main Menu 400.

In all of the foregoing situations, if the "no" button is pushed, the cancel action is terminated, and Comment Entry Screen appears.

The OK button 1585 displays a confirmation screen (not shown) including "yes" and "no" push buttons and a message which preferably states "Are you sure you want to save comments?" Selecting the "yes" push button confirms the action take, saves any associated comment, and returns the user to the originating screen.

Comment Entry

Figure 12C:
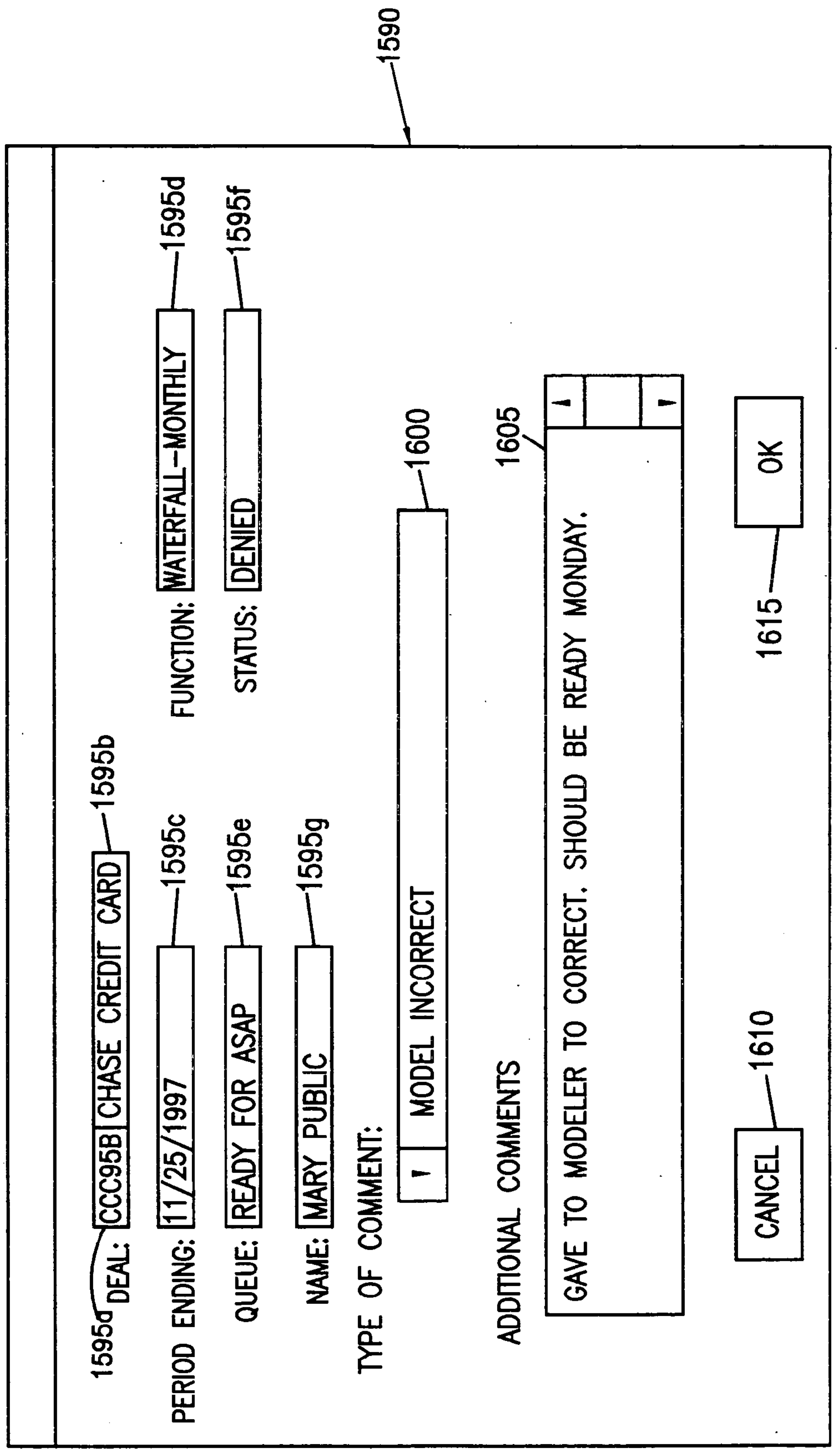

Referring to FIG. 12C, Comment Entry Screen 1590 displays a Deal ID text box 1595*a*, a Deal Description text box 1595*b*, a Period Ending text box 1595*c*, a Function text box 1595*d*, a Queue text box 1595*e*, a Status text box 1595*f* and a Name text box 1595*g*. The information displayed is copied from the screen in which the Comment Entry screen 1590 was selected. Queue text box 1595*e*, and Status text box 1595*f* respectively display the current queue and status of the deal. Text box 1595*g* lists the name of the person making the comment; this is taken from the Logon ID.

Screen 1590 also includes a drop-down list box 1600 linked to a Master Comment Table in Workflow Database 244 which displays a list of possible comment types. All of the types of issues which might arise are listed, preferably in the order in which the issues are likely to arise. In the example illustrated in FIG. 12C, the "Model Incorrect" comment type has been selected.

When a comment type has been selected, an Additional Comments text box 1605 becomes accessible. Here, the user may enter free-form text expanding on the comment type selected from list 1600.

A cancel button 1610 returns the user to Comments List Screen 1550 (see FIG. 12B) without saving changes. Pressing cancel button 1610 brings up a confirmation box with associated "yes" and "no" push buttons and a message text box (not shown). If the entry to screen 1550 was from a deny action, an un-approve action or a restatement action, a comment is required. If no comment type has been selected for some reason, the user is appropriately prompted, e.g., "You must select reason for denial".

Screen 1590 also displays an OK push button 1615 to save the information entered and to return the user to Comments History Screen 1550. Upon pressing push button 1615, a confirmation box and "yes" and "no" push buttons (not shown) appear. If the entry to 1550 was from an action for which a comment is required, and no comment has been recorded, a confirmation box presents a message prompting the user to make a comment. Otherwise, the confirmation message preferably reads "Are you sure you want to save comment". An affirmative answer saves the comment, and returns the user to the Active Deals Screen.

Deal History

Figure 12D:
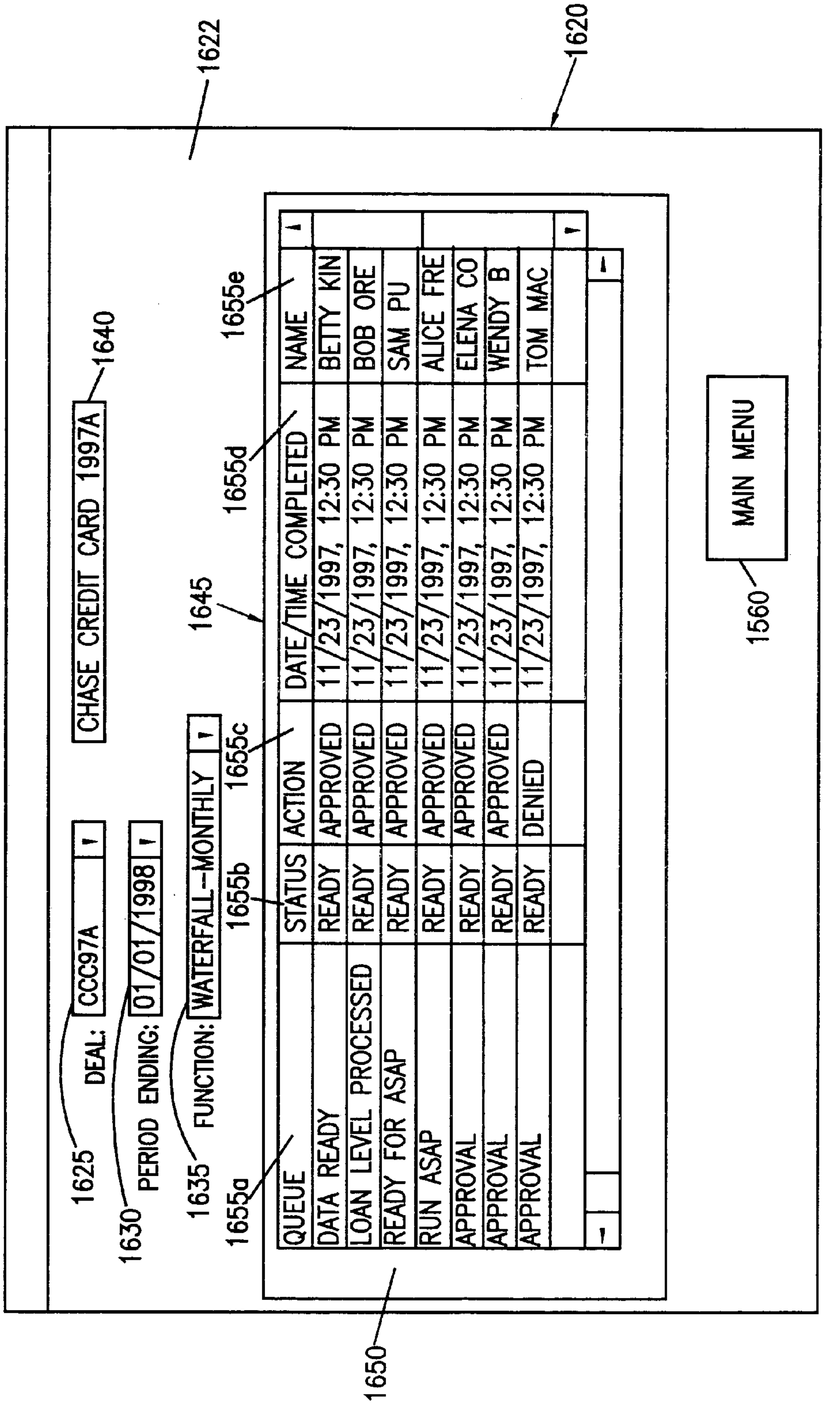

Selecting Go to Deal History line on Actions List 1535 brings up a Deal History Screen, an example of which is shown at 1620 in FIG. 12D. Screen 1620 is programmed as a combined query and report form. An upper query portion 1622 displays a drop-down list box for a Deal ID field 1625, a drop-down list box for Period Ending field 1630 and a drop-down list box for Function field 1635. A Deal Description corresponding to the Deal ID entered in 1625 is automatically entered in a text box 1640. The list box for Period Ending field 1630 is linked to a Master Deal Distribution Table and presents a list of the current and all previous distributions sorted with the most recent distribution first. The drop-down list for Function field 1635 is linked to the Master Function Table and presents a list of available functions in the normal processing order.

The information returned in accordance with the selections made in fields 1625, 1630 and 1635 appear in an embedded report sub-form 1645. This includes rows 1650 which display the records for each event matching the selection criteria for the query, and columns 1655*a* through 1655*e* which display the Queue, Status, Action, Date/Time Completed and Name fields for each record. The records in line 1650 are listed in queue order The report appearing in sub-form 1645 is for information purposes only; no action can be taken from screen 1620 other than to return to main menu 400 by pressing push button 1560.

FIGS. 13A through 13D illustrate examples of data entry screens which may be used to supply data required for the waterfall processing functions. These screens may be accessed by selecting the corresponding action from Actions List 1535 on the Active Deals Screen 1500 (see FIG. 11).

Figure 13A:
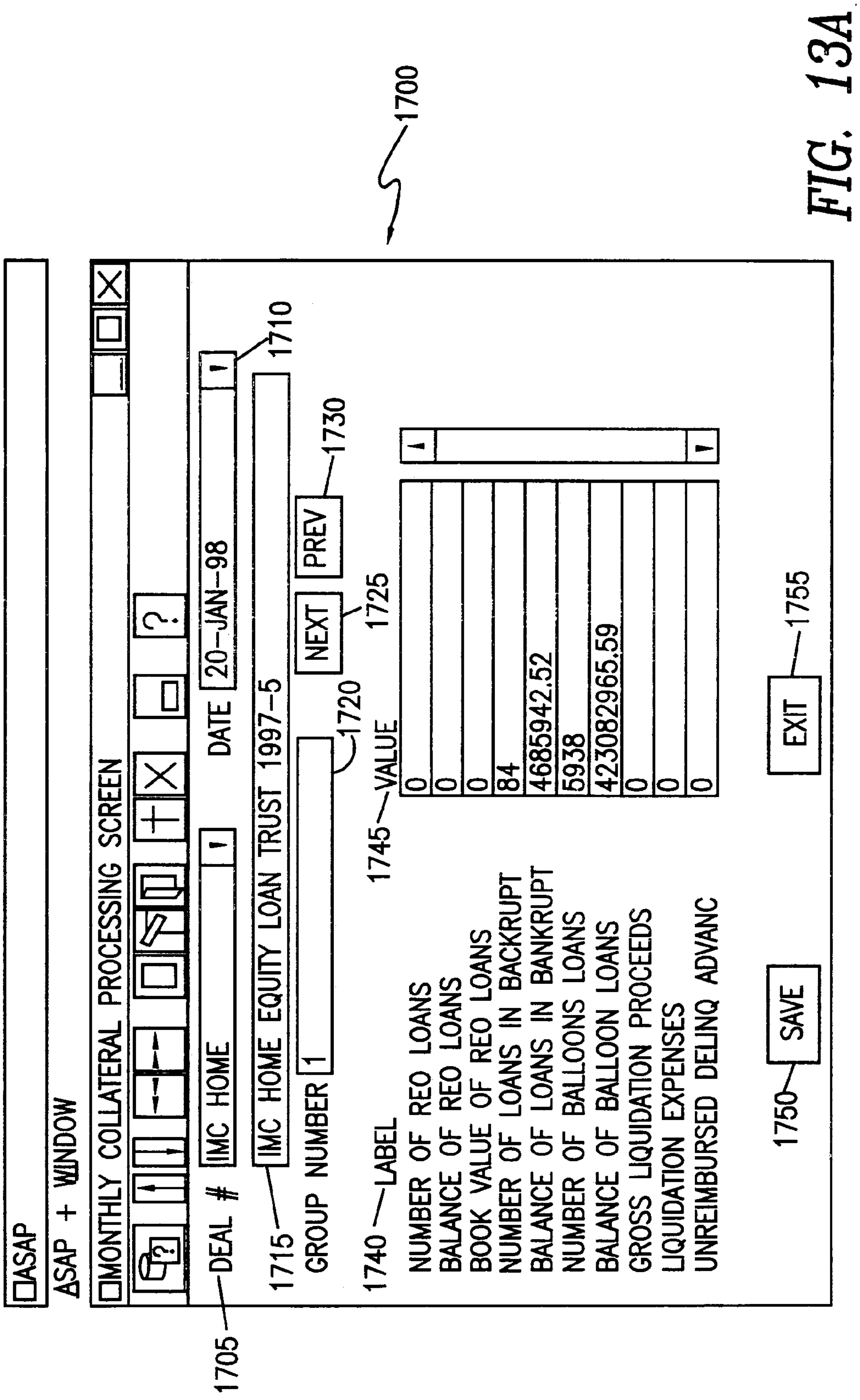
FIGS. 13A through 13D illustrate examples of user screens specifically associated with the processing of periodic investor distribution payments.

FIG. 13A shows Monthly Collateral Processing Screen 1700 which may be used for entry of information not available from LRPS subsystem 160' (see FIGS. 3 and 4), and also to review information from the LRPS subsystem 160'. Screen 1700 displays smark search drop down lists for Deal ID field lists 1705 and a Date field 1710 from which the user may select the deal ID and a distribution date. The entry for field 1705 is selected from a smart search drop-down-list which displays the active deals. A text box 1715 displays a deal description based on the selected deal ID in field 1705. The entry for field 1705 is selected from a smart search drop-down-list which displays the list of upcoming distribution dates for the selected deal.

Another text box 1720 is used to enter data identifying groupings within the underlying collateral for the selected deal. Such groupings might represent, for example, discount loans. A "Next" push button 1725 and a "Previous" push button 1730 may be used to step through the list of group numbers.

Monthly Collateral Processing Screen 1700 also displays a Label column 1740 and a Value column 1745. The labels in column 1740 are the ones set up on input screen 922 (see FIG. 7G). In the series of text boxes forming Value column 1745, the user can insert values corresponding to the labels.

After the required data has been entered in Value column 1745, the user may select Save push button 1750. This saves the data and clears screen 1700, which then remains available for further use. To exit Monthly Collateral Processing Screen 1700, the user may select Exit push button 1752, and is returned to Active Deals Screen 1500.

Figure 13B:
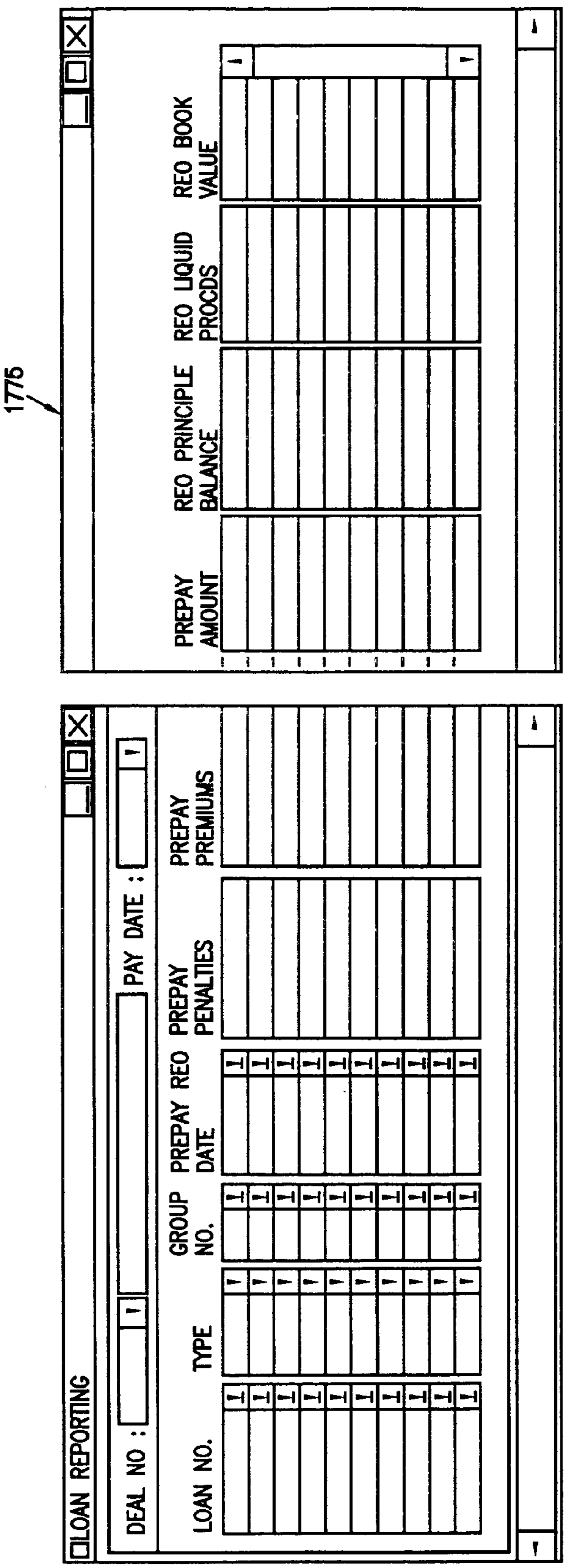
Figure 13C:
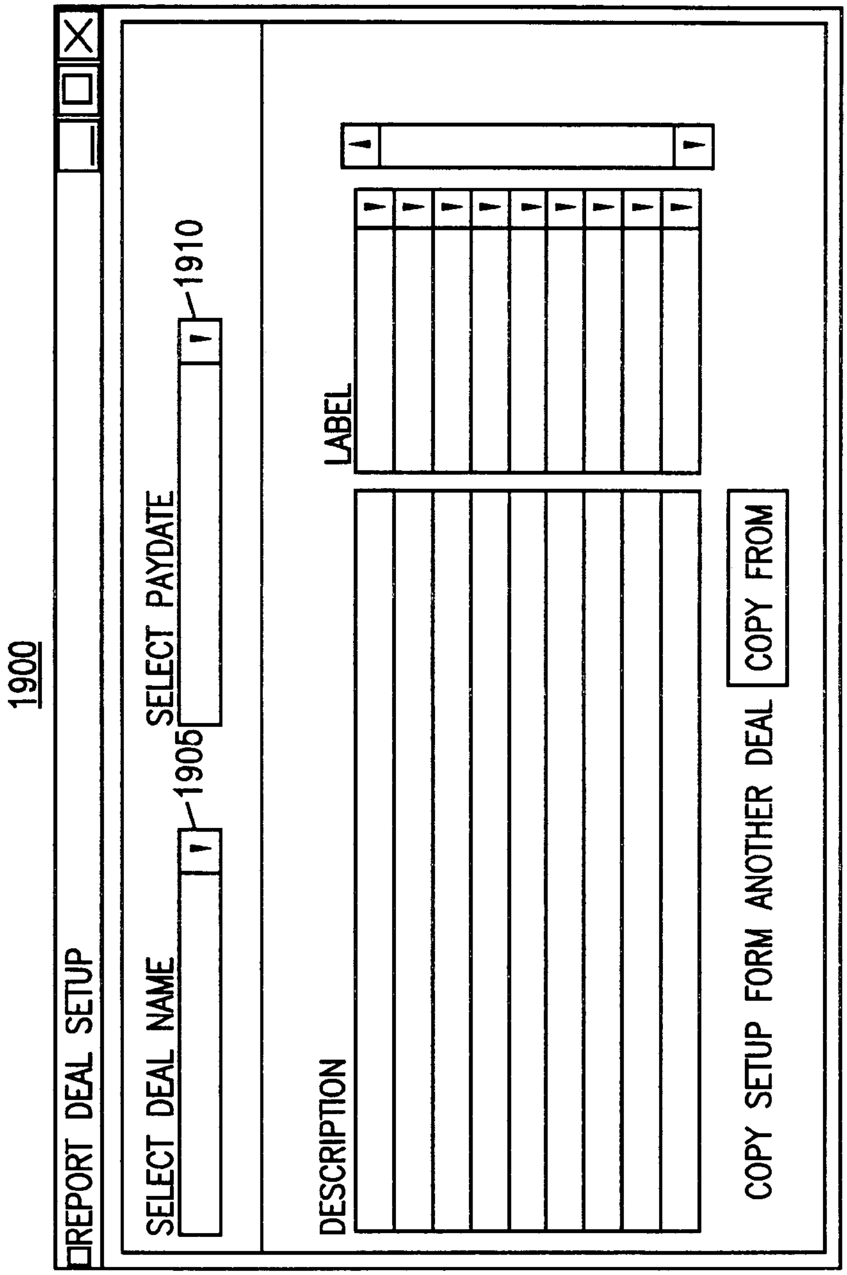

FIG. 13B illustrates an exemplary Loan Reporting Screen 1775 which may be used to enter loan level information not available from LRPS 160'. FIG. 13C illustrates a Report Deal Setup screen 1900 which may be used if special headers or footers are required for report currently being prepared. The data objects for screen 1900 are the same as for Common Report Deal Setup Screen 970 described in connection with FIG. 7H, and further description will be omitted in the interest of brevity. It should be noted, however, that screen 1900 is used to enter data applicable only to the current report, there is also displayed a Select PayDate Screen 1910, selections for which are made from a smart search drop-down list 1905, containing the specific distribution dates for the deal.

Figure 13D:
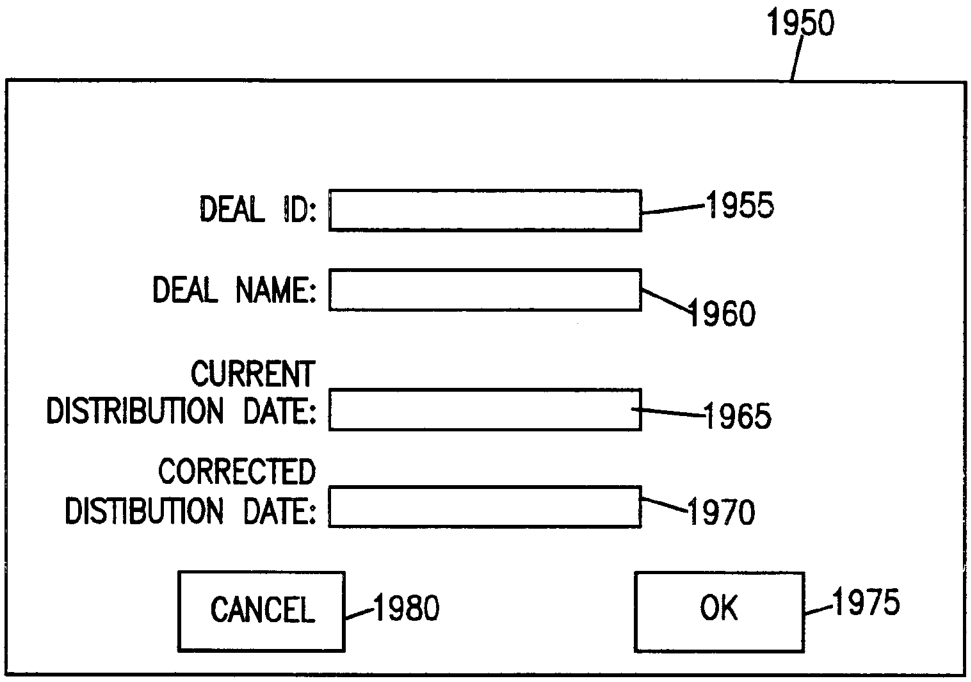

FIG. 13D illustrates a data entry screen 1950 which may be used to change a distribution date if it was not calculated correctly by the system. This might happen, for example, if the date selected is a "floating" day, i.e. where the payment date for a particular deal is not the same each month. Screen 1950 may be accessed from Actions List 1535 on Active Deals Screen 1500.

Screen 1950 displays a Deal ID text box 1955, a Deal Name text box 1960, a Current Distribution Date text box 1965 and a Corrected Distribution Date text box 1970, an OK push button 1975 and a Cancel push button 1980. The data displayed in text boxes 1955, 1960 and 1965 is copied from the Active Deals Screen. The corrected distribution date defaults to the current distribution date; this is the only field in screen 1950 for which manual data entry is permitted.

If the user decides not to change the distribution date, Cancel push button 1980 may be selected. This display a confirmation message such as "Are you sure you do not want to save changes", and upon acknowledgment, returns the user to Active Deals Screen 1500. To replace the current distribution date with the corrected date, the user presses OK push button 1975. This displays a confirmation message such as "Are you sure you want to save changes" and upon an acknowledgment, the data is saved and the user is returned to Main Menu 400 (see FIG. 6).

Figure 14:
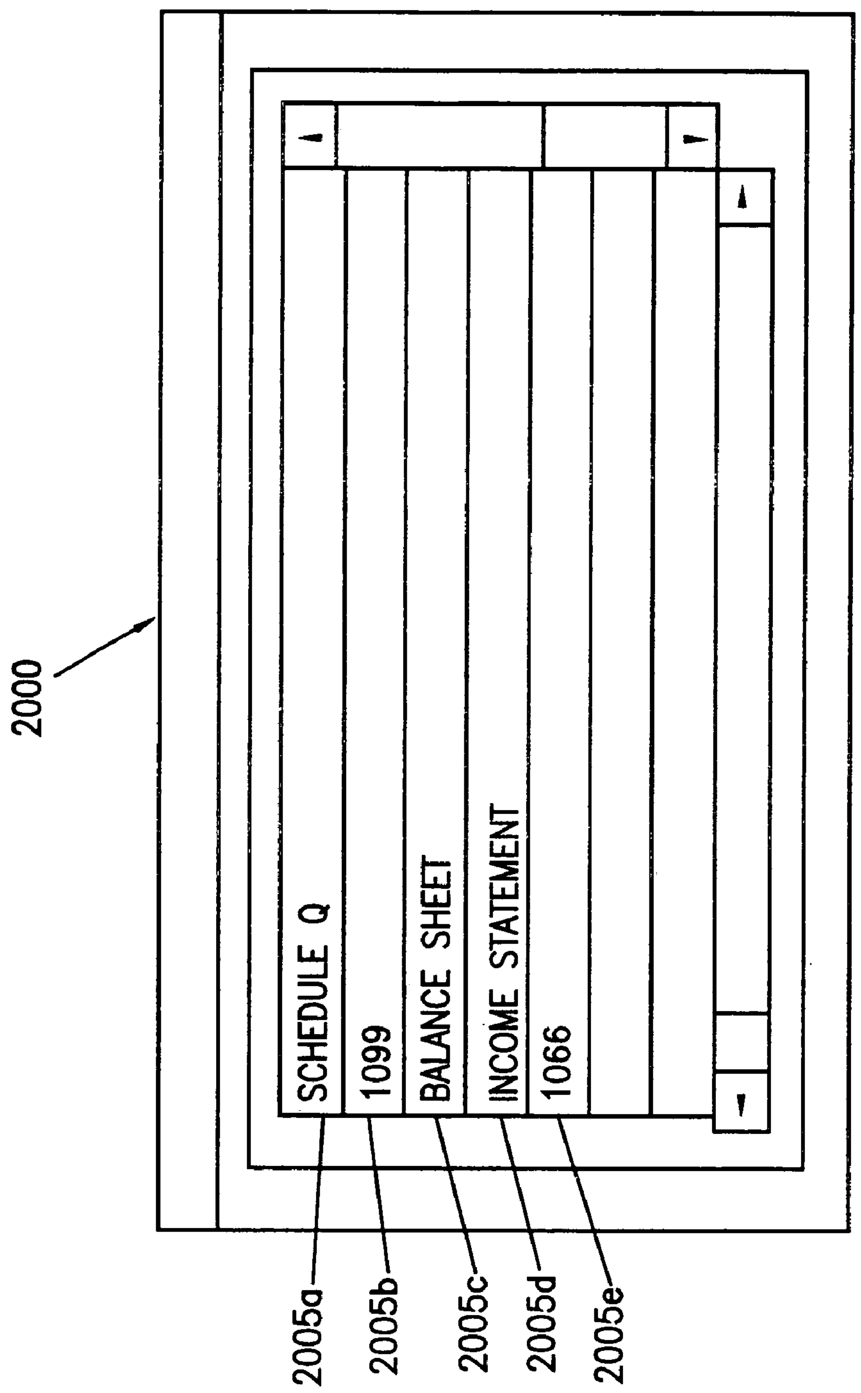
FIG. 14 illustrates an example of the user screen for selecting specific tax reports to be generated.

FIG. 14 illustrates Tax Reports Screen 2000 from which the user selects tax reports to be generated. This action is selected from Actions List 1535 on Active Deals Screen 1500 (FIG. 11). (As will be understood, Actions List 1535 will display this activity only when the selected deal is in a tax processing queue and status milestone for which it is appropriate.)

Available reports are listed in lines 2005*a* through 2005*e* on screen 2000. In the example shown, these include IRS Schedule Q and Forms 1066 and 1099, a deal Balance Sheet and a Deal Income statement. It will be understood that the data objects for these forms are set up and formatted using the standard form creation and formatting functions of the RDBMS.

Verification

As it will be appreciated, verification of the accuracy and completeness of the loan level and other deal specific data and the results of the numerous computations are essential components of the trustees' activities. With a large number of active deals in progress at one time, the need to handle large bodies of data which change from month to month (or in some cases, even more frequently) the complexity of the deal structure and the structural variations from deal to deal, it may be understood that one or two simple cross-checks will not be enough to establish the required level of confidence for the trustee's activities. The present invention provides a practical and effective way for the analysts—usually the one most familiar with a particular deal—to develop and apply verifications uniquely suited for that deal.

Broadly stated, the verification process involves the development of a set of verifications, assignment and customizing of particular verifications to each deal and the application of particular verifications in accordance with the requirements of a particular queue and status milestone. According to the present invention, templates are created representing a standard reporting format, and any necessary special formatting requirements along with a series of data input forms in which the end user can select the specific parameters and variables which may be required, or to define new deal specific parameters if necessary, and to construct the verification itself by building the necessary calculations or comparisons using the selected and created variables and parameters. Once the required verifications have been created and assigned to particular deals, they become part of the workflow assignments for that deal. When verifications are to be applied, they may be accessed through the main menu, through the actions list in the Active Deals Screens, from the deal history records.

Definition of New Verifications

The steps involve in setting up a new verification are (1) selecting the variable to be used, (2) defining any deals specific parameters which will be needed, (3) programming the calculations, (4) assigning importance to an abnormal result and (5) assigning the verification to a particular processing function end queue.

Figure 15A:
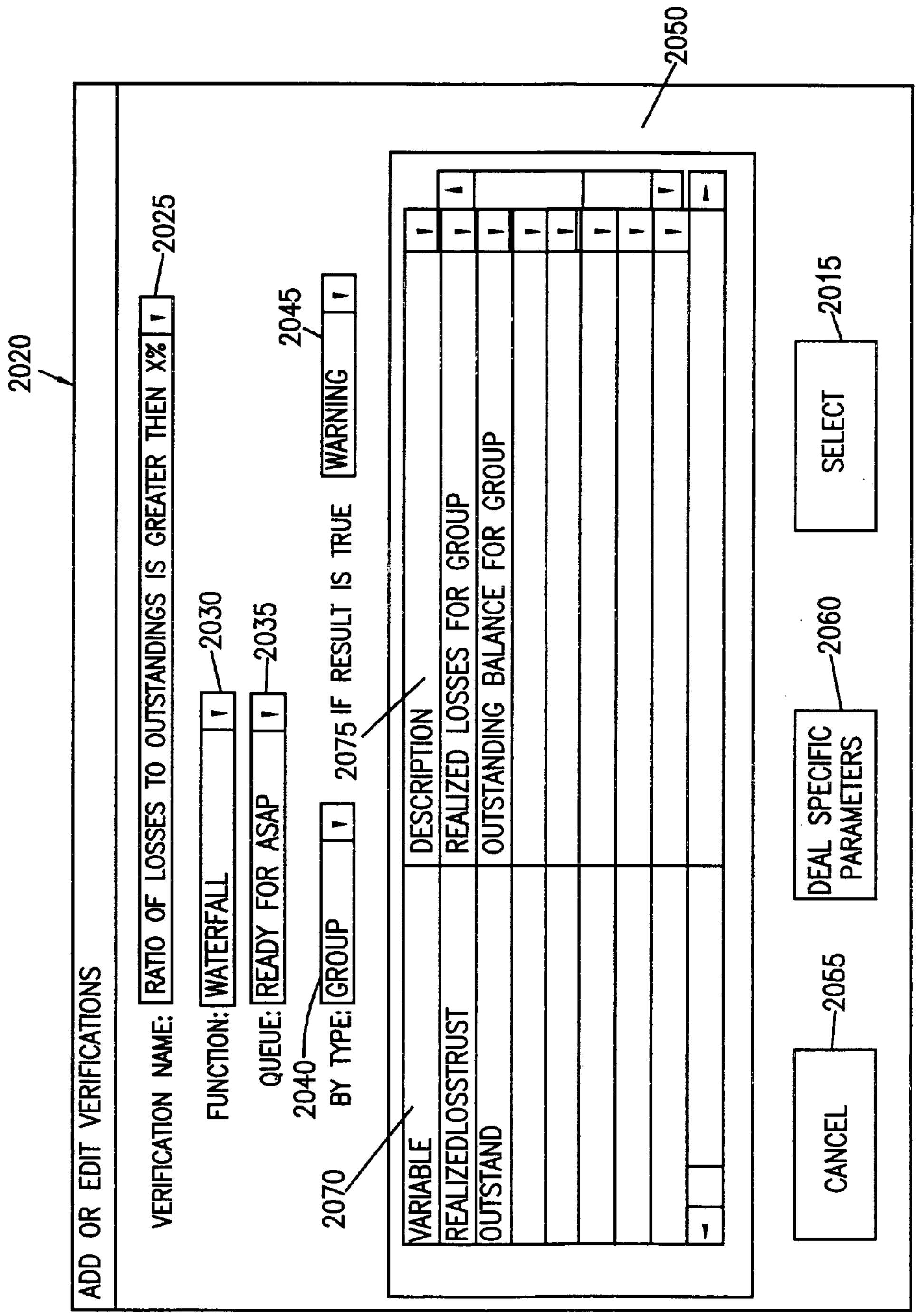
FIGS. 15A through 15D illustrate examples of user screens for development of automated verification tests, parameter value selection, and association of the verifications developed with specific deals.
Figure 15B:
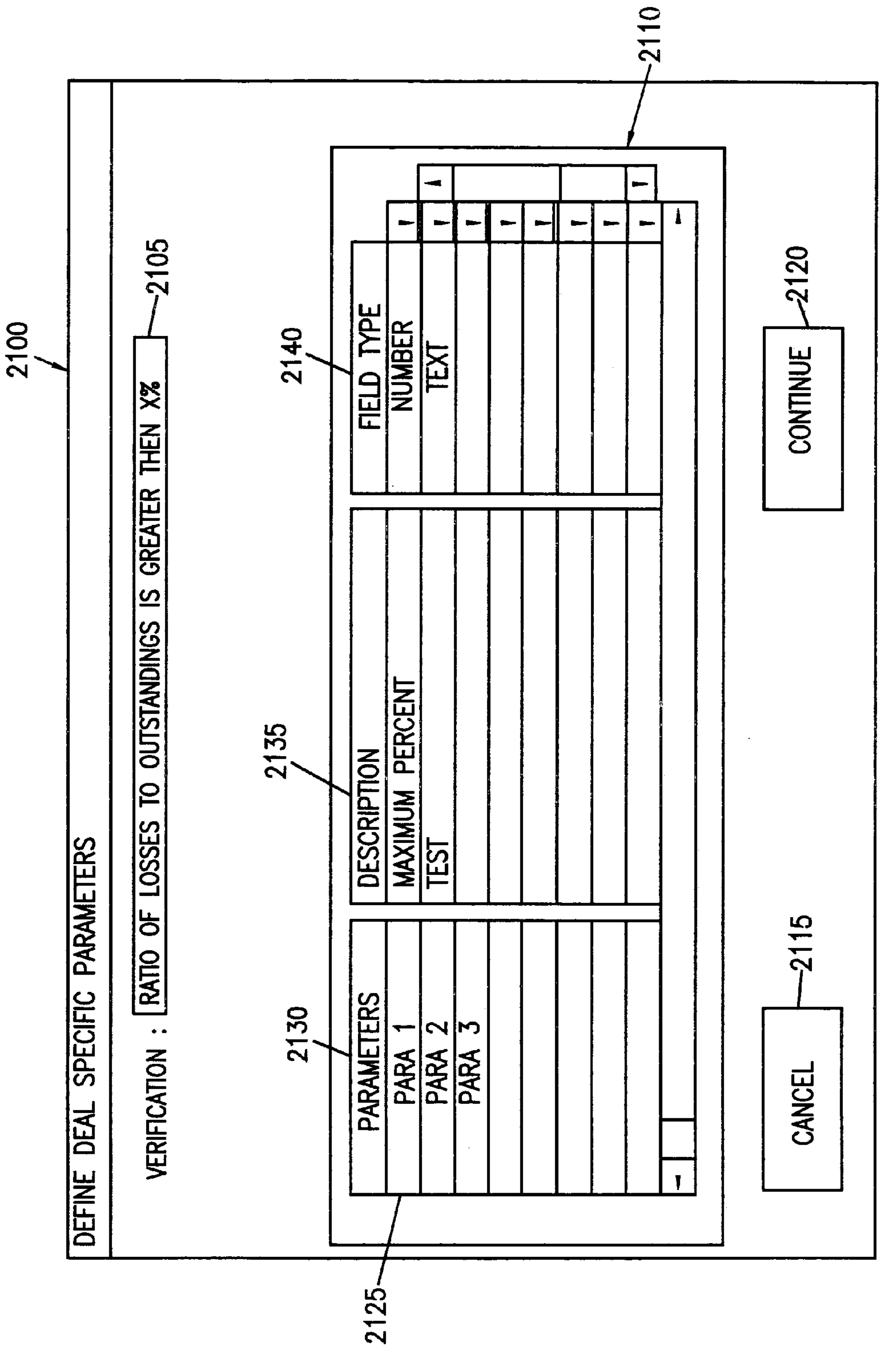
Figure 15C:
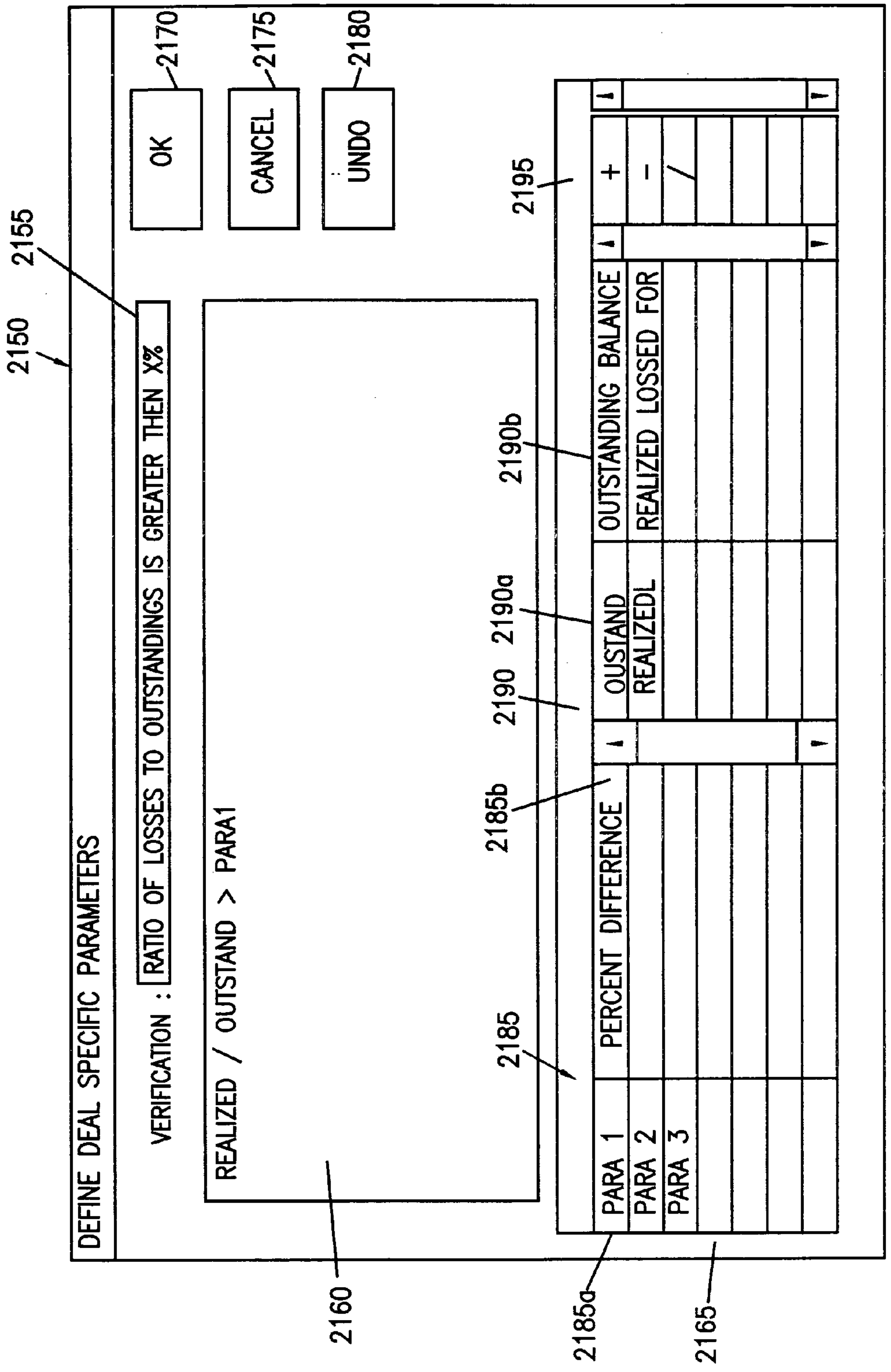
Figure 15D:
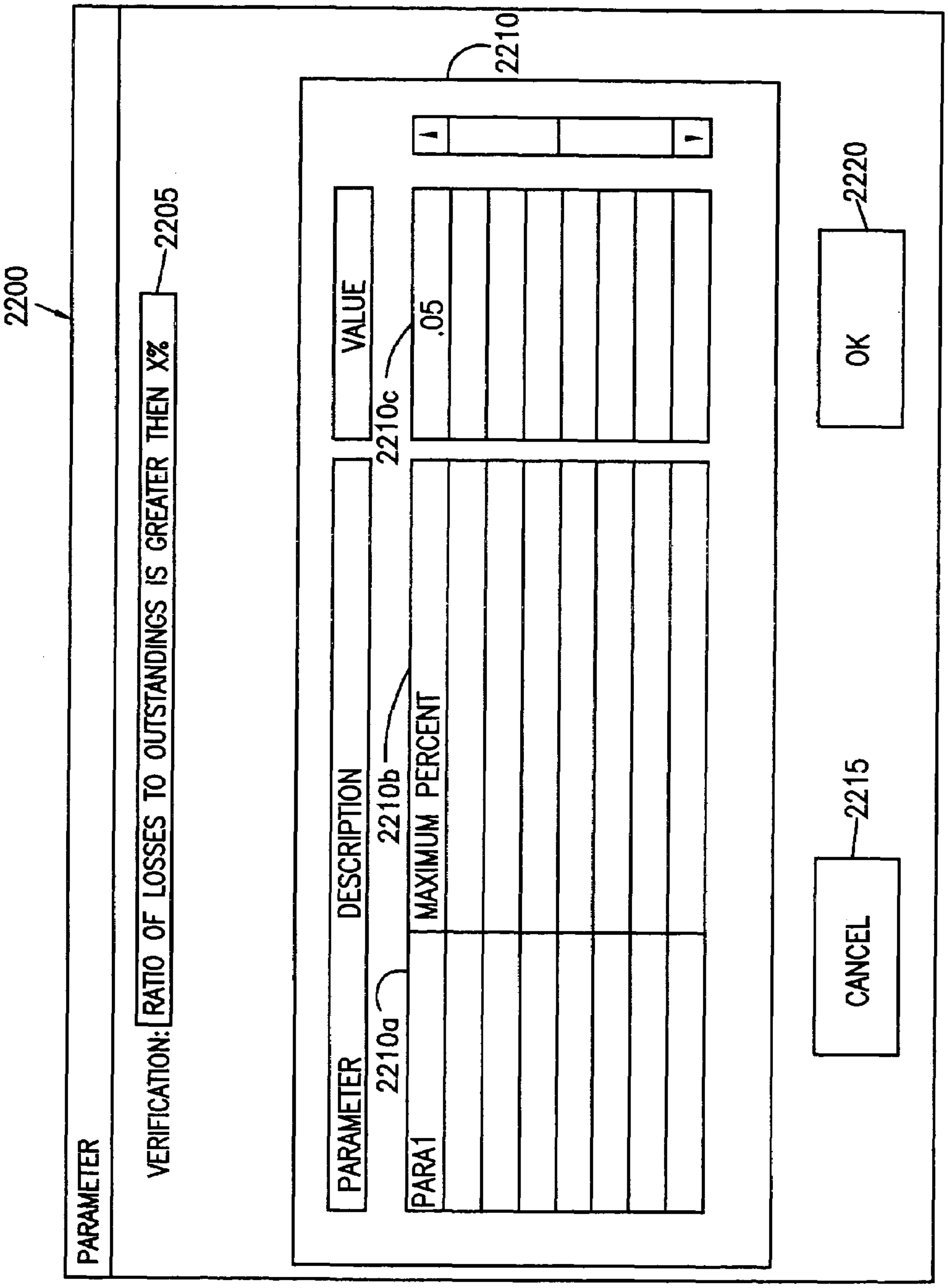

FIGS. 15A through 15C are exemplary illustrations of data entry screens which may be used. FIG. 15A illustrates a add or edit verifications screen 2020. This includes drop-down list boxes 2025, 2030, 2035, 2040 and 2045, and embedded sub-form 2050 and push buttons 2055, 2060 and 2065.

Drop-down list 2025 presents a list of existing verification names from which one to be modified may be selected. If a new verification is being created, a new name is entered in the text box for field 2025 (duplicate names are not permitted). Field 2025 is blank by default.

A selection for field 2030 is made from a drop-down list of the existing functions (such as Waterfall, tax—monthly, etc.) If screen 2020 is called from the Active Deals Screen, the default value for function field 2030 is that of the selected active deal. The value for queue field 2035 is selected from a drop-down list link to the master queue table and programmed to display only the queues associated with the function selected in field 2030. Type field 2040 is used to select how to organize the report for the verification will be displayed. In screen 2020, the selection for this field is "Group", which means that it is related to grouped or aggregated collateral information. Other possibilities might include "Group and Total Deal" "Class" (i.e. CUSIP number), "Class and Total Class", "Total Deal", etc.

The entry made in field 2045 characterizes an abnormal result in terms of severity. Choices may include "Error" (the result is definitely incorrect), "Warning" (the result is probably incorrect but could be acceptable under certain circumstances) and "Review" (the result should be scrutinized, but may be correct).

Sub-form 2050 displays a "Variable" column 2070 in which variable names are listed, and a "Description" column 2075 in which a brief description of the variable itself is entered. By default, sub-form 2050 is blank unless an existing verification (listed in Verification Name field 2025) is being modified.

After selecting the desired variables in sub-form 2050, any required deal specific parameters are defined. (If the user does not wish to save the work in screen 2020, Cancel push button 2055 may be used to return to the previous screen.) To define deal specific parameters, the user presses Deal Specific Parameters Push Button 2060, which displays a Define Deal Specific Parameters screen, an example of which is illustrated at 2100 in FIG. 15B.

Screen 2100 displays a text box 2105, an embedded sub-form 2110, a Cancel push button 2115, and a Continue push button 2120. When screen 2100 appears, text box 2105 already contains the Verification Name as entered in field 2025 in the Add or Edit Verification screen 2020 (FIG. 15A).

Sub-form 2110 is comprised of one or more rows such as 2125, each displaying the database record for one parameter, and three columns 2130, 2135 and 2140 which display the fields for the parameter records. Sub-form 2110 is empty by default unless an existing verification is being edited. Entries for Parameters Column 2130 are selected from a drop-down list including the names of previously defined parameters. The entries for Description Column 2135 are made manually, unless an existing verification is being modified, in which case the previously defined descriptions are listed. The selection for Field Type Column 2140 is made from a drop-down list including entries such as "number", "text", etc.

If the user does not wish to save the work in screen 2100, Cancel push button 2115 may be used to return to the previous screen. If the user wishes to proceed, Continue push button 2120 is selected. That records the parameter definitions and the user is brought to the Build Calculation screen 2150 shown in FIG. 15C. Similarly, with reference again to FIG. 15A, if no deal specific parameters need to be defined, the user proceeds directly to Build Calculation screen 2150 by pushing Select push button 2065.

Screen 2150 is used to create the formula for the calculation or comparison. Screen 2150 is comprised of a verification text box 2155 into which displays the verification name from field 2125 in Add or Edit Verifications Screen 2020, a Composition Window 2160 and which the required computation or comparison is actually composed, an embedded sub-form 2165 which lists the parameters, variables, and operators available for defining the calculation, an OK push button 2170, a Cancel push button 2175 and Undo push button 2180. When screen 2150 appears, Composition window 2160 is empty unless an existing verification is being modified. In that case, the previously defined calculation is displayed.

Embedded sub-form 2165 is comprised of a Parameters section 2185, a Variables section 2190, and a Functions section 2195. Parameter section 2185 displays columns 2185A and 2185B which respectively list the parameter ID and descriptions set-up in the Define Deal Specific Parameters screen 2100. Variable section 2190 is also comprised of two columns 2190A and 2190B which respectively display a Variable ID and description for the variables selected in the Add or Edit Verification Screen 2020. Functions section 2195 is comprised of a single column which list the operators available for use in composition window 2160. The operators are accessed by a drop-down list including entries such as +, −, ÷, *, >, <, etc.

To define the computation, the user clicks on entries from the parameters, Variables and Functions sections of sub-form 2165 in the order in which they are to be appear. Errors are corrected by use of Undo button 2180 which erases the last item entered. If the user wishes to terminate without saving, Cancel button 2175 is used to return to the previous screen without saving. To save the calculation created, OK push button 2170 is used. This saves the verification and makes it available for later use, and returns the user to the Main Menu.

The actual process involved in selecting the verifications for a particular deal has already been described in connection with set-up screen 900 shown in FIG. 7F. Specific values for the needed parameters are recorded using Enter Parameter Values screen 2200 illustrated in FIG. 15D, accessed by selecting the Deal Specific Parameters push button from main verification screen 2020 (See FIG. 15A). Enter Parameter Values screen 2200 is comprised of a text box 2205 which lists the name of the verification being developed from field 2025 in Add or Edit Verification screen 2020, and embedded sub-form 2210, a cancel push button 2215 and an OK push button 2220.

Sub-form 2210 is comprised of column 2210*a* and 2210*b* which respectively list the parameter names and descriptions selected in the defined specific Parameters screen 2100 and a column 2110*c* which provides text boxes for the user to enter the values needed for the respective parameters.

If the user does not wish to save the data entered, cancel push button 2215 may used to return to screen 2020 (see FIG. 15A). OK push button 2220 stores the selected values for the parameters, and also returns the user to screen 2020.

Running Verifications

Figure 18A:
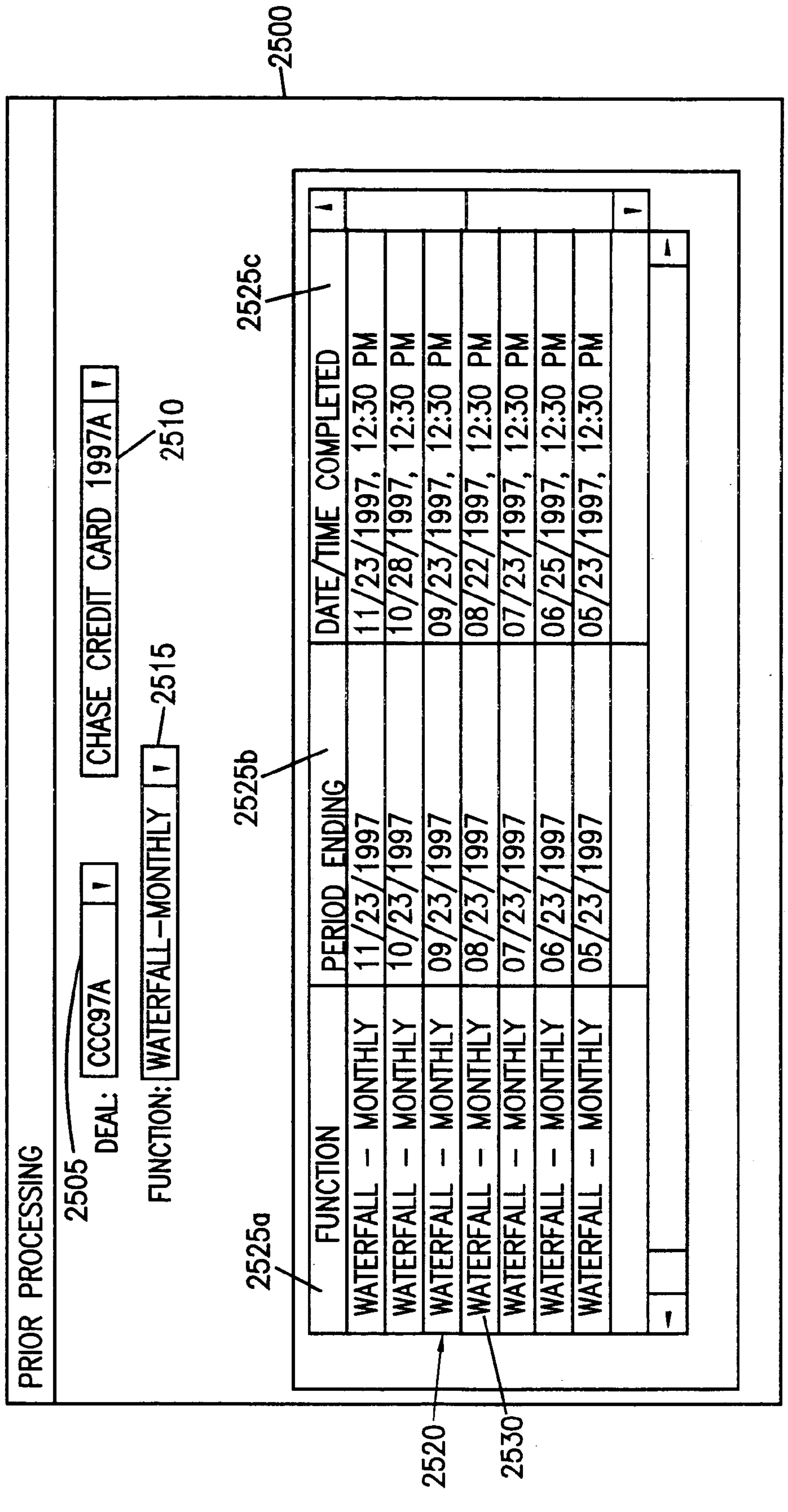
FIGS. 18A through 18B illustrate examples of screens from which the user can initiate and manage the restatement process for a particular waterfall distribution.

Automated verifications are run by selecting Run Verification push button 435 on main menu 400 (see FIG. 6), selecting the Run Verification action from Actions list 1535 on Active Deals Screen 1500 (see FIG. 11) or from the prior distribution screen described below in connection with FIG. 18A. Access from the Main Menu will generally be used when not working from the Active Deals Screen. Access from the Active Deals Screen is most convenient if the user intends to run verifications for the current distribution. When it is desired to run or re-run, or simply view a verification for a prior distribution, access will generally be through the Prior Distribution Screen. Here, selecting a distribution pay date, e.g. by right clicking the selection, brings up a list of reports options including "automated verification".

Figure 16:
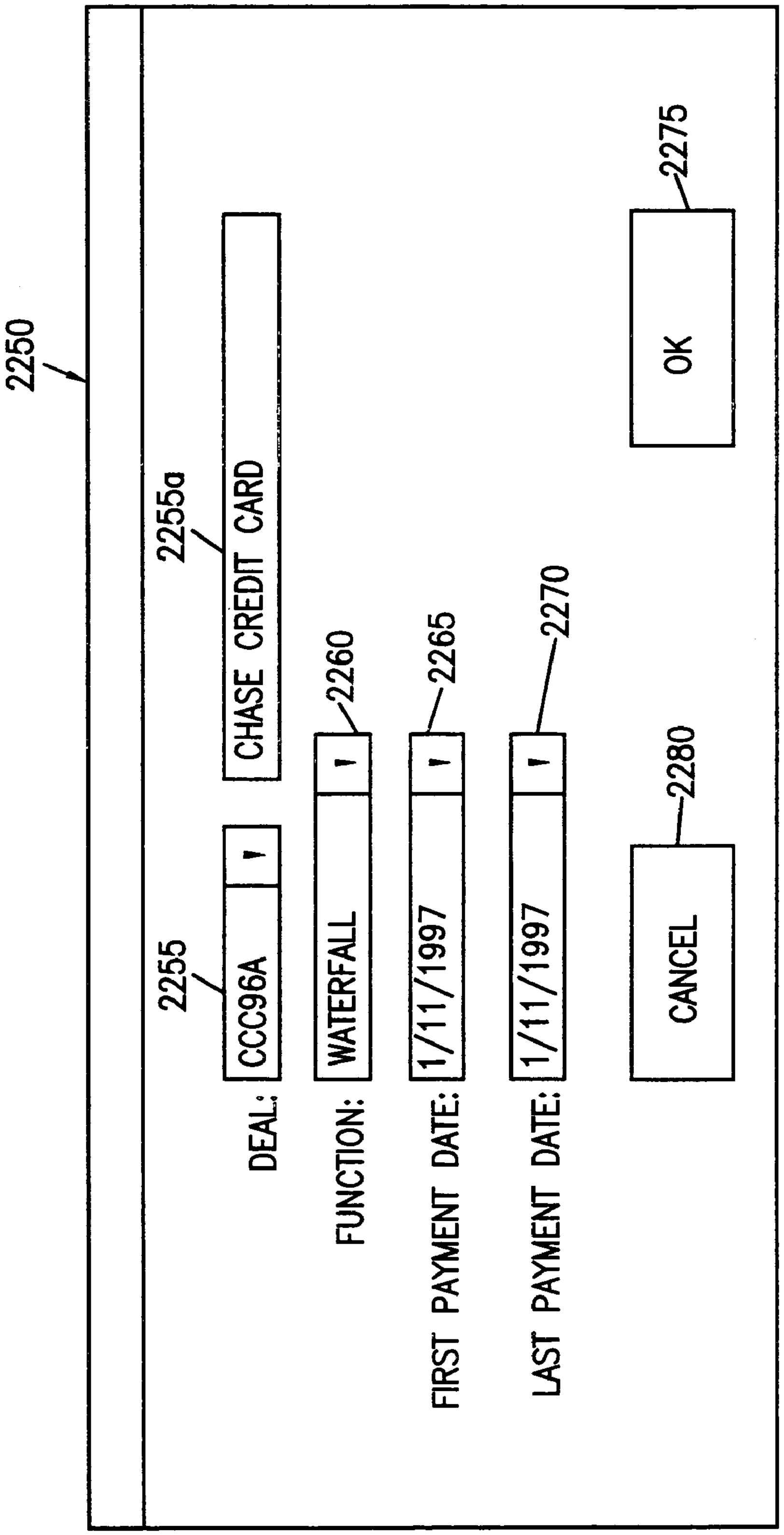
FIG. 16 illustrates an example of a screen from which the user may initiate automated verifications.

FIG. 16 illustrates an example of a Run Automated Analysis Screen 2250 from which the automated verification is actually run. This screen appears when the "run verification" function is selected in any of the three ways just described.

Run Automated Analysis screen 2250 includes a Deal ID field 2255 for which an entry is selected from a drop-down list linked to the Master Deals Table in the work flow database 244. The deal description is automatically entered in A Deal Description Window 2255A based on the Deal ID value in field 2255.

Run Automated Analysis screen 2250 also includes a function field 2260 for which data is selected from a drop-down list linked to the Master Functions Table, a First Payment Date field 2265 into which data is entered from a drop-down list of completed and current payment dates derived from the Master Loan History Table and a Last Payment Date field 2270 for which entries are provided from a drop-down list also linked to the Master Loan History Table. When screen 2250 appears, fields 2165 and 2170 are blank unless this screen was called from the Actions List in the Active Deals Screen. In that case, fields 2265 and 2270 both default to the next upcoming distribution date. If the Run Automated Analysis screen 2250 is accessed from the Main Menu 400 or the Prior Distributions List, the fields are blank by default.

When the necessary selections have been made, the user may press Run push button 2275. At that point, all relevant reports, as determined by the current queue and status milestone for the deal are run. (Individual verifications may not be selected.) If a range of dates has been indicated in fields 2265 and 2170, the verifications for that range of dates are run. If no last payment date is selected, then verifications for distributions prior to the upcoming current distribution are not run.

When the reports have been run, all are available in sequence for viewing on the user's screen. (The list may be scrolled, if necessary.) The reports may also be printed from the viewing screens. When the user has completed viewing the verification reports, the screen is closed in the normal manner.

If the user does not wish to complete running the verifications, cancel push button 2280 may be used to return to the screen from which Run Automated Analysis screen 2250 was accessed.

Verification Reports

For convenience, all verification reports are preferably displayed in a standard format. That format might include, for example, standard headers on every page showing the Deal ID and Descriptive Name, the date range for the verifications, and the current function, queue, and upcoming distribution, for the particular deal. Following the header, the report may display the title of the verification, the queue to which the verification applied, the data type according to which the report is organized, and the period ending date to which the specific report applies. Following this, there may be a listing of the variables and parameters, a word formula representation of the calculation and the actual results organized according to the data type listing previously referred to, the result of the computation, and the severity category. An example of a report formatted as described above is shown at 2300 in FIG. 17.

Restatements

On those occasions when a problem with the data or processing for a particular payment cycle is not detected before the payment has been made, corrections are made by "restating" the waterfall and monthly tax processing for that particular payment, and reprocessing any other affected subsequent payments. A restatement may be necessary, for example, if it is discovered that an issuer has provided incorrect information.

As implemented according to the present invention, the actions involved in a restatement are (a) storing an exact backup image of the data for the distribution to be restated in various database files in workflow data base 244, (b) deleting the processing results for the distribution being restated and for all subsequent distributions, (c) rerunning the end of cycle processing logic as previously described for the period preceding the one being restated, and (d) requiring the user to enter a comment explaining the need for the restatement. The specific events and operations will be described below for each step of the restatement process.

Initiating a Restatement

Generally, a process to be restated is designated by highlighting a particular deal in Active Deals Screen 1500 and then selecting Restatement from Actions List 1535. This displays a Prior Processing Screen, an example of which is shown at 2500 in FIG. 18A. Prior Processing Screen 2500 displays a Deal ID field 2505, a Deal Description field 2510, and a Function field 2515.

The entry for field 2505 is selected from a drop-down list linked to the Master Deals Table in ASAP database 250 (see FIG. 4). Deal Description Field 2510 is automatically filled in based on the selection for Deal ID field 2505. The entry for Function field 2515 is selected from a drop-down list linked to the Master Functions Table in Workflow Database 244.

Fields 2505, 2510 and 2515 function as a query form. An embedded report sub-form 2520 displays the function, the applicable period, and the date and time that the processing activity for that period was completed in respective columns 2525_a_–2525_c_ for the data returned by the query.

When screen 2500 appears, none of the rows 2530 in sub-form 2520 are highlighted. To proceed, the user highlights one of rows 2530, which causes an Options screen such as illustrated at 2550 in FIG. 18B to pop up over screen 2500. Options screen 2550 displays the Restatement options available for the deal and functions selected.

Available options include Reports, Restate Non-Financial, Restate Financial, Comments, View Comments, and Exit. These are displayed in respective lines 2555_a_, 2555_b_, 2555_c_, 2555_e_, 2555_f_ and 2555_h_. More than one restatement for a particular distribution may be performed as part of the correction process. In that case, additional restated versions will be available, and the Options sub-menu on screen 2550 will also list Select Prior Version on line 2555_d_ and Restore From Prior Version on line 2555_g_.

Selecting Reports (line 2555*a*) accesses a pop-up sub-menu of reports available for the distribution under review. Highlighting one of the listed reports displays that report for viewing and printing. This option might be exercised as part of the analyst's effort to study and correct the problem under investigation.

Selecting Comments line (2555*e*) from Options screen 2550 brings up Comments Screen 1590 described above in connection with FIG. 12C. Selecting View Comments (line 2555*f*) brings up Comment History List 1550 described in connection with FIG. 12B. Selecting Exit (line 2555*g*) returns the user to active deals screen 1500.

Figure 19A:
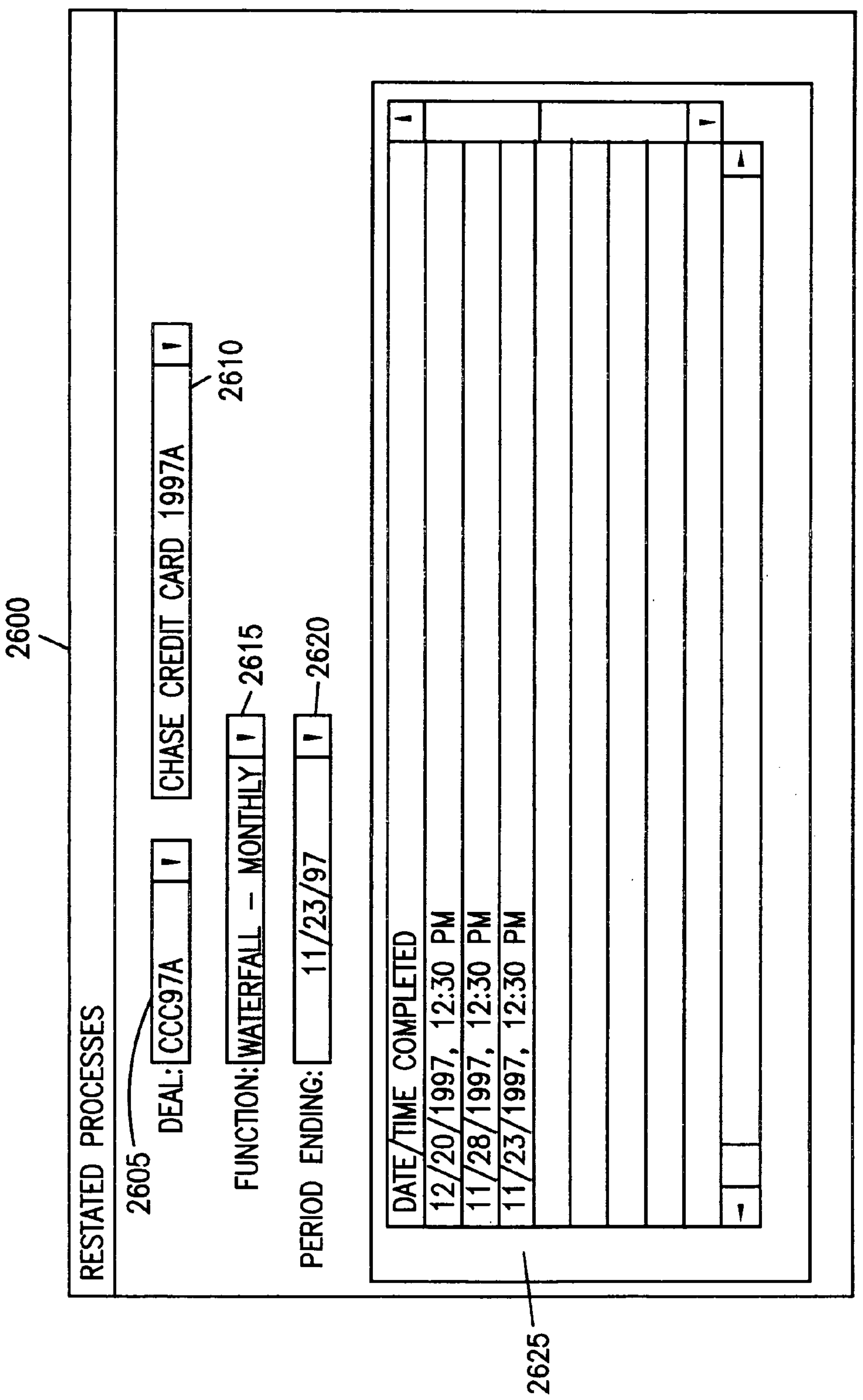
FIG. 19A illustrates an example of a Restated Processes sub-menu.

The Select Prior Version option on screen 2550 brings up a Restated Processes sub-menu, an example of which is shown at 2600 in FIG. 19A. Screen 2600 displays a Deal ID field 2605, a Deal Description field 2610, a Function field 2615 and a Period Ending field 2620, all of which are accessed from drop-down lists linked to tables in Workflow Database 240 and ASAP Database 250. (The data objects for fields 2605 in 2610 may be programmed so that making a selection from the drop-down list for one field results in corresponding data being automatically entered in the other field. Since the restatement function is applicable only to waterfall and monthly tax processing, the selections available for field 2620 are limited to these two. The selections for field 2625 include all of the pay dates for the deal selected in field 2605.

Figure 19B:
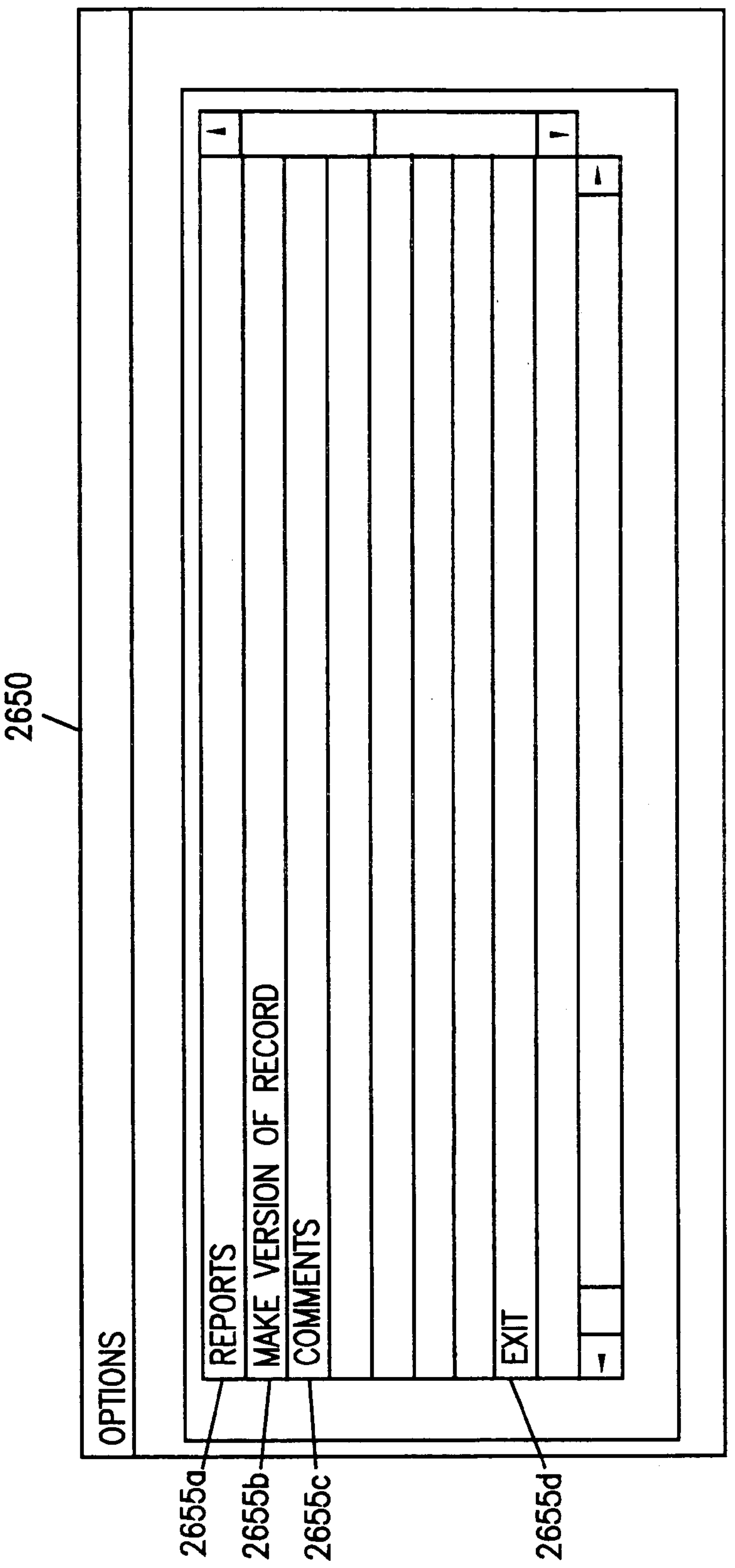
FIG. 19B illustrates an example of a pop-up Options List.

Fields 2605 through 2620 serve as a query. The results, in terms of the date and time the various restatements were completed, is reported in embedded sub-form 2625. Right clicking on one of the items listed in sub-form 2625 brings up a pop-up Options List, an example of which is illustrated at 2650 in FIG. 19B.

Available options may include Reports, line 2655*a*, Make Version of Record, line 2655*b*, Comments, line 2655*c*, and Exit, line 2655*d*. Selecting the Reports option brings up a list of reports of previous restatements for viewing. Selecting the Make Version of Record option designates the most recent restated version as the "official" or correct version. Selecting the Comments option brings up the comment entry screen previously described. The Exit option returns the user to the Active Deals Screen 1100.

Figure 18B:
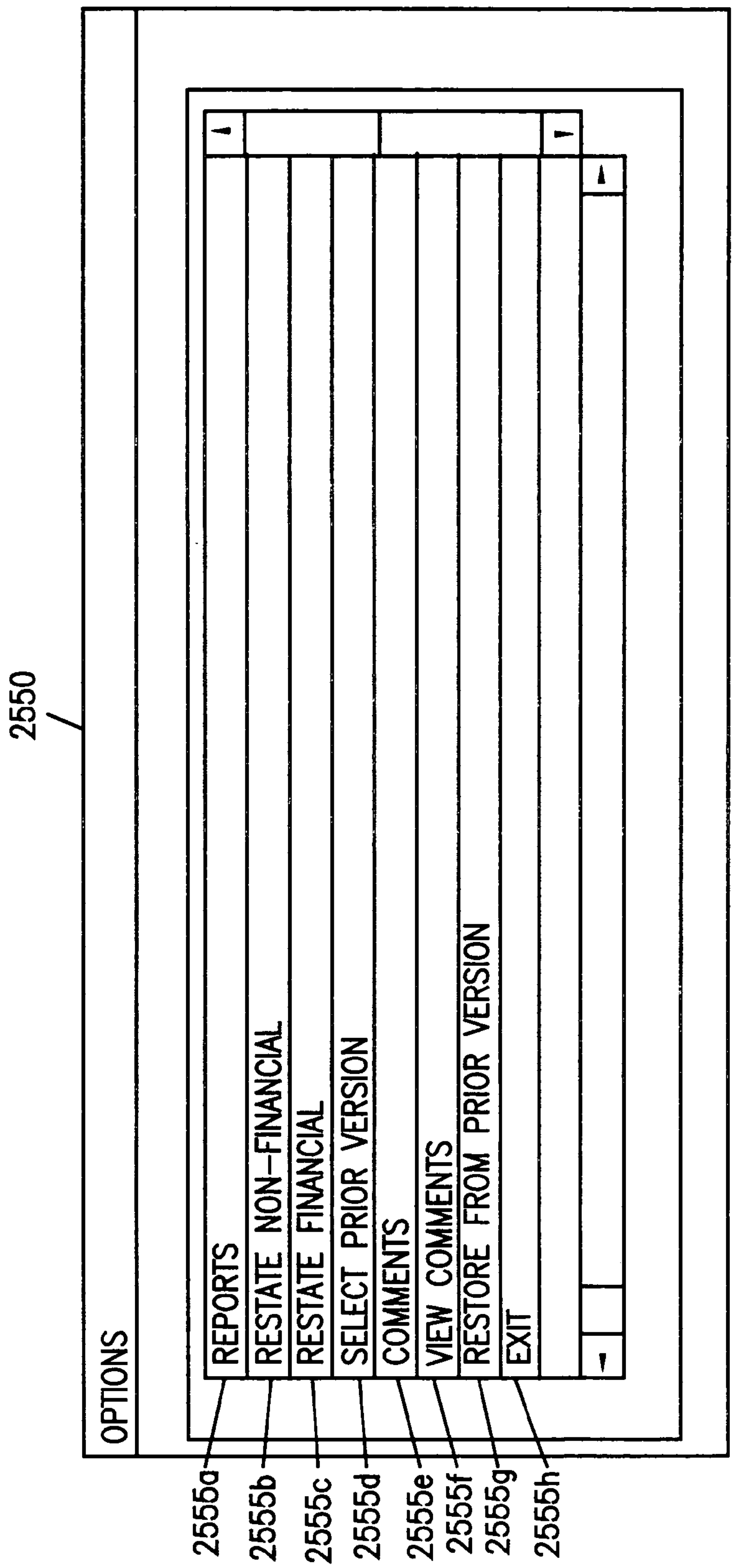

A restatement may involve the financial and/or non-financial aspects of a distribution. Restatements are initiated by selecting Re-state Non-Financial at line 2555*b* or Restate Financial at line 2555*c* in Options Screen 2550 (FIG. 18B). A message such as "Are you sure you want to re-state . . . " may be displayed for confirmation before a restatement is actually initiated.

When a restatement is performed, the status records for the deal are updated in Workflow Database 244 and a backup copy of all of the information related to the distribution being restated is saved in workflow database 244. This reduces the need to re-enter information and allows fast and easy correction of minor errors. Also, the prior distribution reports for the distribution being restated are maintained in the back up for payment information. This assures that workflow tracking integrity is not lost and allows prior reports to be printed as needed. Restated information for a payment is not automatically sent to RTP subsystem 220 (see FIGS. 3 and 4) but is designated for manual entry.

The nature of the problem giving rise to the restatement will determine the effect on the workflow resulting from the restatement. For example, referring back to FIG. 5B, if a non-financial restatement is required for a May distribution (step 292*d*), and the current distribution being processed is for the December payment (step 292*e*), only step 992*d* will have to be repeated. The workflow remains unchanged, i.e., waterfall processing for December, step 292*e*, tax processing for November, step 256*e*, and tax processing for the fourth quarter, step 260*d*, may continue.

In contrast, if the December distribution is being processed, and financial restatement is required for May at step 292*d*, all processing steps for May and all subsequent months, i.e. the May through December waterfall processing, the April through November monthly tax processing, the second, third and fourth quarter tax processing and the annual tax processing will have to be repeated. In that event the waterfall and tax processing queues will revert to the May waterfall distribution, and the April monthly and the second-quarter tax processing.

A tax restatement does not affect waterfall processing, but does require tax re-processing for the restated month and all subsequent months. Thus, for example, if waterfall processing is being performed for the December payment, and monthly tax processing for April (step 256*d*) must be restated, then the monthly tax computations for June through November, for the second, third and fourth quarters and for the year must be re-processed. The workflow for waterfall processing remains unchanged, but the tax processing queues are returned to the month of May and the second-quarter.

As will be appreciated from the above description, the invention provides an effective solution to workflow management for complex financial transactions involving many deals and data which changes on a frequent basis. It also permits modification of the data structures as needed to accommodate evolutionary changes in the financial structures of the deals being handled. In the preferred embodiment, the invention is implemented using a relational database management system on a computer network organized on a client-server model. It should be understood, however, that other system architecture and other programming implementations providing the workflow management and other capabilities described is considered to be within the scope of the invention. In addition, other variations and modifications and other uses will be apparent to those skilled in the art in light of the description of the invention. It is intended, therefore, that the present invention be limited not by the specific disclosure herein, but only by the appended claims.

We claim:

1. A computerized method of workflow management for a trustee handling a plurality of securitization transactions comprising the steps of:

recording deal setup information in an electronic database including information related to the structure of each of the securitizations;

recording workflow status information for each of the securitizations in the electronic database;

periodically receiving asset level data transmitted by at least one asset manager;

aggregating the asset level data;

transmitting the aggregated asset level data electronically to a workflow management software module;

providing an active deals display generated by the workflow management software module, based at least in part on the aggregated asset level data, the recorded deal setup information and the recorded workflow status information, which display provides access to workflow status information for particular securitizations, provides prompts for a user as to work which is to be done with respect thereto, and permits the user to initiate actions required for performance of the trustee's duties; and updating the recorded workflow status information for the securitizations based on work performed with respect thereto.

2. The method described in claim 1, wherein the steps are performed under control of the workflow management software module.

3. The method described in claim 1 further including the step of electronically transmitting data concerning payments due investors in the securitization from the workflow management software module to a software module which processes payments to the investors based on the transmitted data.

4. The method described in claim 3, further including the step of electronically disseminating reports and other data compilations upon completion of the payment processing.

5. The method described in claim 1 further including the step of calculating waterfall payments due investors in the securitizations on a periodic basis in accordance with the deal structure and the aggregated asset level data.

6. The method described in claim 5, further including the step of performing calculations of taxes owed by the investors on the waterfall payments based on the waterfall calculations.

7. The method described in claim 1, in which the step of aggregating the asset level data is performed by a first software module separate from the workflow management software module.

8. The method described in claim 7, further including the step of providing an interface which maps the data produced by the first software module for compatibility with the workflow management software module.

9. The method described in claim 1, in which the workflow status information is displayed in terms of basic functions associated with management of the securitization, workflow events associated with the basic functions and milestones associated with the workflow events.

10. The method described in claim 9, in which the basic functions include waterfall processing and tax processing.

11. The method described in claim 10, in which the workflow events associated with the waterfall processing function include a Data Aggregation queue, a Data Preparation queue, a Ready for Waterfall Processing queue, a Waterfall Approval queue and a Payment queue.

12. The method described in claim 11, in which the milestones associated with the Data Aggregation queue include Not Ready, Data Received and Denied.

13. The method described in claim 12, further including the step of changing the workflow status of a securitization in waterfall processing to the Data Aggregation queue and Not Ready status when a previous payment cycle has been completed.

14. The method described in claim 13, further including the step of changing the workflow status of a securitization in the Data Aggregation queue and the Not Ready milestone to Data Received status when asset level data for a new waterfall processing cycle is received.

15. The method described in claim 14, further including the step of changing the workflow status of a securitization from Not Ready to Data Received status in response to a user command.

16. The method described in claim 12, further including the step of changing the workflow status of a securitization in the Data Received milestone to the Data Preparation Queue and the Tape Run milestone if the aggregated asset level data is ready for further processing, or is transferred to Data Denied status in the Data Aggregation queue if the aggregated asset level data is incomplete, inaccurate or otherwise not ready for further processing.

17. The method described in claim 16, further including the steps of:

permitting a user to review the aggregated data and to approve or reject the data, and changing the workflow status of the securitization to the Data Preparation queue and the Tape Run milestone if the user approves the data, or to the Data Denied status in the Data Aggregation queue if the user rejects the data.

18. The method described in claim 17, further including the step of requiring entry of supporting comments by the user into a data entry screen before changing the status to Data Denied if the user has rejected the data.

19. The method described in claim 16, further including returning the workflow status of a securitization in the Data Denied milestone to Data Received status when new or corrected aggregated data is received.

20. The method described in claim 11, in which the milestones associated with the Data Preparation queue include Not Ready, Tape Run, Loan Level Processed and Denied.

21. The method described in claim 20, wherein, for a securitization in the Data Preparation queue and the Not Ready milestone, the actions which the user is permitted to initiate include:

an Approve action; and a Data Entry action.

22. The method described in claim 21, further including the step of:

changing the workflow status to the Ready for Waterfall Processing queue and the Ready milestone in response to an Approve action.

23. The method described in claim 21, further including the step of:

making a data entry screen available to the user when a Data Entry action is initiated.

24. The method described in claim 20, further including the step of changing the workflow status of a securitization in the Data Preparation queue and the Tape Run milestone to the Asset Level Processed status in the Data Preparation queue by the workflow management software module when the data aggregation operation has been completed, or to the Data Aggregation queue and Data Denied status in response to a user command.

25. The method described in claim 24, further including the steps, for a securitization in the Data Preparation queue and the Asset Level Processed milestone, of:

permitting the user to review the aggregated asset level data, and to accept or reject the data according to predefined criteria; and changing the workflow status of the securitization to the Ready For Waterfall Processing queue and the Ready status if the user approves the data, or to the Data Denied status in the Data Prep queue if the data is rejected.

26. The method described in claim 20, wherein, for a securitization in the Data Preparation queue and the Denied milestone, the actions which the user is permitted to initiate include:

a Deny to Asset Level Aggregation action;

an Enter Data action; and an Aggregate action.

27. The method described in claim 26, further including the step of changing the workflow status to the Asset Level Aggregation queue and the Denied status when the Deny to Asset Level Aggregation action is taken.

28. The method described in claim 26, further including the step of making a data entry screen available to the user when the Enter Data action is initiated.

29. The method described in claim 26, further including the steps of:

performing an asset level data aggregation when the Aggregate action is initiated; and changing the workflow status to Loan Level Processed in the Data Preparation queue when the asset level data aggregation has been completed.

30. The method described in claim 11, in which the milestones associated with the Ready for Waterfall Processing queue include Ready and Denied.

31. The method described in claim 30, wherein, for a securitization in the Ready for Waterfall Processing queue and Ready status, the actions which a user is permitted to initiate include:

a Deny action;

a Run Waterfall action;

an Enter Data action;

an Add Special Headers/Footers action; and an Add Asset Level Information action.

32. The method described in claim 31, further including the step of returning the workflow status of the securitization to the Data Ready Queue and Data Denied milestone when a Deny action is selected.

33. The method described in claim 31, when the Run Waterfall action is selected, further including the steps of:

providing the asset level data to a third software module for waterfall processing; and when the waterfall processing has been completed, changing the workflow status to the Waterfall Approval queue and Ready milestone.

34. The method described in claim 31, when the Enter Data, the Add Special Headers/Footers or the Add Asset Level Information actions are selected, further including the steps of:

making data entry screens accessible to the user; and after data entry has been completed, returning the user to the list of permitted actions.

35. The method described in claim 30, wherein, for a securitization in the Ready for Waterfall Processing queue and Denied status, the actions which a user is permitted to initiate include:

a Deny action; and a Run Waterfall action.

36. The method described in claim 35, further including the step of:

changing the workflow status to the Data Ready queue and Data Denied status when a Deny action is initiated.

37. The method described in claim 35, when a Run Waterfall action is initiated, further including the steps of:

providing the asset level data to a third software module for waterfall processing; and thereafter, when the waterfall processing is completed, changing the workflow status to the Waterfall Approval queue and Ready status.

38. The method described in claim 11, in which at least a Ready milestone is associated with the Waterfall Approval queue.

39. The method described in claim 38, wherein, for a securitization in the Waterfall Approval queue, further including the steps of:

performing at least one predefined test under control of the user to verify the accuracy of the waterfall calculations;

permitting the user to approve the data if the test is passed; and in response to approval of the data by the user, changing the workflow status to the Payment queue and Final Approval status.

40. The method described in claim 39, further including the steps of:

permitting the user to select the Deny action if the verification test is not passed; and in response to selection of the Deny action, changing the workflow status to a predetermined status level in an earlier queue.

41. The method described in claim 38, wherein, for a securitization in the Waterfall Approval queue, further including the steps of:

performing a series of predefined tests to verify the accuracy of the waterfall calculations; and if the tests are passed, changing the workflow status to the Payment queue and Final Approval status; or if the tests are not passed, changing the workflow status to a predetermined queue and milestone as a function of which of the tests in the series was not passed.

42. The method described in claim 11, in which the milestones associated with the Payment queue include Final Approval, Received by Payment System, and Payment Made.

43. The method described in claim 42, for a securitization in the Payment queue and Final Approval status, further including the steps of:

changing the workflow status to the Received by Payment Systems milestone; and providing the waterfall data to a payment processing software module for payment processing.

44. The method described in claim 42, for a securitization in the Payment queue and the Received by Payment Systems milestone, further including the step of:

when the payment processing is complete, changing the workflow status to the Payment Made milestone.

45. The method described in claim 42, for a securitization in the Payment queue and the Payment Made milestone, further including the steps of:

selecting the next waterfall distribution date; and the workflow status to the Data Aggregation queue and the Not Ready milestone.

46. The method described in claim 10, in which the workflow events associated with the tax processing function include a Ready for Tax Processing queue, a Tax Approvals queue and a Tax Reports queue.

47. The method described in claim 46, wherein, for a securitization in tax processing, in the Ready for Tax Processing queue, the actions which the user is permitted to initiate irrespective of the milestone, include:

an Enter Data action; and a Run Tax Processing action.

48. The method described in claim 47, further including the step of making a tax data entry screen accessible to the user if the Enter Data action is selected.

49. The method described in claim 47, further including the steps of:

making the waterfall data available to a tax processing software module for computation of taxes due on the waterfall payments; and after the tax computations have been completed, changing the workflow status to the Tax Approval queue and Ready status.

50. The method described in claim 49, further including the step of performing tax computations for each of the waterfall payment periods.

51. The method described in claim 46, wherein, for a securitization in the Tax Approval queue, and the Ready milestone, the actions which the user is permitted to initiate include:

an Approval-Monthly action; and an Approval-Annual action.

52. The method described in claim 51, further including the step of:

applying at least one verification test to the waterfall payment tax computations if the Approval-Monthly action is selected.

53. The method described in claim 51, if the Approval-Quarterly action is selected, further including the steps of: combining the monthly waterfall payment tax data for the respective securitizations;

applying at least one verification test to the combined data; and upon successful verification of the tax computations, changing the workflow status of the securitization to the Mail Reports queue and Ready status.

54. The method described in claim 51, if the Approval-Annual action is selected, further including the steps of:

combining the quarterly tax data for the respective securitizations;

applying at least one verification test to the combined data; and upon successful verification of the tax computations, changing the workflow status of the securitization to the Mail Reports queue and Ready status.

55. The method described in claim 51, wherein, for a securitization in the Tax Approval queue, and the Ready milestone, the actions which the user is permitted to initiate further include:

a Deny action; and a Tax Reports action.

56. The method described in claim 55, further including the step of changing the workflow status of the securitization to a predetermined queue and milestone based on the structure of the specific securitization if the Deny action is selected.

57. The method described in claim 55, if the Tax Reports action is selected, further including the steps of:

making a list of tax reports accessible to the user;

permitting the user to select of one or more reports; and activating a tax processing software module to generate the selected reports.

58. The method described in claim 55, wherein, for a securitization in the Tax Reports queue, the actions which the user is permitted to initiate include:

a Mail action; and a Tax Reports.

59. The method described in claim 58, if the Mail action is selected; further including the steps of:

activating the tax processing software module to print quarterly and annual tax reports previously generated;

identifying the next tax processing cycle; and changing the workflow status to the Ready for Tax Processing queue and Ready status for the identified period.

60. The method described in claim 58, if the Tax Reports action is selected; further including the steps of:

permitting tax reports to be selected by the user for generation; and generating the selected reports.

61. The method described in claim 46, in which the milestones associated with the Ready for Tax Processing queue include Ready and Denied.

62. The method described in claim 46, in which the milestones associated with the Tax Approvals queue include Ready and Denied.

63. The method described in claim 46, in which at least a Ready milestone is associated with the Tax Reports queue.

64. The method described in claim 1, further including the steps of: generating a selection screen having a plurality of active elements thereon; and permitting a user may initiate functions by selection of the active elements.

65. The method described in claim 64, wherein the functions which the user is permitted to initiate include one or more of:

invoking an active deals display;

viewing and changing index data used for waterfall payment calculations;

viewing and changing details of the deal structures for the securitizations;

viewing and changing information concerning those to whom responsibility may be assigned for particular securitizations;

viewing and changing information concerning particular assignments;

viewing and changing information concerning other individuals and entities interested in the securitizations or having information relevant thereto;

viewing and changing information related to database structure;

setting up and performing data verifications;

viewing historical data concerning the securitizations; and establishing and updating security levels for access to information by users.

66. The method described in claim 1, wherein the step of recording set up information includes:

allowing a user to select pertinent information concerning a particular securitization for entry in fields on a plurality of data entry screens from lists stored in at least one database record;

automatically filling in data in additional fields based on a selection made for at least one other field; and allowing the user to create records for new information not contained in an existing database record by entering data in the fields of at least one data entry screen for that record.

67. The method described in claim 66, wherein the step of recording set up information further includes permitting the user to edit existing database records by entering new information in the fields of at least one data entry screen for that record.

68. The method described in claim 66, further including the step of allowing the user to make selections for at least some of the fields in a data entry screen from drop-down lists created from stored database records.

69. The method described in claim 68, further including the step of determining the content of at least one of the drop-down lists as a function of the data selection made for another field.

70. The method described in claim 68, further including the step of scrolling at least some of the drop-down lists on the basis of partial entries in text boxes for the lists.

71. The method described in claim 1, wherein the step of recording set up information includes:

allowing a user to access and enter data into the fields of a series of data input screens, each screen providing for entry of a particular type of data related to the particular securitization; and storing the data entered by the user in the database in response to a save command from the user.

72. The method described in claim 71, further including the step of permitting the user to access specific data entry screens by selecting tabs appearing on all of the screens in the series.

73. The method described in claim 71, further including the step of displaying tables in at least some of the data input screens, the tables having a plurality of rows, each row representing a data base record and a plurality of columns, each column row representing the fields of the displayed records.

74. The method described in claim 73, further including the step of automatically filling at least some of the fields of a particular database record based on selection by the user of data for another field for that record from a list.

75. The method described in claim 71, further including the step of permitting the user access to a Setup data screen, an Output data screen, a Contacts data screen, a Steps data screen, a Quality Control data screen, an Inputs data screen and a Header/Footer data screen.

76. The method described in claim 75, further including the step of permitting the user to enter data in fields of the Setup data screens identifying a particular securitization, and at least the basic functions to be performed in managing the particular securitization.

77. The method described in claim 76, further including the step of permitting the user to enter data in fields, the Setup data entry screens identifying the frequency with which the basic functions are to be performed from a list of possible frequencies.

78. The method described in claim 75, further including the step of permitting the user to enter data in fields of the Output data entry screens which specify the distribution media, the subject matter, the format, the release date, recipient information and the title of each report to be created for a particular securitization.

79. The method described in claim 75, further including the step of permitting the user to enter data in fields of the Contacts data entry screens from drop-down lists which exclude employees of the trustee.

80. The method described in claim 75, wherein the workflow status of the securitizations is recorded in terms of basic functions to be performed, processing queues for each basic function and progress milestones for each queue, and further including the steps of:

permitting a user to identify a particular securitization and a basic function on the Steps data entry screen;

displaying a table in the Steps data input screens, the table having a plurality of rows, each representing a data base record for a specific queue and a plurality of columns, each representing the fields of the displayed records.

81. The method described in claim 80, wherein the fields for each queue record include at least a queue identification field, a field identifying the individual responsible for performance of actions associated with the queue and a field specifying the day of the month on which the action is to be taken.

82. The method described in claim 81, further including the step of permitting selection of the entry for the queue identification field from a drop-down list populated from a database record in accordance with a basic function selected by the user.

83. The method described in claim 82, further including the step of populating the queue identification drop-down list in a predetermined order representing the expected processing order for the selected basic function.

84. The method described in claim 82, wherein the step of permitting queue selection from the queue identification drop-down list includes permitting concurrent selection of more than one item from the list.

85. The method described in claim 81, further including the step of permitting selection of a Deny field for each queue record which specifies a workflow path change in case data is disapproved at a particular queue.

86. The method described in claim 85, wherein the workflow path change is specified by flagging the Deny field, and wherein a data disapproval in a queue for which the Deny field has been flagged returns the status of the securitization to the nearest queue above in the processing order for which the Deny field has also been flagged, except that if the disapproval takes place in a queue for which the Deny field has been flagged, the status is returned to the immediately previous queue, irrespective of flagging of the Deny field.

87. The method described in claim 75, further including the steps of:

displaying a drop-down list of predefined data verification tests in the Quality Control data entry screens;

displaying tables in the Quality Control data entry screens, the table having a plurality of rows, each representing a data base record concerning use of a data verification test; and permitting a user to select at least one verification test from the dropdown list, and to specify a queue and milestone at which the selected verification test is to be performed.

88. The method described in claim 87, wherein the step of permitting verification test selection from the verification identification drop-down list includes permitting concurrent selection of more than one item from the list.

89. The method described in claim 75, further including the steps of:

permitting a user to identify a particular securitization and a basic function on the Steps data entry screen;

displaying a table in the Steps data input screens, the table having a plurality of rows, each representing a data base record for a specific queue and a plurality of columns, each representing the fields of the displayed records.

90. The method described in claim 75, wherein the aggregated asset level data is transmitted in the form of at least one database record having a first structure, and further including the step of:

permitting a user to remap fields of the first database structure in the Inputs data entry screen to correspond to fields of a second database structure used in performing the waterfall payment calculations.

91. The method described in claim 90, further including the steps of:

displaying two tables in side-by-side relation in the Inputs data entry screen, the tables having a plurality of aligned rows, with the rows of the first table permitting selection of fields of the first data base structure, and the rows of the second table permitting selection of fields in the second database structure; and permitting the user to populate respective aligned rows of the two tables with data to identify corresponding fields in the two database structures for the particular securitization.

92. The method described in claim 91, wherein the data for the fields are selected from drop-down lists of the fields in the respective database structures.

93. The method described in claim 92, further including the steps of:

permitting the user to select a previously created mapping as a template for a new mapping; and populating the rows of the two tables to reflect the previously created mapping.

94. The method described in claim 90, further including the step of: permitting the user to select a previously created mapping as a template for a new mapping.

95. The method described in claim 75, further including the steps of:

permitting the user to identify a particular securitization in the Header/Footer data entry screen; and permitting the user to specify in the Header/Footer data entry screen, the text and page location of headers and footers to be used in periodic reports for the specified securitization.

96. The method described in claim 74, further including the step of permitting a user to enter data in an index rate data entry screen which identifies a particular securitization, and specifies an index and the source thereof for use in the waterfall calculations for the particular securitization.

97. The method described in claim 96, further including the step of permitting a user to enter dates in the index rate data entry screen for which values of the specified index are to be determined in connection with the particular securitization.

98. The method described in claim 74, further including the step of permitting a user to enter data in a global staff/contact data entry screen concerning changes which affect a plurality of securitizations.

99. The method described in claim 98, further including the steps of:

permitting the user to formulate a database query on the global staff/contact data entry screen; and providing a report thereon based on variables included in the query.

100. The method described in claim 99, further including the steps of:

permitting the user to formulate the query in terms of the value of at least one variable including queue type, previous staff person or contact, and new staff person or contact; and providing a report which lists all securitizations and queues corresponding to the variable values included in the query.

101. The method described in claim 74, further including the step of:

permitting a user to identify on a privilege level data entry screen, roles of individuals having responsibility for performing the trustee's duties, and to specify levels of data access for data viewing and modification for the established queues and milestones.

102. The method described in claim 1, further including the steps of:

permitting the user to formulate a database query on the active deals display screen; and providing a report thereon based on variables included in the query.

103. The method described in claim 102, further including the steps of:

permitting the user to formulate the query in terms of the value of at least one variable including user name, queue type, securitization name, basic function, and need for current activity;

providing a report which lists at least the securitizations, basic functions and workflow status for listed securitizations corresponding to the variable values included in the query.

104. The method described in claim 1, in which the active deals screen is provided with a table thereon, the table including rows each of which contains workflow status information concerning a particular securitization, and further including the steps of:

permitting a user to select a specific securitization; and thereafter presenting the user a pop-up selection list from which specific actions applicable to the workflow status of the selected securitization may be initiated.

105. The method described in claim 104, wherein at least some actions available in some of the pop-up selection lists require supporting documentation, and further including the steps of:

presenting the user with a data entry screen for providing the required documentation; and carrying out the selected action after the supporting documentation has been provided.

106. The method described in claim 1, further including the step of permitting a user to manually enter information required for waterfall payment and tax processing which is not provided as part of the aggregated asset level data.

107. The method described in claim 1, further including the steps of:

permitting a user to set up data verification tests as part of the deal setup information, and to specify queues and milestones at which the tests are to be applied; and prompting the user on the active deals screen when predefined verification tests are to be performed.

108. The method described in claim 107, further including the step of: permitting the user to customize pre-existing verification tests for reuse.

109. The method described in claim 108, wherein the step of setting up a verification includes the steps of:

selecting the variable to be used;

defining specific parameters needed for a particular securitization;

programming the necessary calculations;

assigning importance to an abnormal result; and assigning the verification to a basic function and queue.

110. The method described in claim 109, further including the steps of:

providing at least one data entry screen for use in formulating verifications; and providing drop-down selection lists for selecting pre-existing verifications for modification, for specifying the basic function and queue at which the verification is to be performed, for selecting variables, parameters and values thereof, and for specifying the workflow consequences of an abnormal result.

111. The method described in claim 110, further including the step of:

providing a text box for use in creating a formula to be performed as the verification.

112. The method described in claim 110, further including the step of:

permitting the creation of the formula using words and mathematical operators.

113. The method described in claim 95, wherein the information entered in the fields is derived, at least in part, from pre-stored lists.

114. The method described in claim 94 further including the step of creating the project setup records at least in part from lists of pre-stored information.

115. The method described in claim 94, wherein the step of providing access to the workflow status display further includes the steps of:

permitting the user to formulate a database query on the display screen from fields representing variables for the query; and providing a report thereon based on variables included in the query.

116. The method described in claim 95, further including the step of:

permitting a user to specify roles of individuals having responsibility for executing the project, and to specify levels of data access for data viewing and modification for the recorded queues and milestones.

117. The method described in claim 95, wherein the step of creating the project set up record includes:

permitting a user to set up data verification tests as part of the deal setup information, and to specify queues and milestones at which the tests are to be applied.

118. The method described in claim 117, further including the step of: permitting the user to customize pre-existing verification tests for reuse.

119. The method described in claim 118, wherein the step of setting up a verification includes the steps of:

selecting variable to be used;

defining specific parameters for the test;

programming necessary calculations;

assigning importance to an abnormal result; and assigning the verification to a basic function and queue.

120. The method described in claim 119, further including the steps of:

providing at least one data entry screen for use in formulating verifications; and providing selection lists for specifying pre-existing verifications for modification, for specifying the basic function and queue at which the verification is to be performed, for selecting variables, parameters and values thereof, and for specifying the workflow consequences of an abnormal result.

121. The method described in claim 120, further including the step of:

providing a text box for use in creating a formula to be performed as the verification.

122. The method described in claim 120, further including the step of:

permitting the creation of the formula using words and mathematical operators.

123. A workflow management system for a trustee handling a plurality of securitizations comprising:

at least one processor in communication with one or more of the following components:

an electronic deal setup database which stores deal setup information, including information related to the structure of the securitizations;

a first data processing software module which receives asset level data transmitted by at least one asset manager and aggregates the asset level data;

a workflow management software module;

an first interface which receives the aggregated asset level data from the first data processing software module, and transmits the data electronically to the workflow management software module;

a computer display generated under control of the workflow management software module, which displays status information concerning a particular securitization, provides prompts to a user as to work which is to be done with respect thereto, and which includes at least one active element from which the user may initiate actions with respect to the work;

a second data processing software module which receives the aggregated asset level data, and responds to commands from the workflow management software module to perform computations related to payments due investors in the securitization;

a second interface; and a third data processing software module which receives payment data produced by the second data processing software module through the second interface, and responds to commands from the workflow management software module to processes payments to the investors based on the payment data.

124. The system described in claim 123, further including an electronic workflow status database which stores workflow status information for the securitizations.

125. The system described in claim 123, wherein the computer display is based at least in part on recorded deal setup information in the electronic database.

126. The system described in claim 124, wherein the computer display is based at least in part on workflow status information recorded in the workflow status database.

127. The system described in claim 124, wherein the workflow management software module is operative to update the workflow status database in response to actions initiated by users, and work completed.

128. The system described in claim 123, wherein the electronic deal setup database stores information related to the performance of the trustee's duties in connection the securitizations.

129. The system described in claim 123, further including a data handling device responsive to data and commands from the workflow management software module the data handling device being operative to electronically disseminate reports and other data compilations upon completion of the payment processing.

130. The system described in claim 123, wherein the aggregated asset level data is in database form, and wherein the first interface maps the database structure of the aggregated asset level data for compatibility with the second data processing software module.

131. The system described in claim 130, wherein the payment data produced by the second data processing software module is in database form, and wherein the second interface maps the database structure of the payment data for compatibility with the third data processing software module.

* * * * *